(12) United States Patent
Takashima et al.

(10) Patent No.: US 12,259,674 B2
(45) Date of Patent: Mar. 25, 2025

(54) ELECTROCONDUCTIVE MEMBER, PROCESS CARTRIDGE, AND ELECTROPHOTOGRAPHIC IMAGE FORMATION DEVICE

(71) Applicant: CANON KABUSHIKI KAISHA, Tokyo (JP)

(72) Inventors: Kenji Takashima, Kanagawa (JP); Kazuhiro Yamauchi, Shizuoka (JP); Satoru Nishioka, Shizuoka (JP); Yuichi Kikuchi, Shizuoka (JP); Takumi Furukawa, Shizuoka (JP); Masaki Yamada, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 507 days.

(21) Appl. No.: 17/658,696

(22) Filed: Apr. 11, 2022

(65) Prior Publication Data

US 2022/0244673 A1 Aug. 4, 2022

Related U.S. Application Data

(63) Continuation of application No. PCT/JP2020/039037, filed on Oct. 16, 2020.

(30) Foreign Application Priority Data

Oct. 18, 2019 (JP) ................. 2019-191551

(51) Int. Cl.
*G03G 15/00* (2006.01)
*C08G 18/42* (2006.01)
(Continued)

(52) U.S. Cl.
CPC ........... *G03G 15/751* (2013.01); *C08G 18/42* (2013.01); *C08G 18/44* (2013.01); *C08K 3/04* (2013.01);
(Continued)

(58) Field of Classification Search
CPC ............. G03G 15/751; G03G 15/0233; G03G 15/0818; G03G 15/162; G03G 15/1685;
(Continued)

(56) References Cited

U.S. PATENT DOCUMENTS 3,640,708 A 2/1972 Humphriss
6,070,040 A 5/2000 Goto
(Continued)

FOREIGN PATENT DOCUMENTS

CN 104950607 A 9/2015
CN 105652619 A 6/2016
(Continued)

OTHER PUBLICATIONS

U.S. Appl. No. 17/658,685, filed Apr. 11, 2022, Masaki Yamada.
(Continued)

*Primary Examiner* — Stewart A Fraser
(74) *Attorney, Agent, or Firm* — VENABLE LLP

(57) ABSTRACT

Provided is an electrophotographic electroconductive member, including: an electroconductive support; an electroconductive layer; and a surface layer in order, wherein an impedance is $1.0 \times 10^3 \Omega$ to $1.0 \times 10^8 \Omega$ at an outer surface of the electroconductive member, in the surface layer, an electronic electroconductive agent is dispersed, the electroconductive layer has a matrix containing a cross-linked product of a first rubber and domains each containing a cross-linked product of a second rubber and electroconductive particles, and wherein, and wherein among the domains observed in specified observation regions, 80% by number or more of the domains satisfy (1) and (2):
(1) a proportion of sectional areas of the electroconductive particles with respect to the domain is 20% or more;
(2) A/B is 1.00 to 1.10 when A is a perimeter of the domain and B is an envelope perimeter.

21 Claims, 7 Drawing Sheets

(51) Int. Cl.
  *C08G 18/44* (2006.01)
  *C08K 3/04* (2006.01)
  *C08L 9/06* (2006.01)
  *C09D 175/06* (2006.01)
  *F16C 13/00* (2006.01)
  *H01B 1/24* (2006.01)

(52) U.S. Cl.
  CPC .............. *C08L 9/06* (2013.01); *C09D 175/06* (2013.01); *F16C 13/00* (2013.01); *H01B 1/24* (2013.01)

(58) Field of Classification Search
  CPC .......... C08G 18/42; C08G 18/44; C08K 3/04; C08L 9/06; C09D 175/06
  See application file for complete search history.

(56) References Cited

U.S. PATENT DOCUMENTS

| | | | |
|---|---|---|---|
| 7,693,457 B2 | 4/2010 | Kuruma et al. | |
| 7,797,833 B2 | 9/2010 | Nakamura et al. | |
| 7,799,398 B2 | 9/2010 | Nakamura et al. | |
| 7,962,068 B2 | 6/2011 | Kuroda et al. | |
| 8,298,670 B2 | 10/2012 | Muranaka et al. | |
| 8,445,113 B2 | 5/2013 | Furukawa et al. | |
| 8,449,975 B2 | 5/2013 | Hirakoso et al. | |
| 8,600,273 B2 | 12/2013 | Yamada et al. | |
| 8,622,881 B1 | 1/2014 | Harada et al. | |
| 8,628,854 B2 | 1/2014 | Yamauchi et al. | |
| 8,655,222 B2 | 2/2014 | Nakamura et al. | |
| 8,668,987 B2 | 3/2014 | Yamauchi et al. | |
| 8,685,601 B2 | 4/2014 | Nose et al. | |
| 8,706,011 B2 | 4/2014 | Anan et al. | |
| 8,715,830 B2 | 5/2014 | Yamada et al. | |
| 8,768,226 B2 | 7/2014 | Koyanagi et al. | |
| 8,768,227 B2 | 7/2014 | Urushihara et al. | |
| 8,771,818 B2 | 7/2014 | Nishioka et al. | |
| 8,774,677 B2 | 7/2014 | Sakurai et al. | |
| 8,798,508 B2 | 8/2014 | Yamada et al. | |
| 8,837,985 B2 | 9/2014 | Ishida et al. | |
| 8,846,287 B2 | 9/2014 | Yamada et al. | |
| 8,852,743 B2 | 10/2014 | Kikuchi et al. | |
| 8,874,007 B2 | 10/2014 | Kawamura et al. | |
| 8,874,012 B2 | 10/2014 | Yamada et al. | |
| 8,913,930 B2 | 12/2014 | Ishii et al. | |
| 8,991,053 B2 | 3/2015 | Watanabe et al. | |
| 9,023,465 B2 | 5/2015 | Yamada et al. | |
| 9,086,643 B2 | 7/2015 | Kikuchi et al. | |
| 9,128,403 B2 | 9/2015 | Yamauchi et al. | |
| 9,146,482 B2 | 9/2015 | Watanabe et al. | |
| 9,360,789 B1 | 6/2016 | Masu et al. | |
| 9,360,833 B2 | 6/2016 | Terada et al. | |
| 9,442,408 B2 | 9/2016 | Yamauchi et al. | |
| 9,442,451 B2 | 9/2016 | Yamauchi et al. | |
| 9,541,854 B2 | 1/2017 | Kikuchi et al. | |
| 9,547,250 B2 | 1/2017 | Kikuchi et al. | |
| 9,551,949 B2 | 1/2017 | Yamauchi et al. | |
| 9,581,931 B2 | 2/2017 | Yamada et al. | |
| 9,599,913 B2 | 3/2017 | Nishioka et al. | |
| 9,639,009 B2 | 5/2017 | Yamaguchi et al. | |
| 9,651,888 B2 | 5/2017 | Muranaka et al. | |
| 9,665,028 B2 | 5/2017 | Arimura et al. | |
| 9,665,029 B2 | 5/2017 | Hino et al. | |
| 9,740,133 B2 | 8/2017 | Yamauchi et al. | |
| 9,811,009 B2 | 11/2017 | Yamada et al. | |
| 9,811,021 B2 | 11/2017 | Muranaka et al. | |
| 9,897,931 B2 | 2/2018 | Nishioka et al. | |
| 9,904,199 B2 | 2/2018 | Terada et al. | |
| 9,910,379 B2 | 3/2018 | Furukawa et al. | |
| 9,958,802 B2 | 5/2018 | Kikuchi et al. | |
| 9,964,914 B2 | 5/2018 | Arimura et al. | |
| 9,977,353 B2 | 5/2018 | Nishioka et al. | |
| 9,977,359 B2 | 5/2018 | Koyanagi et al. | |
| 10,018,927 B2 | 7/2018 | Yamada et al. | |
| 10,018,934 B2 | 7/2018 | Yamada et al. | |
| 10,108,129 B2 | 10/2018 | Yamaguchi et al. | |
| 10,146,149 B2 | 12/2018 | Watanabe et al. | |
| 10,197,930 B2 | 2/2019 | Yamada et al. | |
| 10,280,148 B2 | 5/2019 | Nishioka et al. | |
| 10,303,079 B2 | 5/2019 | Utsuno et al. | |
| 10,317,811 B2 | 6/2019 | Tomomizu et al. | |
| 10,331,054 B2 | 6/2019 | Urushihara et al. | |
| 10,379,460 B2 | 8/2019 | Arimura et al. | |
| 10,416,588 B2 | 9/2019 | Masu et al. | |
| 10,545,453 B2 | 1/2020 | Iwasaki et al. | |
| 10,558,136 B2 | 2/2020 | Furukawa et al. | |
| 10,649,350 B2 | 5/2020 | Yamaguchi et al. | |
| 10,663,913 B2 | 5/2020 | Yamaai et al. | |
| 10,678,154 B2 | 6/2020 | Takashima et al. | |
| 10,678,158 B2 | 6/2020 | Kikuchi et al. | |
| 10,845,724 B2 * | 11/2020 | Kikuchi ............... | G03G 15/162 |
| 10,884,352 B2 | 1/2021 | Yamada et al. | |
| 10,996,581 B2 | 5/2021 | Muranaka et al. | |
| 11,022,904 B2 | 6/2021 | Arimura et al. | |
| 11,061,342 B2 | 7/2021 | Umeda et al. | |
| 11,112,718 B2 | 9/2021 | Uno et al. | |
| 11,112,719 B2 | 9/2021 | Makisumi et al. | |
| 11,112,748 B2 | 9/2021 | Yamada et al. | |
| 11,137,716 B2 | 10/2021 | Hiyama et al. | |
| 11,169,454 B2 * | 11/2021 | Nishioka ............... | G03G 21/18 |
| 11,169,464 B2 | 11/2021 | Komatsu et al. | |
| 11,175,602 B2 * | 11/2021 | Nishioka ............... | G03G 15/1685 |
| 11,307,509 B2 | 4/2022 | Hino et al. | |
| 11,320,756 B2 | 5/2022 | Kototani et al. | |
| 11,340,553 B2 | 5/2022 | Watariguchi et al. | |
| 11,347,156 B2 | 5/2022 | Kurachi et al. | |
| 11,360,405 B2 | 6/2022 | Tomono et al. | |
| 11,360,426 B2 | 6/2022 | Suzumura et al. | |
| 11,366,402 B2 | 6/2022 | Ishiduka et al. | |
| 2002/0022142 A1 | 2/2002 | Harada | |
| 2005/0227089 A1 | 10/2005 | Hirakawa | |
| 2006/0142131 A1 | 6/2006 | Iwamura | |
| 2011/0013939 A1 | 1/2011 | Ono | |
| 2012/0224887 A1 | 9/2012 | Harada | |
| 2012/0237863 A1 | 9/2012 | Wu | |
| 2012/0308261 A1 | 12/2012 | Tsuru et al. | |
| 2013/0195517 A1 | 8/2013 | Jansen | |
| 2013/0281276 A1 | 10/2013 | Watanabe et al. | |
| 2014/0219679 A1 | 8/2014 | Liu | |
| 2015/0277244 A1 | 10/2015 | Sato | |
| 2015/0331346 A1 | 11/2015 | Yamauchi et al. | |
| 2016/0154366 A1 * | 6/2016 | Yamauchi .......... | G03G 5/14708 |
| | | | 399/176 |
| 2017/0102633 A1 | 4/2017 | Yoshidome | |
| 2020/0225593 A1 | 7/2020 | Yamaguchi et al. | |
| 2020/0310265 A1 | 10/2020 | Nishioka et al. | |
| 2021/0033996 A1 | 2/2021 | Kikuchi et al. | |
| 2021/0116826 A1 | 4/2021 | Nishida et al. | |
| 2021/0116827 A1 | 4/2021 | Fukudome et al. | |
| 2021/0116831 A1 | 4/2021 | Tominaga et al. | |
| 2021/0116859 A1 | 4/2021 | Unno et al. | |
| 2022/0011684 A1 | 1/2022 | Nishioka et al. | |
| 2022/0026825 A1 * | 1/2022 | Nishioka ............... | B29C 48/34 |

FOREIGN PATENT DOCUMENTS

| | | |
|---|---|---|
| JP | 57-5047 U | 1/1982 |
| JP | 9-279015 A | 10/1997 |
| JP | 11-231637 A | 8/1999 |
| JP | 2002-3651 A | 1/2002 |
| JP | 2002-23479 A | 1/2002 |
| JP | 2005-321764 A | 11/2005 |
| JP | 2006-207807 A | 8/2006 |
| JP | 2007-163849 A | 6/2007 |
| JP | 2009-122592 A | 6/2009 |
| JP | 2010-122352 A | 6/2010 |
| JP | 2011-22410 A | 2/2011 |
| JP | 2012-163954 A | 8/2012 |
| JP | 2013-20175 A | 1/2013 |
| JP | 2016-18154 A | 2/2016 |
| JP | 2017-58639 A | 3/2017 |

(56) References Cited

FOREIGN PATENT DOCUMENTS

| JP | 2017-72833 A | 4/2017 |
| JP | 7195999 B2 | 12/2022 |
| WO | 2019/203225 A1 | 10/2019 |

OTHER PUBLICATIONS

U.S. Appl. No. 17/658,755, filed Apr. 11, 2022, Atsushi Uematsu.
U.S. Appl. No. 17/711,229, filed Apr. 1, 2022, Shota Kaneko.
U.S. Appl. No. 17/806,015, filed Jun. 8, 2022, Yuichi Kikuchi.
Takashi Sanada et al., Sumitomo Chemical Co., Ltd. Petrochemicals Research Laboratory, Morphology Control of Polymer Alloy by Reactive Processing and Morphology Evolution, pp. 42-54 (2003).

* cited by examiner

ELECTROCONDUCTIVE MEMBER, PROCESS CARTRIDGE, AND ELECTROPHOTOGRAPHIC IMAGE FORMATION DEVICE

CROSS-REFERENCE TO RELATED APPLICATIONS

This application is a Continuation of International Patent Application No. PCT/JP2020/039037, filed Oct. 16, 2020, which claims the benefit of Japanese Patent Application No. 2019-191551, filed Oct. 18, 2019, both of which are hereby incorporated by reference herein in their entirety.

BACKGROUND

Technical Field

The present disclosure relates to an electroconductive member, a process cartridge, and an electrophotographic image forming apparatus which are used in an electrophotographic system.

Description of the Related Art

In an electrophotographic image forming apparatus (hereinafter sometimes referred to as "electrophotographic apparatus"), electroconductive members are used as a charging member, a transfer member, and a developing member. As the electrophotographic electroconductive member, there has been known an electroconductive member having a configuration including an electroconductive support and an electroconductive layer formed on the support. The electrophotographic electroconductive member has a function to transport electric charge from the electroconductive support to the surface of the electrophotographic electroconductive member and apply the electric charge to an abutment object by discharge or triboelectric charging.

The charging member is a member for generating discharge between the charging member and an electrophotographic photosensitive member to charge the surface of the electrophotographic photosensitive member. The developing member is a member for controlling the electric charge of a developer covering the surface of the developing member by triboelectric charging to give uniform charge quantity distribution to the developer, and then uniformly transfer the developer onto the surface of the electrophotographic photosensitive member in accordance with an applied electric field. In addition, the transfer member is a member for transferring the developer from the electrophotographic photosensitive member to a printing medium or an intermediate transfer member and simultaneously generate discharge to stabilize the developer after the transfer.

Those electroconductive members are each required to achieve uniform charging for an abutment object, such as an electrophotographic photosensitive member, an intermediate transfer member, or a printing medium.

In Japanese Patent Application Laid-Open No. 2002-3651, there is disclosed a charging member for achieving uniform charging, including an elastic layer in which polymer particle phases having electronic electroconductivity are dispersed in a semi-electroconductive polymer continuous phase having ionic electroconductivity.

According to the investigations made by the inventors, it has been recognized that the charging member according to Japanese Patent Application Laid-Open No. 2002-3651 is excellent in uniform chargeability with respect to a body to be charged. However, it has been recognized that there is still room for improvement in the recent increase in speed of an image forming process. Specifically, an attempt was made to form an image for a long period of time in a high-speed system having a rotation number higher than a general rotation number by bringing the charging member according to Japanese Patent Application Laid-Open No. 2002-3651 into abutment against an electrophotographic photosensitive member. As a result, for example, dirt deposition became significant even in the number of printed sheets in which the deposition of toner and an external additive (dirt) on a charging member had not been a problem, and white spots caused by excessive discharge were sometimes generated on an image corresponding to the portion of dirt deposition.

SUMMARY

At least one aspect of the present disclosure is directed to providing an electroconductive member that may be used as a charging member, a developing member, or a transfer member which enables high-quality image formation for a long period of time even when applied to a high-speed electrophotographic image forming process.

In addition, another aspect of the present disclosure is directed to providing a process cartridge conducive to formation of a high-quality electrophotographic image. Further, another aspect of the present disclosure is directed to providing an electrophotographic image forming apparatus capable of forming a high-quality electrophotographic image.

According to one aspect of the present disclosure, there is provided an electrophotographic electroconductive member, comprising: a support having an electroconductive outer surface; an electroconductive layer on the outer surface of the support; and a surface layer on an outer surface of the electroconductive layer. An impedance is $1.0 \times 10^3 \, \Omega$ to $1.0 \times 10^8 \, \Omega$ when a platinum electrode is provided directly on an outer surface of the electrophotographic electroconductive member, and an alternating current voltage is applied between the outer surface of the support and the platinum electrode at an amplitude of 1 V and a frequency of 1.0 Hz under an environment of a temperature of 23° C. and a relative humidity of 50%. In the surface layer, an electronic electroconductive agent is dispersed, and the electroconductive layer has a matrix containing a cross-linked product of a first rubber and domains each containing a cross-linked product of a second rubber and electroconductive particles. Further, when defining a length of the electroconductive layer in a longitudinal direction as L and defining a thickness of the electroconductive layer as T, and when a 15-micrometer square observation region is put at arbitrary three positions in a thickness region from an outer surface of the electroconductive layer to a depth of 0.1T to 0.9T on each of cross sections in a thickness direction of the electroconductive layer at three positions: a center of the electroconductive layer in the longitudinal direction and points from both ends of the electroconductive layer to the center by L/4, among the domains observed in each of the observation regions whose total number of 9, 80% by number or more of the domains satisfy (1) and (2): (1) a proportion of sectional areas of the electroconductive particles contained in the domain with respect to a sectional area of the domain is 20% or more; (2) A/B is 1.00 to 1.10 when A is a perimeter, and B is an envelope perimeter.

According to another aspect of the present disclosure, there is provided a process cartridge configured to be detachably attachable to a main body of an electrophotographic image forming apparatus, the process cartridge including the above-mentioned electrophotographic electroconductive member.

Further, according to another aspect of the present disclosure, there is provided an electrophotographic image forming apparatus including the above-mentioned process cartridge.

Further features of the present invention will become apparent from the following description of exemplary embodiments with reference to the attached drawings.

DESCRIPTION OF THE EMBODIMENTS

Figure 1:
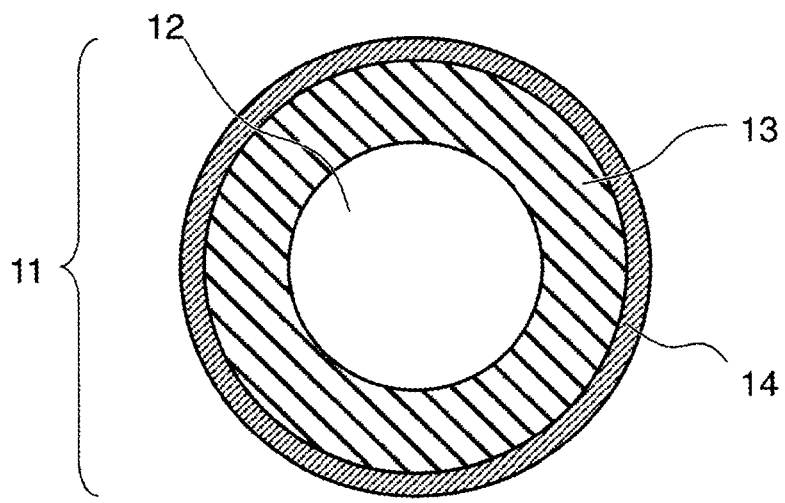
FIG. 1 is a sectional view of an electroconductive member according to one embodiment of the present disclosure in a direction perpendicular to a longitudinal direction.

Unless otherwise stated, the descriptions "XX or more and YY or less" and "from XX to YY" each indicating a numerical range each mean a numerical range including a lower limit and an upper limit that are end points.

When the numerical ranges are described step by step, the upper limit and the lower limit in each of the numerical ranges can be arbitrarily combined.

The inventors have made investigations on the reason that, when the process speed was increased, deposition of dirt, such as toner and an external additive, became significant on the charging member according to Japanese Patent Application Laid-Open No. 2002-3651 in the number of printed sheets in which no problem has hitherto occurred on an image, and white spots were generated on an electrophotographic image.

In general, a DC voltage is applied to a charging member (charging roller), and hence a potential difference occurs between the DC voltage applied to the charging roller and the surface potential of a photosensitive member. Meanwhile, a part of dirt substances such as toner and external additives having an insulating property is positively or negatively charged due to the influence of rubbing or the like in an electrophotographic image forming apparatus. Accordingly, as long as there is a potential difference between the charging roller and the surface potential of the photosensitive member, any one of the positively (+) and negatively (−) charged dirt substances electrostatically adheres to the charging roller due to the relationship of the potential difference. For example, in the case of a charging roller in which an electroconductive member is arranged so as to be brought into abutment against a photosensitive member in an electrophotographic apparatus and is configured to charge the photosensitive member, the positively charged dirt substances actively electrostatically adhere to a charging roller side due to the relationship of the potential difference between the charging roller and the photosensitive drum.

When the toner adheres to the charging roller, depending on whether the bias applied to the charging roller is negative or positive, the electric charge having the same polarity as that of the applied bias is gradually applied to the toner from the outer surface. In the case where the electric charge is sufficiently accumulated in the dirt, when an electrostatic force acts due to the electric field formed from the surface of the charging roller toward the photosensitive drum and exceeds the adhesive force between the surface of the charging roller and the dirt, there occurs a "discharge" phenomenon in which the dirt is peeled off from the surface and moves to the photosensitive member side. That is, when the electric charge is sufficiently accumulated in most of the dirt and the discharge phenomenon efficiently occurs, the dirt deposition can be prevented.

Regarding the transportation step of the negative or positive electric charge from the support to the surface of the charging roller, which finally reaches the dirt, focus has been given on the role of polymer particle phases each formed of an electronic electroconductive rubber material inside the charging member according to Japanese Patent Application Laid-Open No. 2002-3651, According to the observation made by the inventors, each of the polymer particle phases exhibited a shape greatly deviated from a true sphere, and there were many portions in which the phase boundary had a recessed or protruding shape. Between such polymer particle phases, the electron transfer is concentrated on the protrusions of the polymer particle phases. When portions in which the electron transfer is concentrated are formed, portions in which the transfer is not sufficient are also simultaneously formed. That is, the electric charge movement becomes non-uniform in the transportation step. In particular, in a high-speed process, the amount of dirt such as toner that is brought into contact with electric charge per unit time is increased, and the time from the adhesion of dirt to the adhesion of another dirt, which most contributes to the application of electric charge to the dirt, becomes short. Because of this, the decrease in supply amount of electric charge to the dirt becomes further significant.

From the foregoing, the following has been assumed. Regarding the generation of white spots on the image caused by the dirt deposition when the process speed is increased, portions in which the discharge phenomenon on the surface of the charging roller is insufficient appear due to the occurrence of uneven electron transfer between the polymer particle phases, and dirt deposition is accelerated in those portions. As a result, the generation of white spots occurs in an electrophotographic image.

In view of the foregoing, the inventors have recognized that, when the concentration points of electron transfer between the polymer particle phases are eliminated, and uniform supply of electric charge to dirt on the surface is securely performed, the discharge effect is accelerated, and the dirt deposition is suppressed, which is effective for relieving the generation of white spots on the image. Based on such recognition, the inventors have made further extensive investigations, and as a result, have found that an electrophotographic electroconductive member, which includes a support having an electroconductive outer surface, an electroconductive layer formed on the outer surface of the support, and a surface layer formed on an outer surface of the electroconductive layer, and which satisfies the following requirements (A), (B), (C), and (D), can suppress the generation of white spots caused by dirt deposition for a long period of time even in a high-speed process.
Requirement (A)

An impedance obtained when a platinum electrode is directly arranged on an outer surface of the electrophotographic electroconductive member, and an AC voltage having an amplitude of 1 V and a frequency of 1.0 Hz is applied between the outer surface of the support and the platinum electrode under an environment having a temperature of 23° C. and a relative humidity of 50% is from $1.0 \times 10^3 \Omega$ to $1.0 \times 10^8 \Omega$.
Requirement (B)

The electroconductive layer includes a matrix containing a cross-linked product of a first rubber and domains each containing a cross-linked product of a second rubber and electroconductive particles.
Requirement (C)

A length of the electroconductive layer in a longitudinal direction is represented by L and a thickness of the electroconductive layer is represented by T. A 15-micrometer square observation region is set at each of arbitrary three points of a thickness region having a depth of from 0.1T to 0.9T from the outer surface of the electroconductive layer in each of cross-sections of the electroconductive layer in a thickness direction at three points including a center of the electroconductive layer in the longitudinal direction and points of L/4 from both ends of the electroconductive layer to the center. 80 number % or more of the domains observed in each of the nine observation regions in total satisfy (1) and (2):

(1) a proportion of sectional areas of the electroconductive particles contained in the domain with respect to a sectional area of the domain is 20% or more; and (2) a ratio A/B of a perimeter A of the domain to an envelope perimeter B of the domain is 1.00 to 1.10.
Requirement (D)

The surface layer has an electronic electroconductive agent dispersed therein.

<Requirement (A)>

The requirement (A) indicates the degree of electroconductivity of the electrophotographic electroconductive member. The electrophotographic electroconductive member exhibiting such impedance value can suppress an excessive increase in amount of a discharge current, and as a result, can prevent the occurrence of potential unevenness caused by abnormal discharge. In addition, the electrophotographic electroconductive member can suppress the occurrence of an insufficient total discharge charge quantity and insufficient injection charge to be supplied to dirt.

The impedance according to the requirement (A) may be measured by the following method.

First, when impedance is measured, in order to eliminate the influence of contact resistance between an electroconductive member and a measuring electrode, a platinum thin film is formed on the outer surface of the electrophotographic electroconductive member, and impedance is measured with two terminals using the thin film as an electrode and an electroconductive support as a ground electrode.

As a method of forming the thin film, there are given methods such as metal vapor deposition, sputtering, application of a metal paste, and bonding with a metal tape. Of those, a method of forming the thin film by vapor deposition is preferred from the viewpoint of being able to reduce contact resistance with the electrophotographic electroconductive member.

When a platinum thin film is formed on the surface of the electrophotographic electroconductive member, it is preferred to provide a vacuum vapor deposition device with a mechanism capable of gripping the electrophotographic electroconductive member in consideration of the simplicity thereof and uniformity of the thin film. Further, for an electroconductive member having a columnar cross-section, it is preferred to use a vacuum vapor deposition device further provided with a rotation mechanism.

For an electroconductive member having a columnar cross section, it is preferred that measurement be performed by forming a platinum thin film electrode having a width of about 10 mm in a longitudinal direction as an axial direction of the columnar shape, and connecting a metal sheet wound around the platinum thin film electrode without a gap to a measuring electrode coming out of a measuring device. With this, the impedance measurement can be performed without being influenced by the fluctuation in outer diameter of the electrophotographic electroconductive member and the surface shape. As the metal sheet, an aluminum foil, a metal tape, or the like may be used.

Examples of the impedance measuring device include an impedance analyzer, a network analyzer, and a spectrum analyzer. Of those, an impedance analyzer may be suitably used from the viewpoint of an electric resistance region of the charging member.

Figure 3A:
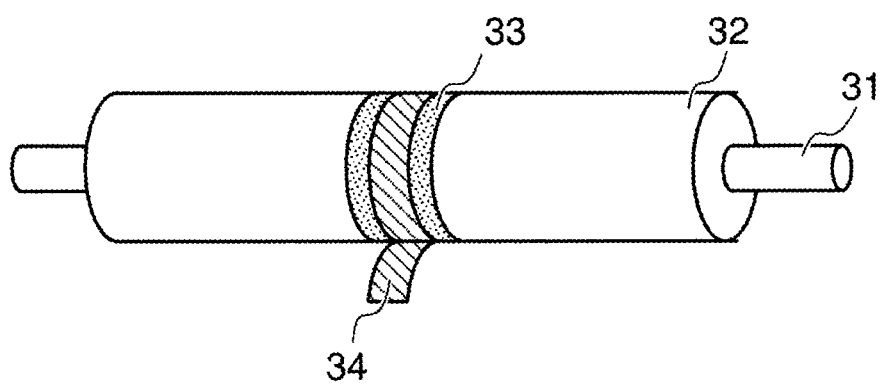
FIG. 3A is a schematic view of an impedance measuring system of the electroconductive layer according to this aspect.
Figure 3B:
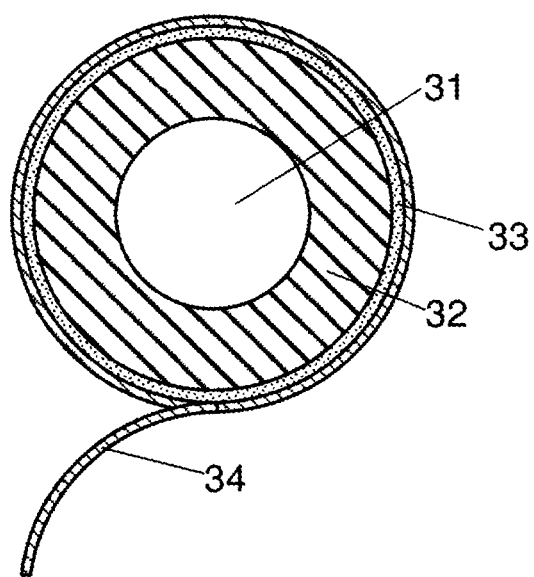
FIG. 3B is a schematic view of the impedance measuring system of the electroconductive layer according to this aspect.

FIG. 3A and FIG. 3B are each a schematic view of a state in which a measuring electrode is formed on an electroconductive member. In FIG. 3A and FIG. 3B, there are illustrated a support 31, an electroconductive layer and surface layer 32, a platinum-deposited layer 33 serving as a measuring electrode, and an aluminum sheet 34. FIG. 3A is a perspective view, and FIG. 3B is a sectional view. As illustrated in those figures, it is important that the electroconductive layer and surface layer 32 be sandwiched between the support 31 and the measuring electrode 33.

Then, the measuring electrode 33 and the support 31 are connected, from the aluminum sheet 34, to an impedance measuring device (e.g., product name "Solartron 1260", 96 W-type dielectric impedance measuring system, manufactured by Solartron (not shown)), to thereby measure impedance.

The impedance measurement is performed by measuring impedance at an oscillation voltage (amplitude) of 1 Vpp and a frequency of 1.0 Hz under an environment having a temperature of 23° C. and a relative humidity of 50% to obtain an absolute value of the impedance.

The electrophotographic electroconductive member is equally divided into five regions in the longitudinal direction, and the above-mentioned measurement is performed five times in total arbitrarily once in each region. An average value thereof is defined as the impedance of the electrophotographic electroconductive member.

<Requirement (B)>

The configurations of the matrix containing a cross-linked product of a first rubber and the domains each containing a cross-linked product of a second rubber and electroconductive particles of the electroconductive layer are described later in detail in the section <Electroconductive Layer>.

<Requirement (C)>

In the requirement (C), the requirement (1) specifies the amount of electroconductive particles contained in each of the domains included in the electroconductive layer. In addition, the requirement (2) specifies the following: the domain shape is close to a true sphere and there are few portions to be protrusions or recesses on the outer peripheral surface of the domain (hereinafter expressed as "small unevenness or no unevenness on the outer peripheral surface of the domain").

Regarding the requirement (1), the inventors have obtained the finding that, when focus is given on one domain, the amount of the electroconductive particles contained in the domain influences the shape of the domain. That is, the inventors have obtained the finding that, when the filling amount of the electroconductive particles in one domain is increased, the shape of the domain becomes closer to a sphere. When the number of domains close to a sphere is larger, the concentration points of electron transfer between the domains can be reduced.

Then, with reference to an area of a cross-section of one domain, the inventors have focused on the proportion of a sum of sectional areas of the electroconductive particles observed in the cross-section. According to the investigations made by the inventors, although the reason is not clear, the domain having the proportion of 20% or more may have an outer shape that can significantly alleviate the concentration of electron transfer between the domains. Specifically, the domain can have a shape further closer to a sphere.

Figure 5:
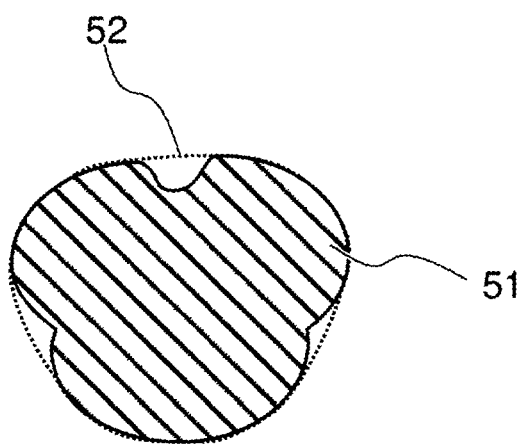
FIG. 5 is a conceptual view for illustrating an envelope perimeter of the domain according to this aspect.

The requirement (2) specifies the degree of the presence of unevenness that may serve as the concentration points of electron transfer on the outer peripheral surface of the domain. That is, the domain in which the ratio A/B of the perimeter A of the domain to the envelope perimeter B of the domain is 1.00 has no unevenness on the outer periphery. Then, according to the investigations made by the inventors, it has been recognized that the domain in which the ratio A/B is 1.00 to 1.10 has substantially no unevenness that may serve as the concentration points of electron transfer between the domains. As illustrated in FIG. 5, the envelope perimeter refers to a perimeter (broken line 52) when the protrusions of the domain 51 observed in the observation region are connected to each other and the peripheral lengths of the recesses are ignored.

The requirement (C) specifies the following: in the domain group in the electroconductive layer, the domains satisfying the above-mentioned (1) and (2) occupy the majority of 80 number % or more.

In the requirement (C), the reason for setting the observation target of the domain to within a range of a depth of from 0.1T to 0.9T from the outer surface of the electroconductive layer in the cross-section in the thickness direction of the electroconductive layer is as described below. That is, it is conceived that the movement of electrons in the electroconductive layer from the support side to the outer surface side of the electroconductive layer is mainly controlled by the domains that are present within the above-mentioned range.

<Requirement (D)>

The surface layer satisfying the requirement (D) enables the electric charge uniformly supplied from the electroconductive layer side satisfying the requirement (C) to be further securely applied to dirt regardless of the contact form of the dirt. For example, when there is no surface layer satisfying the requirement (D), the contact area between the toner and the electroconductive layer is small, and the contact portion is a matrix portion of the electroconductive layer, the application of electric charge to the dirt may not be sufficient. Because of the presence of the surface layer in which the electronic electroconductive agent is dispersed, the application of electric charge can be further uniformly performed. The electronic electroconductive agent is required out of electroconductive agents because of the high responsiveness thereof.

As one aspect of the electrophotographic electroconductive member according to the present disclosure, in particular, an electroconductive member having a roller shape (hereinafter sometimes referred to as "electroconductive roller") is described with reference to the drawings.

FIG. 1 is a sectional view of an electroconductive roller 11 perpendicular to a longitudinal direction. The electroconductive roller 11 includes a columnar or hollow cylindrical support 12, an electroconductive layer 13 formed on an outer peripheral surface of the support, and further a surface layer 14.

Figure 2:
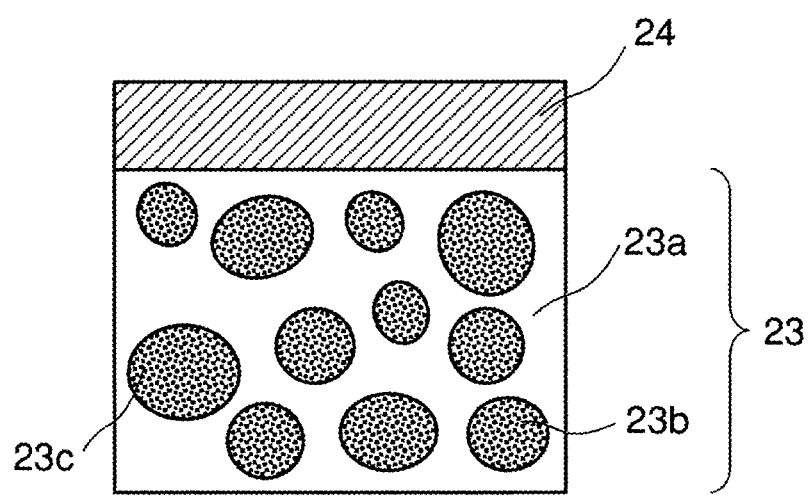
FIG. 2 is a sectional view of an electroconductive layer of the electrophotographic electroconductive member according to one embodiment of the present disclosure in a direction perpendicular to a longitudinal direction.

FIG. 2 is a sectional view of an electroconductive roller in a direction perpendicular to a longitudinal direction in which a support of the electroconductive roller is excluded. An electroconductive layer 23 has a structure including a matrix 23a and domains 23b (hereinafter sometimes referred to as "matrix-domain structure"). Each of the domains 23b contains electroconductive particles 23c. A surface layer 24 containing an electronic electroconductive agent (not shown) is formed on an outer surface of the electroconductive layer 23.

The domains and matrix in the electroconductive layer and the surface layer in FIG. 1 and FIG. 2 are schematically illustrated for ease of understanding, and the sizes and ratios thereof are not specified.

<Support>

A material appropriately selected from materials known in the field of an electrophotographic electroconductive member and materials that may each be utilized as an electrophotographic electroconductive member may be used as a material for forming the support. An example of the materials is aluminum, stainless steel, a synthetic resin having electroconductivity, or a metal or an alloy, such as iron or a copper alloy.

Further, such material may be subjected to oxidation treatment or plating treatment with chromium, nickel, or the like. Any one of electroplating and electroless plating may be used as the kind for the plating. Of those, electroless plating is preferred from the viewpoint of dimensional stability. Examples of the kind of the electroless plating to be used herein may include nickel plating, copper plating, gold plating, and plating with other various alloys.

The thickness of the plating is preferably 0.05 μm or more, and in consideration of a balance between working efficiency and a rust-proofing ability, the thickness of the plating is preferably from 0.10 μm to 30.00 μm. An example of the shape of the support may be a columnar shape or a hollow cylindrical shape. The columnar shape of the support may be a solid columnar shape or a hollow columnar shape (cylindrical shape). In addition, the outer diameter of the support preferably falls within the range of from 3 mm to 10 mm. Further, as required, partial processing is performed for mounting the support on the electrophotographic apparatus.

When a medium resistance layer or an insulating layer is present between the support and the electroconductive layer, electric charge may not be quickly supplied after the electric charge is consumed by discharge. Accordingly, it is preferred that the electroconductive layer be formed directly on the support, or the electroconductive layer be formed on the outer periphery of the support only via an intermediate layer formed of a thin film such as a primer and an electroconductive resin layer.

As the primer, a known primer may be selected and used depending on the rubber material for forming the electroconductive layer, the material for the support, and the like. Examples of the primer material include a thermosetting resin and a thermoplastic resin. Specifically, known materials, such as a phenol-based resin, a urethane-based resin, an acrylic resin, a polyester-based resin, a polyether-based resin, and an epoxy-based resin, may be used.

<Electroconductive Layer>

The electroconductive layer includes a matrix and a plurality of domains dispersed in the matrix. The matrix contains a first rubber, and each of the domains contains a second rubber and an electronic electroconductive agent.

<Matrix>

The matrix contains a cross-linked product of a first rubber. The volume resistivity ρm of the matrix is preferably $1.0 \times 10^8$ to $1.0 \times 10^{17}$ Ωcm. When the volume resistivity of the matrix is set to $1.0 \times 10^8$ Ωcm or more, the disturbance of electric charge transfer between the electroconductive domains by the matrix can be suppressed. In addition, when the volume resistivity ρm is set to $1.0 \times 10^{17}$ Ωcm or less, the discharge from the electrophotographic electroconductive member to an electrically chargeable member when a charging bias is applied between the support and the electrically chargeable member can be smoothly performed. The volume resistivity ρm of the matrix is particularly $1.0 \times 10^{10}$ to $1.0 \times 10^{17}$ Ωcm, more preferably more than $1.0 \times 10^{12}$ Ωcm and $1.0 \times 10^{17}$ Ωcm or less.

The volume resistivity ρm of the matrix may be measured by, for example, cutting out a thin piece having a predetermined thickness (e.g., 1 μm) including the matrix-domain structure from the electroconductive layer and bringing a microprobe of a scanning probe microscope (SPM) or an atomic force microscope (AFM) into contact with the matrix in the thin piece.

Figure 6A:
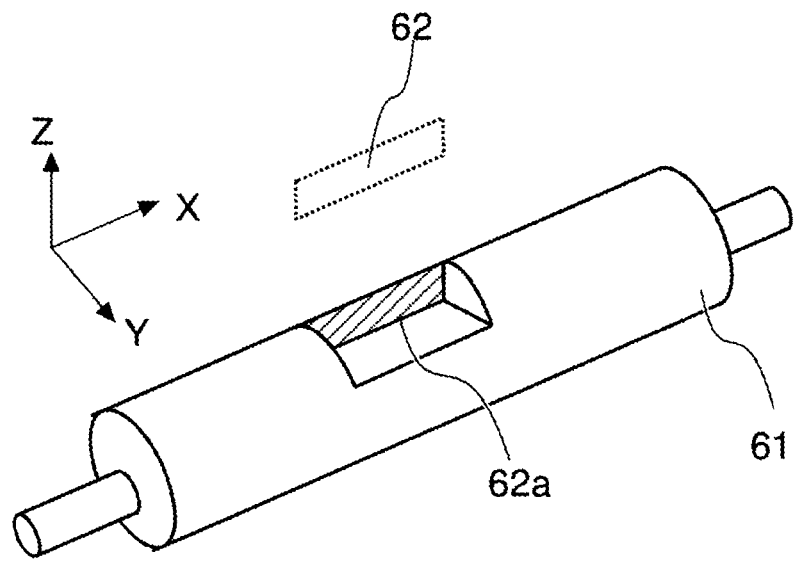
FIG. 6A is a conceptual view of a cut piece for measuring a domain shape according to this aspect.
Figure 6B:
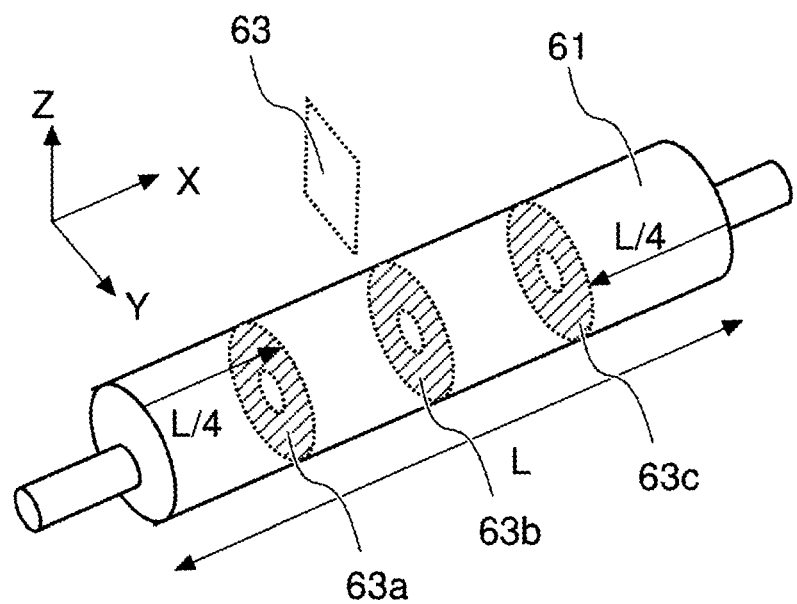
FIG. 6B is a conceptual view of a cut piece for measuring a domain shape according to this aspect.

The thin piece is cut out from the electroconductive layer, for example, in such a manner that, when the longitudinal direction of the electrophotographic electroconductive member is set to an X-axis, the thickness direction of the electroconductive layer is set to a Z-axis, and the circumferential direction is set to a Y-axis, the thin piece includes at least a part of a cross-section 62a parallel to an XZ-plane as illustrated in FIG. 6A. Alternatively, as illustrated in FIG. 6B, the thin piece is cut out so as to include at least a portion of a YZ-plane (e.g., 63a, 63b, 63c) perpendicular to the axial direction of the electrophotographic electroconductive member. There are given, for example, a sharp razor, a microtome, a focused ion beam (FIB) method, and the like.

For measurement of volume resistivity, one surface of the thin piece cut out from the electroconductive layer is grounded. Then, a microprobe (tip of a cantilever) of a scanning probe microscope (SPM) or an atomic force microscope (AFM) is brought into contact with the matrix portion of the surface on an opposite side to the ground surface of the thin piece, and a DC voltage of 50 V is applied for 5 seconds. Then, an arithmetic average value is calculated from a value obtained by measuring a ground current value for 5 seconds, and the applied voltage is divided by the calculated value, to thereby calculate an electric resistance value. Finally, the resistance value is converted into volume resistivity through use of the film thickness of the thin film.

In this case, the SPM and the AFM can also measure the film thickness of the thin piece simultaneously with the resistance value.

The value of volume resistivity of a matrix in a columnar charging member is determined by, for example, cutting out one thin piece sample from each of regions obtained by dividing the electroconductive layer into four parts in the circumferential direction and five parts in the longitudinal direction to obtain the above-mentioned measurement value, and then calculating an arithmetic average value of volume resistivities of 20 samples in total.

<First Rubber>

The blending ratio of the first rubber is largest in a rubber composition for forming the electroconductive layer, and the cross-linked product of the first rubber dominates the mechanical strength of the electroconductive layer. Accordingly, a rubber which expresses strength required for an electrophotographic electroconductive member in the electroconductive layer after its cross-linking is used as the first rubber.

Preferred examples of the first rubber include a natural rubber (NR), an isoprene rubber (IR), a butadiene rubber (BR), a styrene-butadiene rubber (SBR), a butyl rubber (IIR), an ethylene-propylene rubber (EPM), an ethylene-propylene-diene terpolymer rubber (EPDM), a chloroprene rubber (CR), an acrylonitrile-butadiene rubber (NBR), a hydrogenated product of NBR (H-NBR), and a silicone rubber.

A filler, a processing aid, a vulcanization aid, a vulcanization accelerator, a vulcanization accelerator aid, a vulcanization retarder, an age resistor, a softening agent, a dispersant, a colorant, or the like, which is generally used as a blending agent for a rubber, may be added to the first rubber for forming the matrix as required.

<Domain>

The domain includes the cross-linked product of the second rubber and the electroconductive particles. Herein, the "electroconductive" is defined as having a volume resistivity of less than $1.0 \times 10^8$ Ωcm.

<Second Rubber>

A preferred specific example of the second rubber is at least one selected from the group consisting of a natural rubber (NR), an isoprene rubber (IR), a butadiene rubber (BR), an acrylonitrile-butadiene rubber (NBR), a styrene-butadiene rubber (SBR), a butyl rubber (IIR), an ethylene-propylene rubber (EPM), an ethylene-propylene-diene rubber (EPDM), a chloroprene rubber (CR), a nitrile rubber (NBR), a hydrogenated nitrile rubber (H-NBR), a silicone rubber, and a urethane rubber (U).

<Electroconductive Particles>

Examples of the electroconductive particles include particles of electronic electroconductive agents including: carbon materials, such as carbon black and graphite; electroconductive oxides, such as titanium oxide and tin oxide; metals, such as Cu and Ag; and particles that are made electroconductive through coating of their surfaces with the electroconductive oxide or the metal. Those electroconductive particles may be used by being blended in appropriate amounts.

It is preferred that the electroconductive particles be contained so that the proportion of sectional areas of the electroconductive particles with respect to the sectional area of the domain is at least 20% as specified in the requirement (C) (1). When the electroconductive particles are filled into the domain at high density in this manner, the outer shape of the domain can be made close to a sphere, and the unevenness can be made small as specified in the above-mentioned requirement (C) (2). The upper limit of the proportion of the sectional areas of the electroconductive particles with respect to the sectional area of the domain is not particularly limited, but is preferably 30% or less.

It is preferred to use carbon black as the electroconductive particles in order to obtain a domain filled with the electroconductive particles at high density as specified in the requirement (C) (1). Specific examples of the carbon black include gas furnace black, oil furnace black, thermal black, lamp black, acetylene black, and ketjen black.

Of those, the carbon black having a DBP absorption amount of 40 to 80 $cm^3/100$ g may be particularly suitably used. The DBP absorption amount ($cm^3/100$ g) refers to the volume of dibutyl phthalate (DBP) to which 100 g of carbon black can adsorb, and is measured in accordance with Japanese Industrial Standards (JIS) K 6217-4:2017 (Carbon black for rubber-fundamental characteristics-Part 4: Determination of oil absorption amount (including a compressed sample)). In general, carbon black has a tufted higher-order structure in which primary particles having an average particle diameter of 10 to 50 nm are aggregated. The tufted high-order structure is called "structure", and the degree thereof is quantified by a DBP absorption amount ($cm^3/100$ g).

In general, carbon black with a developed structure has a high reinforcing property against a rubber, and the uptake of carbon black into a rubber is poor. In addition, the shear torque at the time of kneading becomes significantly high. Accordingly, it is difficult to increase the filling amount in the domain.

Meanwhile, the carbon black having a DBP absorption amount within the above-mentioned range has an undeveloped structure configuration, and hence the carbon black is less aggregated and has satisfactory dispersibility in a rubber. Because of this, the filling amount in the domain can be increased, and as a result, the outer shape of the domain closer to a sphere can be easily obtained.

Further, in the carbon black having a developed structure, the carbon black particles are easily aggregated with each other, and in addition, an aggregate easily becomes a mass having a large irregular structure. When such aggregate is included in the domain, it is difficult to obtain the domain according to the requirement (C) (2). An irregular structure that also influences the shape may be formed. Meanwhile, the carbon black having a DBP absorption amount within the above-mentioned range does not easily form an aggregate, and hence is effective for obtaining the domain according to the requirement (C) (2).

The content of the electronic electroconductive agent such as carbon black is preferably 20 to 150 parts by mass with respect to 100 parts by mass of the second rubber contained in the domains. The content is more preferably 50 to 100 parts by mass.

The volume resistivity of the domain is preferably $1.0 \times 10^4$ Ωcm or less. This is because, when the volume resistivity is $1.0 \times 10^4$ Ωcm or less, the electroconductive layer can be stably made electroconductive with the volume fraction of the domains forming the matrix-domain structure. The volume resistivity of a domain may be measured by the same method as the above-mentioned method of measuring volume resistivity of a matrix except that a measurement portion is changed to a position corresponding to the domain, and the applied voltage at time of measurement of a current value is changed to 1 V.

In order to obtain the electrophotographic electroconductive member as specified in the requirement (A), it is more preferred that, regarding the domain according to this aspect, 20 to 300 domains be present in a specific observation region. In the present disclosure, when the thickness of the electroconductive layer is represented by T, a 15-micrometer square observation region is placed at an arbitrary position of a thickness region having a depth of from 0.1T to 0.9T from the outer surface of the electroconductive layer in a cross-section in a thickness direction of the electroconductive layer. Then, the number of domains included in the observation region is preferably 20 or more. With this, sufficient electroconductivity as an electroconductive member can be ensured, and sufficient supply of electric charge can be achieved also in a higher-speed electrophotographic image forming process. In addition, the number of domains in the observation region is preferably 300 or less. With this, a sufficient distance can be formed between the domains, and hence the domains can be prevented from being aggregated even after long-term use. As a result, uniform discharge can be achieved for a long period of time.

Figure 4:
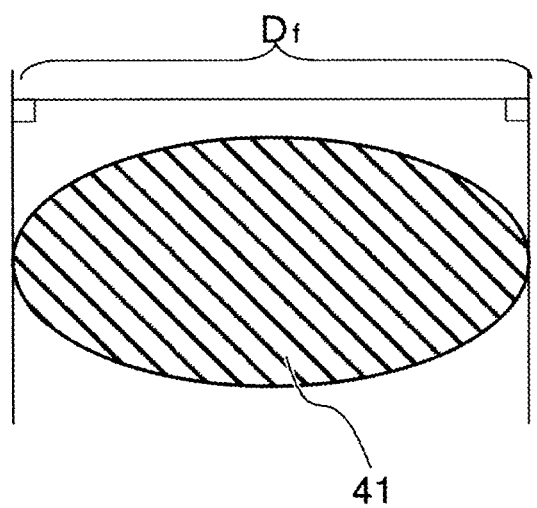
FIG. 4 is a conceptual view for illustrating a maximum Feret diameter of a domain according to this aspect.

In the domain according to this aspect, it is preferred that an average of the maximum Feret diameters Df (see FIG. 4, hereinafter also simply referred to as "domain diameters") of the domains 41 that satisfy the requirement (C) (1) and the requirement (C) (2) fall within a range of from 0.1 μm to 5.0 μm. Within such range, the size of the domain is equal to or less than that of the developer. Accordingly, fine discharge can be performed, and uniform discharge can be easily achieved.

<Method of Producing Electroconductive Layer>

An electroconductive layer of the electrophotographic electroconductive member according to this aspect may be formed by, for example, a method including the following steps (i) to (iv).

Step (i): a step of preparing a rubber composition for forming domains (hereinafter also referred to as "CMB"), the rubber composition containing carbon black and a second rubber;

Step (ii): a step of preparing a rubber composition for forming a matrix (hereinafter also referred to as "MRC"), the rubber composition containing a first rubber;

Step (iii): a step of kneading the CMB and the MRC to prepare a rubber composition having a matrix-domain structure; and Step (iv): a step of forming a layer of the rubber composition prepared in the step (iii) on a support directly or via another layer, and curing the layer of the rubber composition to form the electroconductive layer according to this aspect.

In addition, in order to obtain the domain satisfying the requirements (C), it is effective to prepare a CMB by adding, as electroconductive particles to be used in the preparation of the CMB, carbon black having a DBP absorption amount of 40 to 170 $cm^3/100$ g, preferably having the above-mentioned DBP absorption amount of 40 $cm^3/100$ g to 80 $cm^3/100$ g in a large amount with respect to the second rubber, followed by kneading. In this case, the blending amount of the carbon black with respect to the second rubber in the CMB is, for example, preferably 40 to 200 parts by mass with respect to 100 parts by mass of the second rubber. The blending amount is particularly 50 to 100 parts by mass.

In addition, it is preferred that the electroconductive particles be contained in the domain in such an amount that Dc, which represents an arithmetic average of distances between the electroconductive particles in the domain, is 110 to 130 nm.

When the Dc of the electroconductive particles in the domain is 110 to 130 nm, electron transfer between the electroconductive particles based on a tunnel effect can be performed between almost all the electroconductive particles in the domain. That is, the uneven distribution of an electroconductive path in the domain can be suppressed, and hence the electric field concentration in the domain can be suppressed. As a result, in addition to the domain shape, the electric field concentration in the domain can be suppressed.

Further, carbon gel exhibiting cross-linked rubber-like properties is increased in the rubber in which the carbon black has been dispersed as electroconductive particles. Because of this, the shape can be easily maintained, and the domain at the time of molding can be easily maintained in a spherical shape. As a result, the electric field concentration is suppressed.

Further, when the Dc of the electroconductive particles is 110 to 130 nm, and the standard deviation of the distribution of the distances between the electroconductive particles is represented by σm, it is more preferred that the coefficient of variation σm/Dc of the particle distances between the electroconductive particles be 0.0 to 0.3. The coefficient of variation is a value indicating the variation in distance between the electroconductive particles, and is 0.0 when the distances between the electroconductive particles are all the same.

The coefficient of variation σm/Dc satisfying 0.0 to 0.3 means that the carbon black particles are uniformly dispersed because the variation in distance between the carbon black particles is small. As a result, the uneven shape of the domain caused by aggregates (secondary particles) of the carbon black particles can be suppressed. As a result, the electric field concentration can be suppressed.

The Dc of the electroconductive particles in the domain and the proportion of the cross-sections of the electroconductive particles with respect to the sectional area of the domain may be measured as described below. First, a thin piece of the electroconductive layer is produced. In order to suitably observe the matrix-domain structure, pretreatment, such as dyeing treatment and vapor deposition treatment, which enables the contrast between the electroconductive phase and the insulating phase to be suitably obtained, may be performed.

The thin piece subjected to formation of a fracture surface and the pretreatment may be observed with a scanning electron microscope (SEM) or a transmission electron microscope (TEM). In particular, from the viewpoint of the accuracy of quantification of the area of the domain that is the electroconductive phase, it is preferred to perform the observation with the SEM at a magnification of from 1,000 times to 100,000 times. The obtained observed image was binarized and analyzed through use of an image analysis device or the like, to thereby obtain the above-mentioned arithmetic average distance Dc and the above-mentioned proportion.

In addition, it is preferred that the outer shape of the domain be made closer to a sphere from the viewpoint of further reducing the electric field concentration between the domains. For this purpose, it is preferred to further reduce the domain diameter within the above-mentioned range. As a method therefor, there is given, for example, a method involving controlling the domain diameter of a CMB so as to reduce the domain diameter in a step of kneading a MRC and the CMB and phase-separating the MRC and the CMB, to thereby prepare a rubber composition in which the domains of the CMB are formed in the matrix of the MRC. When the domain diameter of the CMB is reduced, the total specific surface area of the CMB is increased, and the interface with the matrix is increased. Accordingly, a tension for reducing a tension acts on the interface of each of the domains of the CMB. As a result, the domains of the CMB each have an outer shape closer to a sphere.

Herein, with regard to factors for determining a domain diameter D in a matrix-domain structure which is formed when two kinds of immiscible polymers are melted and kneaded, Taylor's equation (equation (4)), Wu's empirical equations (equations (5) and (6)), and Tokita's equation (equation (7)) have been known (see Sumitomo Chemical's R & D Reports, 2003-II, 42).

Taylor's equation $$D = [C \cdot \sigma / \eta m \cdot \gamma] \cdot f(\eta m / \eta d) \qquad (4)$$

Wu's empirical equations $$\gamma \cdot D \cdot \eta m / \sigma = 4(\eta d / \eta m)^{0.84} \cdot \eta d / \eta m > 1 \qquad (5)$$

$$\gamma \cdot D \cdot \eta m / \sigma = 4(\eta d / \eta m)^{-0.84} \cdot \eta d / \eta m < 1 \qquad (6)$$

Tokita's equation $$D \cong \frac{12 \times P \times \sigma \times \phi}{\pi \times \eta \times \gamma}\left(1 + \frac{4 \times P \times \phi \times EDK}{\pi \times \eta \times \gamma}\right) \qquad (7)$$

In the equations (4) to (7), D represents the domain diameter (maximum Feret diameter Df) of the CMB, C represents a constant, σ represents an interfacial tension, ηm represents the viscosity of a matrix, and ηd represents the viscosity of each of domains. In addition, in the equation (7), γ represents a shear rate, η represents the viscosity of a mixed system, P represents a collision coalescence probability, φ represents a domain phase volume, and EDK represents domain phase cutting energy.

In addition, as can be seen from the equations (4) to (7), the control of, for example, the physical properties of the CMB and the MRC, and kneading conditions in the step (iii) is effective in reducing the domain diameter D of the CMB. Specifically, the control of the following four items (a) to (d) is effective:

(a) a difference between interfacial tensions σ of the CMB and the MRC;

(b) a ratio (ηm/ηd) between a viscosity (ηd) of the CMB and a viscosity (ηm) of the MRC;

(c) a shear rate (γ) at the time of kneading of the CMB and the MRC and an energy amount (EDK) at the time of shearing in the step (iii); and (d) a volume fraction of the CMB with respect to a kneaded product of the CMB and the MRC in the step (iii).

(a) Interfacial Tension Difference Between CMB and MRC

In general, when two kinds of immiscible rubbers are mixed with each other, phase separation occurs. The reason for this is as described below. The interaction between similar polymers is stronger than that between dissimilar polymers, and hence the similar polymers are aggregated with each other to decrease free energy, thereby being stabilized. The interface of a phase separation structure is brought into contact with the dissimilar polymers, and hence the free energy thereof becomes higher than that of the inside that is stabilized due to the interaction between the similar polymers. As a result, an interfacial tension for reducing an area that is brought into contact with the dissimilar polymers is generated in order to reduce the free energy of the interface. When the interfacial tension is small, even the dissimilar polymers attempt to be uniformly mixed with each other in order to increase entropy. A uniformly mixed state refers to dissolution, and a solubility parameter (SP) value serving as a guideline for solubility and the interfacial tension tend to correlate with each other. Specifically, it is conceived that the interfacial tension difference between the CMB and the MRC correlates with an SP value difference between the CMB and the MRC. Accordingly, the difference can be controlled by changing the combination of the MRC and the CMB, particularly the combination of the first rubber and the second rubber.

Such rubbers that the absolute values of a difference between their solubility parameters (SP values) is 0.4 to 4.0 $(J/cm^3)^{0.5}$, particularly 0.4 to 3.0 $(J/cm^3)^{0.5}$ are preferably selected as the first rubber in the MRC and the second rubber in the CMB. When the difference falls within such ranges, a stable phase separation structure can be formed, and the domain diameter D of the CMB can be reduced.

<Method of Measuring SP Value>

The SP values of the first rubber and the second rubber contained in the MRC and the CMB, respectively, can be calculated with satisfactory accuracy by creating a calibration curve through use of a material having a known SP value. A catalog value of a material manufacturer may also be used as the known SP value. For example, the SP value of each of a NBR and a SBR is substantially determined from the content ratio of acrylonitrile or styrene independently of its molecular weight. Accordingly, the rubbers forming the matrix and the domains are each analyzed for the content ratio of acrylonitrile or styrene through use of an analysis procedure, such as pyrolysis gas chromatography (Py-GC) or solid-state NMR. Then, the SP value can be calculated based on the content ratio from a calibration curve obtained from a material having a known SP value. In addition, the SP value of an isoprene rubber is determined based on the structures of isomers, such as 1,2-polyisoprene, 1,3-polyisoprene, 3,4-polyisoprene, cis-1,4-polyisoprene, trans-1,4-polyisoprene, and the like. Accordingly, as in the SBR and the NBR, the SP value of the isoprene rubber can be calculated from the material having a known SP value by analyzing its isomer content ratio through, for example, the Py-GC and the solid-state NMR.

The SP value of the material having a known SP value is determined by the Hansen sphere method.

(b) Viscosity Ratio Between CMB and MRC

When the viscosity ratio ($\eta d/\eta m$) between the CMB and the MRC is closer to 1, the maximum Feret diameter of each of the domains can be reduced. The viscosity ratio between the CMB and the MRC may be adjusted by selecting the Mooney viscosity of each of the CMB and the MRC, or selecting the kind and blending amount of a filler. In addition, the viscosity ratio may be adjusted also by adding a plasticizer such as paraffin oil to such a degree as not to hinder the formation of the phase separation structure. In addition, the viscosity ratio may be adjusted by adjusting the temperature at the time of kneading. The viscosity of each of the CMB and the MRC is obtained by measuring a Mooney viscosity ML(1+4) at a rubber temperature at the time of kneading in accordance with JIS K6300-1:2013.

(c) Shear Rate at Time of Kneading of MRC and CMB and Energy Amount at Time of Shearing When the shear rate at the time of kneading of the MRC and the CMB is higher, and when the energy amount at the time of shearing is larger, the maximum Feret diameter Df of each of the domains can be reduced.

The shear rate may be increased by increasing the inner diameter of a stirring member, such as a blade or a screw, of a kneader to reduce a gap from the end surface of the stirring member to the inner wall of the kneader, or by increasing the rotation number of the stirring member. In addition, the energy amount at the time of shearing may be increased by increasing the rotation number of the stirring member, or by increasing the viscosity of each of the first rubber in the CMB and the second rubber in the MRC.

(d) Volume Fraction of Domains (Volume Fraction of CMB with Respect to Kneaded Product of CMB and MRC)

The volume fraction of a CMB with respect to a kneaded product of the CMB and a MRC correlates with the collision coalescence probability of the CMB with respect to the MRC. Specifically, when the volume fraction of the CMB with respect to the kneaded product of the CMB and the MRC is reduced, the collision coalescence probability of the CMB with respect to the MRC is decreased. That is, the size of the domain can be reduced by reducing the volume fraction of the domains in the electroconductive layer within a range in which the required electroconductivity is obtained.

<Method of identifying Matrix-domain (M-D) Structure>

The matrix-domain structure according to this aspect may be identified by, for example, the following method. That is, a thin piece of the electroconductive layer is cut out from the electroconductive layer to produce an observation sample. Examples of means for cutting out the thin piece include a razor, a microtome, and a FIB.

The observation sample is subjected to treatment (e.g., dyeing treatment or vapor deposition treatment) that can easily distinguish the matrix from the domains, as required. Then, the observation sample is observed with a laser microscope, a SEM, or a TEM.

<Method of Measuring Perimeter, Envelope Perimeter, and Maximum Feret Diameter and Average Thereof of Domain, and Number of Domains and Average Number Thereof>

A method of measuring a perimeter, an envelope perimeter, and a maximum Feret diameter of the domain, and the number of domains according to this aspect may be performed, for example, as described below.

First, a cut piece is produced by the same method as the above-mentioned method in the measurement of the volume resistivity of a matrix. Then, a thin piece having a fracture surface may be formed by means, such as a lower freeze fracture method, a cross polisher method, or a focused ion beam (FIB) method. The FIB method is preferred in consideration of the smoothness of the fracture surface and the pretreatment for observation. In addition, in order to suitably observe the matrix-domain structure, pretreatment, such as dyeing treatment and vapor deposition treatment, which enables the contrast between the electroconductive phase and the insulating phase to be suitably obtained, may be performed.

The thin piece subjected to the formation of a fracture surface and the pretreatment may be observed with the SEM or the TEM. In particular, from the viewpoint of the accuracy of quantification of a perimeter, an envelope perimeter, and a maximum Feret diameter of the domain, it is preferred to perform the observation with the SEM at a magnification of from 1,000 times to 100,000 times.

The perimeter, envelope perimeter, and maximum Feret diameter of the domain, and the number of domains may be measured by quantifying the taken image in the foregoing. The fracture surface image obtained by the observation with the SEM is subjected to 8-bit gray scaling through use of image processing software such as product name: Image-Pro Plus (manufactured by Planetron Inc.) to obtain a monochrome image with 256 levels of gray. Next, the black and white of the image are subjected to inversion processing so that the domain in the fracture surface becomes white and binarized. Then, the perimeter, the envelope perimeter, the maximum Feret diameter, and the number of domains may be calculated from each of the domain groups in the image.

For the above-mentioned measurement, when the length of the electroconductive layer of the electrophotographic electroconductive member in a longitudinal direction is represented by L, cut pieces are cut out from three points in total of the sample including the center of the electroconductive layer in the longitudinal direction and two points of L/4 from both ends of the electroconductive layer to the center. The direction of cutting out the cut pieces is a direction corresponding to a cross-section perpendicular to the longitudinal direction of the electroconductive layer.

The shape of the domain in the cross-section perpendicular to the longitudinal direction of the electroconductive layer is evaluated as described above for the following reason. FIG. 6A and FIG. 6B are each a view for illustrating an electroconductive member 61 as a three-dimensional shape of three axes, specifically, an X-axis, a Y-axis, and a Z-axis. In FIG. 6A and FIG. 6B, the X-axis indicates the direction parallel to the longitudinal direction (axial direction) of the electrophotographic electroconductive member, and the Y-axis and the Z-axis each indicate the direction perpendicular to the axial direction of the electrophotographic electroconductive member.

FIG. 6A is an image view for illustrating a state in which the electrophotographic electroconductive member is cut out in a cross-section 62a parallel to an XZ-plane 62. The XZ-plane can be rotated by 360° about the axis of the electrophotographic electroconductive member. In consideration of the fact that the electrophotographic electroconductive member is brought into abutment against a photosensitive drum to be rotated and is discharged when passing through a gap with the photosensitive drum, the cross-section 62a parallel to the XZ-plane 62 indicates a plane on which discharge occurs simultaneously at certain timing. Accordingly, when the plane corresponding to a certain amount of the cross-section 62a passes through the gap, a surface potential of the photosensitive drum is formed.

Due to the discharge, which is locally large, caused by the electric field concentration in the electrophotographic electroconductive member, the discharge on the surface of the photosensitive drum is locally increased to form fogging, and hence it is required to perform evaluation involving the correlation with the surface potential of the photosensitive drum, which is formed when a set of the cross-sections 62a passes through the gap instead of one sheet of a certain amount of the cross-section 62a. Accordingly, it is required to perform evaluation in cross-sections (63a to 63c) parallel to a YZ-plane 63 perpendicular to the axial direction of the electrophotographic electroconductive member in which the shape of the domain including a certain amount of the cross-section 62a can be evaluated, instead of the analysis of the cross-section on which discharge occurs simultaneously at a certain moment as in the cross-section 62a. Regarding the cross-sections 63a to 63c, when the length of the electroconductive layer in the longitudinal direction is represented by L, three cross-sections in total including the cross-section 63b at the center of the electroconductive layer in the longitudinal direction and two cross-sections (63a and 63c) of L/4 from both ends of the electroconductive layer to the center are selected.

In addition, regarding the observation position of a cut piece cross-section from each of the cross-sections 63a to 63c, a 15-micrometer square observation region is set at each of arbitrary three points of a thickness region having a depth of 0.1T to 0.9T from the outer surface of each of the cut pieces with respect to the thickness T of the electroconductive layer, and measurement may be performed at nine points in total. An average value of the respective values indicates an average value of the observation regions at the nine points.

<Surface Layer>

The surface layer contains an electronic electroconductive agent. It is preferred that the surface layer be formed so that the electronic electroconductive agent is dispersed to be contained in a binder resin also from the viewpoint of physical durability of the surface layer because the dispersion sufficiently proceeds. As required, the surface layer may contain roughening particles, a surface release agent, and the like.

<Electronic Electroconductive Agent>

Examples of the electronic electroconductive agent contained in the surface layer may include electroconductive particles, for example, carbon black, metal oxide-based electroconductive particles, such as titanium oxide, tin oxide, and zinc oxide, and metal-based electroconductive particles, such as aluminum, iron, copper, and silver. Those electroconductive particles may be used alone or in combination thereof. In addition, as the electroconductive particles, composite particles in which silica particles are covered with electroconductive particles may also be used. As the electroconductive particles to be used in the surface layer, carbon black is preferred. Carbon black has a low specific gravity and high electroconductivity, and hence sufficient electroconductivity as the surface layer can be ensured by adding a small amount of carbon black to the binder resin. In the present disclosure, it is preferred to keep the hardness of the surface layer to be low hardness, and hence carbon black suitable for addition in a small amount is preferred.

<Binder Resin>

As the binder resin, a known binder resin may be used. Examples thereof may include various synthetic resins, and rubbers, such as natural rubbers, natural rubbers subjected to vulcanization, and synthetic rubbers. As the binder resin, there may be used, for example, a fluorine resin, a polyamide resin, an acrylic resin, a polyurethane resin, a silicone resin, a butyral resin, a styrene-ethylene-butylene-olefin copolymer, and an olefin-ethylene-butylene-olefin copolymer. The binder resin of the present disclosure is preferably free of an ether bond, such as polyethylene oxide or polypropylene oxide. This is because an ether-based urethane resin can reduce the universal hardness but is not suitable as the binder resin of the present disclosure because the volume resistivity of the resin is lowered. The binder resin may be used alone or in combination thereof. The binder resin is particularly preferably a resin having a polycarbonate structure out of those resins in order to achieve both the flexibility by reducing the universal hardness of the surface layer and an increase in resistance of the surface layer. The polycarbonate structure has low polarity, and hence the volume resistivity of the binder resin itself can be maintained to be high. Specifically, a polycarbonate-based polyurethane obtained by copolymerizing a polycarbonate polyol and a polyisocyanate is preferred.

Examples of the polycarbonate polyol include polynonamethylene carbonate diol, poly(2-methyl-octamethylene) carbonate diol, polyhexamethylene carbonate diol, polypentamethylene carbonate diol, poly(3-methylpentamethylene) carbonate diol, polytetramethylene carbonate diol, polytrimethylene carbonate diol, poly(1,4-cyclohexanedimethylene carbonate) diol, poly(2-ethyl-2-butyl-trimethylene) carbonate diol, and random/block copolymers thereof.

The polyisocyanate is selected from known compounds which are generally used, and examples thereof include toluene diisocyanate (TDI), diphenylmethane diisocyanate (MDI), polymeric diphenylmethane polyisocyanate, hydrogenated MDI, xylylene diisocyanate (XDI), hexamethylene diisocyanate (HDI), and isophorone diisocyanate (IPDI). Of those, aromatic isocyanates, such as toluene diisocyanate (TDI), diphenylmethane diisocyanate (MDI), and polymeric diphenylmethane polyisocyanate, are more suitably used.

<Universal Hardness of Surface Layer>

In order to suppress the generation itself of dirt substances, it is effective not to cause cracking or deformation in toner. For this purpose, it is preferred that the surface layer be flexible. As a guideline of the hardness of the electrophotographic electroconductive member of the present disclosure, it is preferred that the "universal hardness (t=1 μm position)" at a position of a depth of 1 μm from the surface of the surface layer be 1.0 to 7.0 N/mm$^2$. The size of each of the external additive and the toner is on the order of submicron to several microns, and hence it is preferred to control the hardness in the immediate vicinity of the outer surface of the surface layer, which is the contact surface with the external additive and the toner. Specifically, when the universal hardness of the surface at the time when an indenter is pushed in by 1 μm from the outer surface of the surface layer is set to 1.0 N/mm$^2$ or more, it is possible to suppress the occurrence of image density unevenness derived from the deformation of the charging roller that occurs when the charging roller and the electrophotographic photosensitive member are brought into abutment against each other in a stationary state for a long period of time. In addition, the deformation and cracking of the toner can be suppressed by setting the universal hardness to 7.0 N/mm$^2$ or less, and hence the absolute amounts of atypical toner and pulverized toner remaining on the photosensitive member can be suppressed more securely. Further, when the universal hardness is set to 5.0 N/mm$^2$ or less, the surface layer is deformed following the dirt substances. Because of this, the contact points between the protrusions caused by the electroconductive particles exposed to the surface of the surface layer and the dirt substances are increased, and the injection efficiency of electrons from the protrusions into the dirt substances is improved.

The universal hardness of the surface of the surface layer of the electrophotographic electroconductive member serving as the charging roller is measured through use of, for example, a universal hardness meter (product name: Fischerscope HM2000XYp, manufactured by Fischer Instruments K.K.). The universal hardness is a physical property value determined by pushing an indenter into an object to be measured while applying a load, and is determined as "(test load)/(surface area of indenter under test load) (N/mm$^2$)". An indenter having a shape of, for example, a quadrangular pyramid is pushed into the object to be measured while a predetermined relatively small test load is applied, and the surface area in contact with the indenter is determined from the pushing depth at the time when the predetermined pushing depth is reached, to thereby determine the universal hardness from the above-mentioned expression.

<Protrusion on Surface Layer derived from Electronic Electroconductive Agent>

Figure 9:
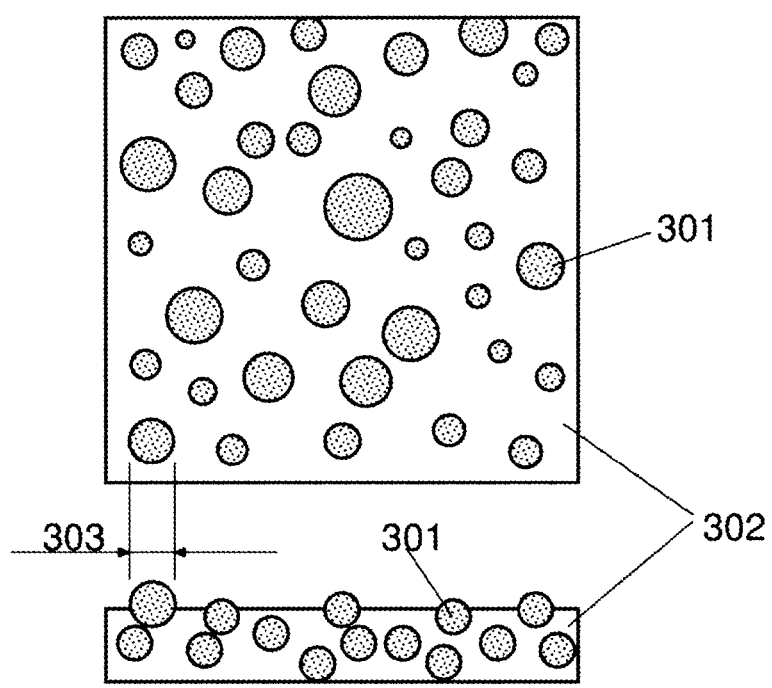
FIG. 9 is a conceptual view for illustrating a size of a protrusion on a surface layer.

In order to inject electric charge into dirt substances, it is preferred that protrusions derived from exposed portions of the electronic electroconductive agent (electroconductive particles) be present on the surface of the surface layer. The size of each of the protrusions derived from the exposed portions of the electroconductive particles is preferably 5.0 to 100.0 nm. When the size is set to 5.0 nm or more, the protrusions can function as starting points for more efficiently injecting electric charge into the dirt substances. In addition, when the size is set to 100.0 nm or less, the excessive injection of electric charge into the photosensitive member can be suppressed. As illustrated in FIG. 9, the size of each of the protrusions means an average value (number average particle diameter) of particle diameters 303 of electroconductive particles 301 in portions exposed from a binder resin 302. As a method of measuring the protrusion size, an image of an arbitrary 2-micrometer square region is taken through use of the SEM, and 20 particles randomly selected from the obtained image are each measured for a particle diameter, to determine an arithmetic average particle diameter.

In addition, in order to inject electric charge into the dirt substances through use of the protrusions derived from the electroconductive fine particles, it is effective to control the number of the protrusions. The number of the protrusions derived from the exposed portions of the electroconductive fine particles is preferably 50 to 500 in a region of 2.0 μm in length and 2.0 μm in width (region of 4.0 μm$^2$). When the number is set to 50 or more, the number of the protrusions as the starting points for injecting electric charge into the dirt substances can be ensured. In addition, when the number is set to 500 or less, the injection of electric charge into the photosensitive member can be suppressed. The number of the protrusions may be calculated by taking an image of an arbitrary 2-micrometer square region with a scanning electron microscope (SEM) and calculating the number of electroconductive points from the image after binarization.

Next, a procedure for exposing the electroconductive fine particles to the surface of the surface layer is described. When the surface layer is formed on the electroconductive layer of the electrophotographic electroconductive member by a dip coating method, a skin layer is always formed on the outermost surface of the surface layer. Because of this, in order to expose the electroconductive particles to the surface of the surface layer to cause the exposed portions to generate protrusions on the surface of the surface layer, it is effective to remove the skin layer on the outermost surface. For example, the surface skin layer formed of a binder resin is removed by performing UV treatment, a polishing method, an electrolytic polishing method, a chemical polishing method, an ion milling method, or the like. Thus, the electroconductive particles can be exposed to the surface of the surface layer. In the present disclosure, the hardness of the surface layer is low, and hence the skin layer can be sufficiently removed to expose the electroconductive fine particles to the surface of the surface layer even by performing the UV treatment. The UV treatment is preferred as compared to the polishing method and the like because the electroconductive particles can be exposed to the surface of the surface layer while the damage to the surface layer is minimized.

The exposed state of the electroconductive fine particles may be recognized with an atomic force microscope (AFM). A height image is acquired in a tapping mode of the AFM. In this case, the portions derived from the exposed portions of the electroconductive fine particles are recognized as protrusions. When a height image is acquired under a state in which the skin layer after the dip coating is present, the protrusions are not recognized. Further, a phase image is acquired in the tapping mode of the AFM. In this case, due to the small phase shift of the electroconductive fine particles and the hardness difference between the binder resin and the electroconductive fine particles, an image having a significantly large density contrast difference is obtained. When a phase image is acquired under a state in which the skin layer after the dip coating is present, an image having a significantly small number of phase differences and a low contrast difference is acquired.

<Roughening Particles>

The surface layer may contain roughening particles to the extent that the effects of the present disclosure are not impaired. Examples of the roughening particles include: organic insulating particles, such as an acrylic resin, a polycarbonate resin, a styrene resin, a urethane resin, a fluorine resin, and a silicone resin; and inorganic insulating particles, such as titanium oxide, silica, alumina, magnesium oxide, strontium titanate, barium titanate, barium sulfate, calcium carbonate, mica, zeolite, and bentonite. In the present disclosure, it is preferred to use organic insulating particles having flexibility as roughening particles because the surface layer is deformed to increase contact opportunities with respect to dirt substances, such as an external additive and toner. Those particles may be used alone or in combination thereof. The number average particle diameter of the roughening particles is not particularly limited, but is about 3 to about 30 µm.

<Ionic Electroconductive Agent>

The surface layer may contain an ionic electroconductive agent to the extent that the effects of the present invention are not impaired. It is required that the surface layer contain an electronic electroconductive agent having satisfactory responsiveness from the viewpoint of transporting electric charge to be supplied to the adhering dirt from the electroconductive layer, but an ionic electroconductive agent having relatively low (slow) responsiveness may be added in an auxiliary manner. With this configuration, the electric charge that can be supplied to the dirt on the surface includes, at a certain moment, a combination of electric charge instantly transported from the electroconductive layer by the electronic electroconductive agent, and electric charge transported later by the ionic electroconductive agent after leaving the electroconductive layer shortly before. Accordingly, when the electronic electroconductive agent mainly transports the electric charge, the risk of supply shortage of electric charge is further reduced. The ionic electroconductive agent is not particularly limited as long as the ionic electroconductive agent exhibits ionic electroconductivity, and examples thereof include: inorganic ionic substances, such as lithium perchlorate, sodium perchlorate, and calcium perchlorate; quaternary ammonium salts, such as lauryltrimethylammonium chloride, stearyltrimethylammonium chloride, and tetrabutylammonium perchlorate; and inorganic salts of organic acids, such as lithium trifluoromethanesulfonate and potassium perfluorobutanesulfonate.

Those ionic electroconductive agents may be used alone or in combination thereof.

Of the ionic electroconductive agents, an ionic electroconductive agent having a functional group that forms a bond easily with a material forming the surface layer is preferred because the ionic electroconductive agent is immobilized in the surface layer, and hence the characteristics are easily maintained for a long period of time. As an example, there is given an ionic electroconductive agent having a OH group when the ionic electroconductive agent has a urethane bond in the surface layer. It is more preferred that an imidazolium structure be contained in the structure of the ionic electroconductive agent. The electric charge is easily delocalized on an imidazolium ring, and the uneven distribution of electric charge is less liable to occur in the structure. Accordingly, uniform electric charge transfer in the surfaces layer and more uniform electric charge supply to the dirt can be expected. The ionic electroconductive agent is used in an auxiliary role of the electronic electroconductive agent, and hence the amount of the ionic electroconductive agent is smaller than that of the electronic electroconductive agent forming the surface layer, and is preferably 0.01 to 5.0 parts by mass with respect to 100 parts by mass of the binder resin. The amount of the ionic electroconductive agent is further preferably 0.01 to 2.0 parts by mass.

<Other Additive>

Any other additive may be added to the surface layer, as required, to the extent that the effects of the present disclosure are not impaired. As the additive, a chain extender, a cross-linking agent, a pigment, a silicone additive, an amine and a tin complex each serving as a catalyst, and the like may be added. When the silicone additive is added to the surface layer, the resistance of the surface layer is increased and slipperiness is imparted to the surface layer to suppress the injection of electric charge into the photosensitive member and improve the wear resistance of the surface layer. Accordingly, it is particularly preferred that the silicone additive be added.

<Thickness of Surface Layer>

It is preferred that the surface layer have a thickness of 0.1 to 100 µm. The thickness is more preferably 1 to 50 µm. The thickness of the surface layer may be measured by cutting out a roller cross-section with a sharp blade and observing the roller cross-section with an optical microscope or an electron microscope.

<Volume Resistivity of Surface Layer>

The volume resistivity of the surface layer of the electrophotographic electroconductive member serving as the charging roller is preferably $1.0 \times 10^{10}$ to $1.0 \times 10^{16}$ Ω·cm. When the electrophotographic electroconductive member is used as the charging roller, it is preferred to set the volume resistivity of the surface layer to a large value. It has been recognized that, when the volume resistivity of the surface layer is small, the dirt substances do not easily return to the photosensitive member, and the adhesion amount of the dirt substances deposited on the charging roller is increased. The inventors have conceived that the foregoing suggests the following. When the negatively charged dirt substances are brought into direct contact with the surface layer, in particular, the binder resin in which the electroconductive particles are not exposed to the surface, the negative electric charge of the dirt substances moves to the surface layer side of the charging roller, and the negative electric charge of the dirt substances is attenuated. In order to suppress the attenuation of the negative electric charge of the dirt substances, it is preferred that the surface layer have high resistance, and for this purpose, the volume resistivity of the surface layer is set to $1.0 \times 10^{10}$ Ω·cm or more. In addition, it has been recognized that, when the volume resistivity of the surface layer is low, the electric charge is injected from the charging roller into the photosensitive member. This phenomenon becomes remarkable when the hardness of the surface layer is low and further when a peripheral speed difference is provided between the charging roller and the photosensitive member. At the time of actual image output, the injection charge quantity is added to the charge quantity caused by discharge, and hence it becomes difficult to stably keep the surface potential of the photosensitive member when the injection charge quantity is large. The guideline for the injection charge quantity for maintaining the output at a stable image density is 50 V or less, and for this purpose, the volume resistivity of the surface layer is preferably set to $1.0 \times 10^{12}$ Ω·cm or more.

In addition, when the volume resistivity of the surface layer is high, the discharge becomes unstable as the charging roller, and hence the volume resistivity of the surface layer is set to $1.0 \times 10^{16}$ Ω·cm or less. The injection charge quantity from the charging roller into the photosensitive member may be estimated, for example, as described below. The surface potential of the photosensitive member at the time when a voltage (e.g., DC −500 V) is applied to the charging roller under the condition that the charging roller is not discharged is measured under a high-temperature and high-humidity environment (temperature: 30° C., relative humidity: 80%) in which the injection charge quantity is increased. For measurement of the volume resistivity of the surface layer, the measurement value measured in an electroconductive mode with an atomic force microscope (AFM) may be adopted. A sheet is cut out from the surface layer of the charging roller through use of a manipulator, and one surface of the surface layer is subjected to metal vapor deposition. A DC power source is connected to the surface subjected to metal vapor deposition, and a voltage is applied. A free end of a cantilever is brought into contact with the other surface of the surface layer, and a current image is obtained through an AFM main body. Current values at 100 randomly selected points on the surface are measured, and the volume resistivity may be calculated from an average current value of the top 10 measured low current values, an average thickness, and a contact area of the cantilever.

<Method of producing Surface Layer>

A method of forming the surface layer is not particularly limited, but examples thereof include spraying with a coating material in which a solvent is added to a raw material, dipping (dip coating method), and roll coating. The dip coating method is simple and excellent in production stability as the method of forming the surface layer. In addition, after the coating, additional treatment such as heating is performed as required.

<Use as Developing Member>

The electrophotographic electroconductive member is also effective when used as a developing member.

When the electrophotographic electroconductive member according to Japanese Patent Application Laid-Open No. 2002-3651 is used as a developing member in a high-speed process, the electric charge transfer from the support to the surface of the electrophotographic electroconductive member becomes non-uniform, and the amount of electric charge applied to the toner varies. As a result, it becomes difficult to achieve uniform development, and for example, a fogging image in which toner having a low charge quantity appears in an image may occur. According to the present disclosure, a developing process in which the variation in charge quantity of toner is significantly small can be maintained for a long period of time.

When the electrophotographic electroconductive member is used as a developing member, the surface layer is characterized by having a volume resistivity under an environment having a temperature of 23° C. and a relative humidity of 50% of from $1.0 \times 10^4$ Ωcm to $1.0 \times 10^{15}$ Ωcm. The surface layer has a function of applying triboelectric charging to the toner, and also has a function of protecting the surface of the developing member and suppressing wear and failure of the surface of the developing member. The volume resistivity of the surface layer may be adjusted by adding an electronic electroconductive agent or an ionic electroconductive agent to the resin component serving as a binder. The binder resin functions as a carrier for an electronic electroconductive agent, an ionic electroconductive agent, a filler, and an additive.

Known resins may be used as the binder resin component and is not particularly limited, but examples thereof include the following resins. Those resins may be used alone or in combination thereof.

Specific examples thereof include a polyurethane resin, a polyester resin, a polyether resin, an acrylic resin, an epoxy resin, an amino resin such as melamine, an amide resin, an imide resin, an amide imide resin, a phenol resin, a vinyl resin, a silicone resin, a fluorine resin, a polyalkylene imine resin, and a polycarbonate resin.

A polyurethane resin is particularly preferred from the viewpoints of film strength and toner chargeability. Of those, a thermosetting polyether polyurethane resin, a polyester polyurethane resin, and a polycarbonate resin are suitably used because the resins also have flexibility. Those thermosetting polyurethane resins are each obtained by a reaction between a known polyether polyol, polyester polyol, or polycarbonate polyol and an isocyanate compound.

Examples of the polyether polyol include polyethylene glycol, polypropylene glycol, and polytetramethylene glycol.

In addition, examples of the polyester polyol include polyester polyols each obtained by a condensation reaction between a diol component, such as ethylene glycol, 1,2-propanediol, 1,4-butanediol, 1,6-hexanediol, 3-methyl-1,4-pentanediol, or neopentyl glycol, or a triol component such as trimethylolpropane, and a dicarboxylic acid, such as succinic acid, adipic acid, phthalic anhydride, terephthalic acid, or hexahydroxyphthalic acid.

In addition, examples of the polycarbonate polyol include polycarbonate polyols each obtained by a condensation reaction between a diol component, such as 1,3-propanediol, 1,4-butanediol, 1,6-hexanediol, 1,8-octanediol, 1,9-nonanediol, 2-methyl-1,8-octanediol, 3-methyl-1,5-pentanediol, diethylene glycol, polyethylene glycol, polypropylene glycol, or polytetramethylene glycol, and phosgene, a dialkyl carbonate such as or dimethyl carbonate, or a cyclic carbonate such as ethylene carbonate.

Those polyol components may each form a prepolymer having a chain extended in advance with an isocyanate, such as 2,4-tolylene diisocyanate (TDI), 1,4diphenylmethane diisocyanate (MDI), or isophorone diisocyanate (IPDI), as required.

The isocyanate compound to be subjected to a reaction with each of those polyol components is not particularly limited, but there may be used, for example: aliphatic polyisocyanates, such as ethylene diisocyanate and 1,6-hexamethylene diisocyanate (HDI); alicyclic polyisocyanates, such as isophorone diisocyanate (IPDI), cyclohexane 1,3-diisocyanate, and cyclohexane 1,4-diisocyanate; aromatic isocyanates, such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate, and naphthalene diisocyanate; and copolymers, isocyanurates, TMP adducts, biurets, and blocks thereof.

Of those, aromatic isocyanates, such as tolylene diisocyanate, diphenylmethane diisocyanate, and polymeric diphenylmethane diisocyanate, are more suitably used.

The mixing ratio of the isocyanate compound to be subjected to a reaction with the polyol component is preferably such that the ratio of the isocyanate group falls within a range of from 1.0 to 2.0 with respect to 1.0 of a hydroxy group because residual unreacted components can be suppressed.

When a urethane resin is used as the binder resin for the surface layer, the urethane group concentration is preferably 1.5 to 6.5%.

When the electrophotographic electroconductive member (developing member) is subjected to a long-term durability test alternately under a high-temperature and high-humidity environment and a low-temperature and low-humidity environment in an electrophotographic image forming apparatus, an image defect caused by failure in the vicinity of the surface of the electrophotographic electroconductive member may occur.

As a result of the investigations made by the inventors, regarding the failure in the vicinity of the surface of the electrophotographic electroconductive member, it has been recognized that, when the electrophotographic electroconductive member is placed alternately under a high-temperature and high-humidity environment and a low-temperature and low-humidity environment, the surface layer is repeatedly expanded and contracted, and minute cracks may be generated in the vicinity of the interface between the surface layer and the electroconductive layer. It is estimated that the minute cracks cause the failure in the vicinity of the surface of the electrophotographic electroconductive member in a long-term durability test.

A case in which the urethane group concentration is 1.5% or more is preferred from the viewpoint of durability because the film strength of the surface layer is high by virtue of the interaction between the urethane groups. In addition, when the urethane group concentration is 6.5% or less, there are few excessive urethane groups serving as affinity sites with water molecules. Accordingly, even when the electrophotographic electroconductive member is used alternately under a high-temperature and high-humidity environment and a low-temperature and low-humidity environment, failure caused by expansion/contraction does not easily occur, and high durability is obtained even in use under a severe environment.

A case in which the surface layer contains urethane resins having structures of the structural formulae (1) to (3) is particularly preferred because higher durability is obtained even in use under a severe environment.

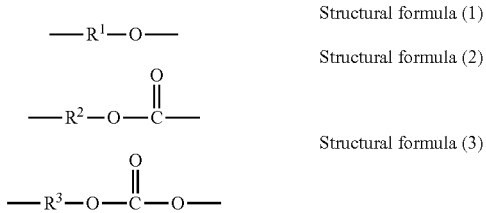

In the structural formulae (1) to (3), $R^1$ to $R^3$ each independently represent a divalent hydrocarbon group having a straight chain or a branched chain having 4 to 8 carbon atoms.

The structures of the structural formulae (1) to (3) specifically represent an ether structure, an ester structure, and a carbonate structure having a large number of carbon atoms, respectively. The resins containing those structures have a large number of carbon atoms, and hence the amounts of ether bonds, ester bonds, and carbonate bonds contained per unit weight are small. Accordingly, the affinity with water molecules in the resin is lowered, and the water content can be kept low even under a high-temperature and high-humidity environment.

In particular, it is preferred to subject the polyols having the structures of the structural formulae (1) to (3) to a reaction with an isocyanate compound to obtain desired urethane resins.

As a result, even when the electrophotographic electroconductive member is used alternately under a high-temperature and high-humidity environment and a low-temperature and low-humidity environment, the failure caused by the thermal expansion/contraction does not occur easily, and hence high durability is obtained even in use under a severe environment.

Examples of the polyol having the structure of the structural formula (1) include polytetramethylene glycol, polyhexamethylene glycol, polyoctamethylene glycol, and a ring-opening copolymerized polyol of tetrahydrofuran and 3-methyltetrahydrofuran.

Examples of the polyol having the structure of the structural formula (2) include polyester polyols each obtained by a condensation reaction between a diol component, such as 1,4-butanediol, 1,6-hexanediol, 1,8-octanediol, 3-methyl-1,4-pentanediol, or neopentyl glycol, or a triol component such as trimethylolpropane, and a dicarboxylic acid, such as adipic acid, pimelic acid, suberic acid, azelaic acid, or sebacic acid.

Examples of the polyol having the structure of the structural formula (3) include polycarbonate polyols each obtained by a condensation reaction between a diol component, such as 1,4-butanediol, 1,6-hexanediol, 1,8-octanediol, 3-methyl-1,4-pentanediol, or neopentyl glycol, and phosgene or a dialkyl carbonate such as dimethyl carbonate.

In addition to the thermosetting reaction using an isocyanate compound, a compound having a vinyl group or an acryloyl group introduced to the terminal instead of the polyol may also be cured by UV light or an electron beam. In a curing system using UV light or an electron beam, a curing reaction can be performed in a shorter period of time as compared to the curing system using an isocyanate.

The surface layer contains an electronic electroconductive agent as described above. Of those, carbon black is preferred because carbon black is relatively easily available, and satisfactory electroconductivity is obtained. When carbon black is used as the electronic electroconductive agent, it is preferred to blend carbon black in an amount of from 2 parts by mass to 50 parts by mass with respect to 100 parts by mass of the binder resin.

As an electroconductive agent, an ionic electroconductive agent may be used in combination with the above-mentioned electronic electroconductive agent.

As the ionic electroconductive agent, for example, a quaternary ammonium salt, an imidazolium salt, a pyridinium salt, a sulfonium salt, or a phosphonium salt may be used. As an anion of the ionic electroconductive agent, there are given, for example, a perchlorate anion, a fluoroalkyl sulfonyl imide anion, a fluorosulfonyl imide anion, a trifluoromethanesulfonate anion, a tetrafluoroborate anion, a hexafluorophosphate anion, a dicyanamide anion, a thiocyanate anion, and a dicyanosulfonyl imide anion. At least one kind thereof may be used.

The surface layer may contain a non-electroconductive filler, such as silica, quartz powder, titanium oxide, zinc oxide, or calcium carbonate, as required. When a method involving coating with a coating material is adopted in the formation of the surface layer, the non-electroconductive filler may be added to form a film forming aid. The content of the non-electroconductive filler is preferably 10 to 30 mass % with respect to 100 parts by mass of a resin component forming the surface layer, that is, a component obtained by combining a binder resin and a resin having the structure represented by the structural formula (1).

The electrophotographic electroconductive member may have appropriate surface roughness as required. When the electrophotographic electroconductive member is a developing roller or a developing sleeve, the surface roughness falls preferably within a range of from 2.0 μm to 10.0 μm, particularly preferably within a range of from 2.0 μm to 4.5 μm in terms of ten-point average roughness (Rz). When the electrophotographic electroconductive member is a developing blade, the surface roughness falls preferably within a range of from 0.0 μm to 6.0 μm, particularly preferably within a range of from 0.0 μm to 1.5 μm in terms of ten-point average roughness (Rz). When the surface roughness falls within the above-mentioned ranges, both the uniform contact with the toner and the appropriate toner conveyance amount are achieved, and electric charge can be easily supplied uniformly to the toner.

As a method of forming the surface roughness of the electrophotographic electroconductive member, there are given addition of fine particles to the surface layer, polishing, mold transfer, and laser treatment. When fine particles for controlling roughness are added, the fine particles preferably have a volume average particle diameter of from 3 μm to 20 μm. In addition, the amount of particles added to the surface layer is preferably from 1 part by mass to 50 parts by mass with respect to 100 parts by mass of the resin solid content of the surface layer. As the fine particles for controlling roughness, fine particles of a polyurethane resin, a polyester resin, a polyether resin, a polyamide resin, an acrylic resin, and a phenol resin may be used.

When the electrophotographic electroconductive member has a roller shape, as a method of molding the electroconductive layer, there is given the method similar to the method of producing a charging roller.

In addition, when the electrophotographic electroconductive member has a blade shape, as a molding method therefor, there are given methods involving performing die molding, injection molding, extrusion molding, and centrifugal molding.

A method of forming the surface layer is not particularly limited, but examples thereof include spraying with a coating material, dipping, and roll coating. A dip coating method involving causing a coating material to overflow from the upper end of a dipping tank as described in Japanese Patent Application Laid-Open No. S57-5047 is simple and excellent in production stability as the method of forming the surface layer.

<Process Cartridge>

Figure 7:
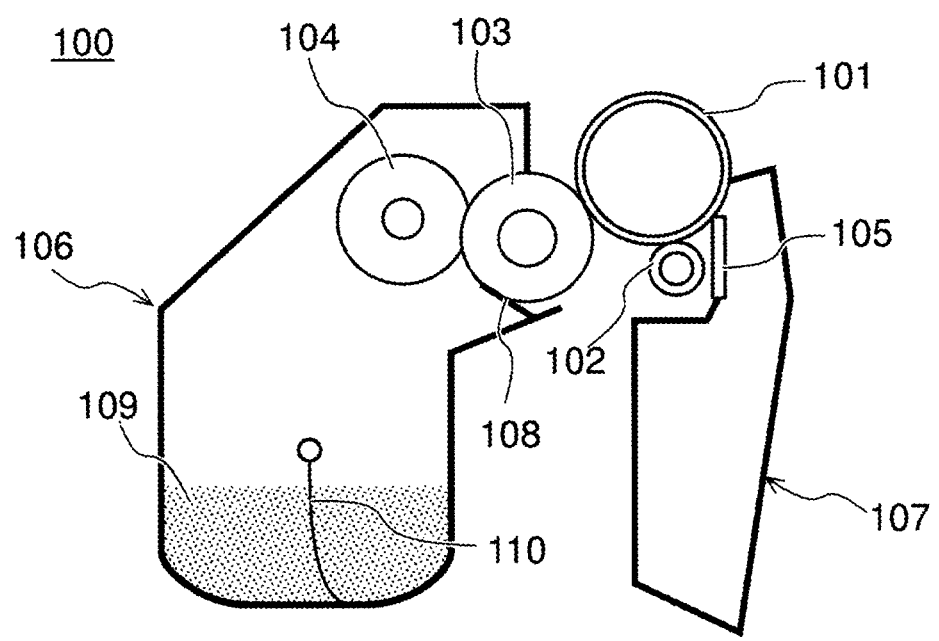
FIG. 7 is a sectional view of a process cartridge according to one embodiment of the present disclosure.

FIG. 7 is a schematic sectional view of a process cartridge 100 for electrophotography including the electrophotographic electroconductive member according to one embodiment of the present disclosure as a charging roller. The process cartridge is formed by integrating a developing device and a charging device so as to be detachably attachable to a main body of an electrophotographic image forming apparatus. The developing device is obtained by integrating at least a developing roller 103, a toner container 106, and a toner 109, and may include a toner-supplying roller 104, a developing blade 108, and a stirring blade 110 as required. The charging device is obtained by integrating at least a photosensitive drum 201 and a charging roller 102, and may include a cleaning blade 105 and a waste toner container 107. A voltage is applied to each of the charging roller 102, the developing roller 103, the toner-supplying roller 104, and the developing blade 108. In addition, the electrophotographic electroconductive member according to one embodiment of the present disclosure may be used as the developing roller, the developing blade, or the toner-supplying roller.

<Electrophotographic Image Forming Apparatus>

Figure 8:
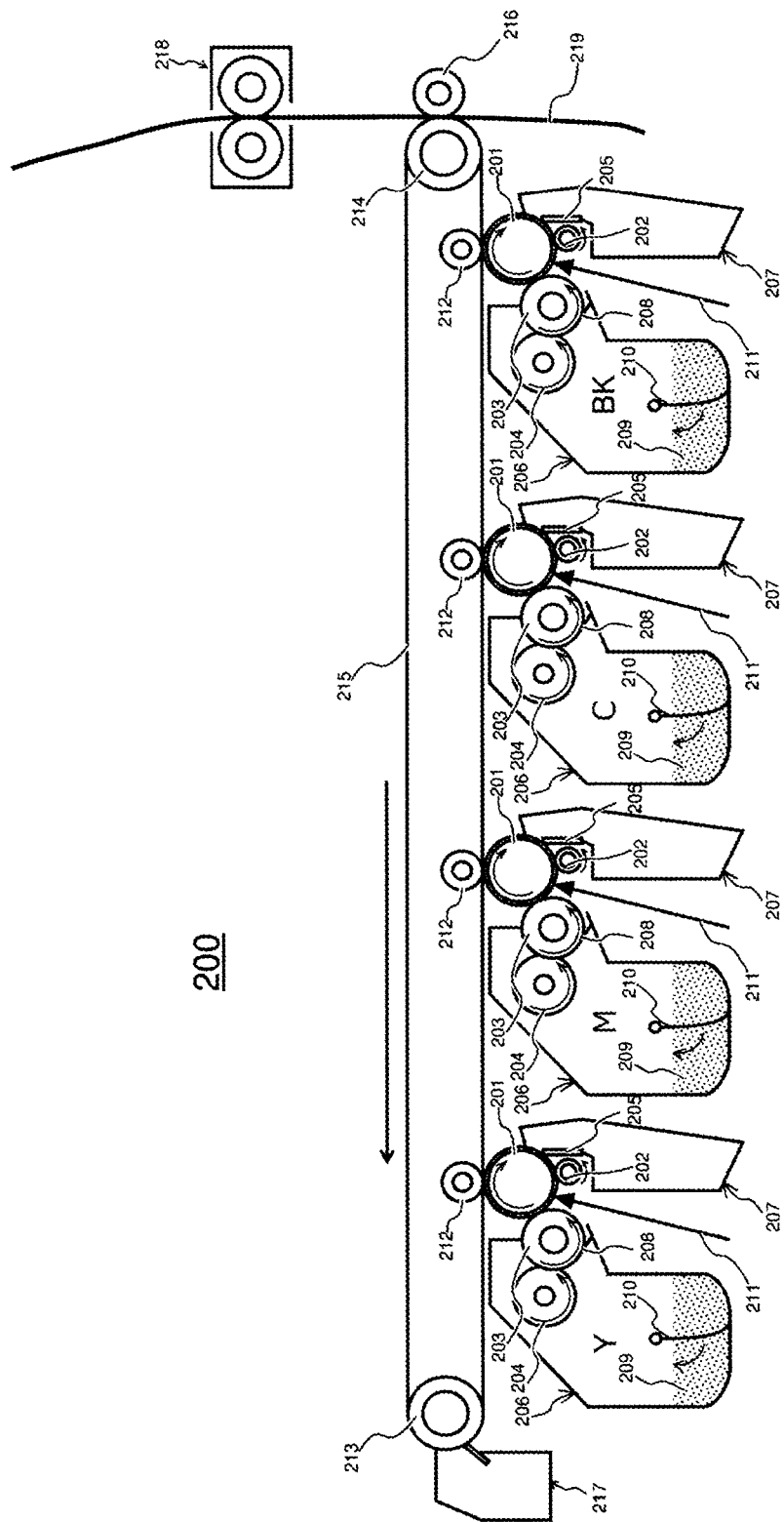
FIG. 8 is a sectional view of an electrophotographic image forming apparatus according to one embodiment of the present disclosure.

FIG. 8 is a schematic configuration view of an electrophotographic image forming apparatus 200 using the electrophotographic electroconductive member according to one embodiment of the present disclosure as a charging roller. The apparatus is a color electrophotographic apparatus in which the process cartridges 100 are mounted so as to be detachably attachable thereto. In the respective process cartridges, toners of respective colors of black, magenta, yellow, and cyan are used. A photosensitive drum 201 rotates in a direction indicated by the arrow, and is uniformly charged by a charging roller 202 to which a voltage has been applied from a charging bias power source, and an electrostatic latent image is formed on the surface thereof with exposure light 211. Meanwhile, a toner 209 stored in a toner container 206 is supplied by a stirring blade 210 to a toner-supplying roller 204 and conveyed onto a developing roller 203. The toner 209 is uniformly applied onto the surface of the developing roller 203 by a developing blade 208 arranged in contact with the developing roller 203, and electric charge is imparted to the toner 209 by triboelectric charging. The electrostatic latent image is provided with the toner 209 conveyed by the developing roller 203 arranged in contact with the photosensitive drum 101 and developed to be visualized as a toner image.

The visualized toner image on the photosensitive drum is transferred onto an intermediate transfer belt 215 by a primary transfer roller 212 to which a voltage has been applied by a primary transfer bias power source. The intermediate transfer belt 215 is driven while being supported by a tension roller 213 and an intermediate transfer belt-driving roller 214. The toner images of the respective colors are sequentially superimposed to form a color image on the intermediate transfer belt.

A transfer material 219 is fed into the apparatus by a sheet-feeding roller, and is conveyed into a space between the intermediate transfer belt 215 and a secondary transfer roller 216. A voltage is applied from a secondary transfer bias power source to the secondary transfer roller 216, and hence the color image on the intermediate transfer belt 215 is transferred onto the transfer material 219. The transfer material 219 having transferred thereonto the color image is subjected to fixation treatment by a fixing unit 218 and is delivered to the outside of the apparatus. Thus, a printing operation is completed.

Meanwhile, the toner remaining on the photosensitive drum without being transferred is scraped off by a cleaning blade 205 to be stored in a waste toner-storing container 207, and the cleaned photosensitive drum 201 repeats the above-mentioned steps. In addition, the toner remaining on the intermediate transfer belt 215 without being transferred is also scraped off by a cleaning device 217.

Although a color electrophotographic apparatus is shown as an example, in a monochrome electrophotographic apparatus (not shown), the process cartridge is only a product using black toner. A monochrome image is directly formed on the transfer material by the process cartridge and the primary transfer roller (without the secondary transfer roller) without using the intermediate transfer belt. After that, the transfer material is subjected to fixation by the fixing unit and is delivered to the outside of the apparatus. Thus, a printing operation is completed.

According to one aspect of the present disclosure, the electrophotographic electroconductive member capable of maintaining high image quality for a long period of time even in a high-speed process is obtained. In addition, according to other aspects of the present disclosure, the electrophotographic image forming apparatus capable of stably outputting a high-quality electrophotographic image and the process cartridge used in the electrophotographic image forming apparatus are obtained.

EXAMPLES

Raw materials used for producing electroconductive members for electrophotography according to Examples and Comparative Examples are described below.

<NBR>
  NBR (1) (product name: JSR NBR N230SV, acrylonitrile content: 35%, Mooney viscosity ML(1+4) 100° C.: 32, SP value: 20.0 $(J/cm^3)^{0.5}$, manufactured by JSR Corporation, abbreviation: N230SV)
  NBR (2) (product name: JSR NBR N215SL, acrylonitrile content: 48%, Mooney viscosity ML(1+4) 100° C.: 45, SP value: 21.7 $(J/cm^3)^{0.5}$, manufactured by JSR Corporation, abbreviation: N215SL)
  NBR (3) (product name: Nipol DN401LL, acrylonitrile content: 18.0%, Mooney viscosity ML(1+4) 100° C.: 32, SP value: 17.4 $(J/cm^3)^{0.5}$, manufactured by Zeon Corporation, abbreviation: DN401LL)

<Isoprene Rubber IR>
  Isoprene rubber (product name: Nipol 2200L, Mooney viscosity ML(1+4) 100° C.: 70, SP value: 16.5 $(J/cm^3)^{0.5}$, manufactured by Zeon Corporation, abbreviation: IR2200L)

<Butadiene Rubber BR>
  Butadiene rubber (1) (product name: UBEPOL BR130B, Mooney viscosity ML(1+4) 100° C.: 29, SP value: 16.8 $(J/cm^3)^{0.5}$, manufactured by Ube Industries, Ltd., abbreviation: BR130B)
  Butadiene rubber (2) (product name: UBEPOL BR150B, Mooney viscosity ML(1+4) 100° C.: 40, SP value: 16.8 $(J/cm^3)^{0.5}$, manufactured by Ube Industries, Ltd., abbreviation: BR150B)

<SBR>
  SBR (1) (product name: ASAPRENE 303, styrene content: 46%, Mooney viscosity ML(1+4) 100° C.: 45, SP value: 17.4 $(J/cm^3)^{0.5}$, manufactured by Asahi Kasei Corporation, abbreviation: A303)
  SBR (2) (product name: TUFDENE 2003, styrene content: 25%, Mooney viscosity ML(1+4) 100° C.: 33, SP value: 17.0 $(J/cm^3)^{0.5}$, manufactured by Asahi Kasei Corporation, abbreviation: T2003)
  SBR (3) (product name: TUFDENE 2100R, styrene content: 25%, Mooney viscosity ML(1+4) 100° C.: 78, SP value: 17.0 $(J/cm^3)^{0.5}$, manufactured by Asahi Kasei Corporation, abbreviation: T2100R)
  SBR (4) (product name: TUFDENE 2000R, styrene content: 25%, Mooney viscosity ML(1+4) 100° C.: 45, SP value: 17.0 $(J/cm^3)^{0.5}$ manufactured by Asahi Kasei Corporation, abbreviation: T2000R)
  SBR (5) (product name: TUFDENE 1000, styrene content: 18%, Mooney viscosity ML(1+4) 100° C.: 45, SP value: 16.8 $(J/cm^3)^{0.5}$, manufactured by Asahi Kasei Corporation, abbreviation: T1000)

<Chloroprene Rubber (CR)>
  Chloroprene rubber (product name: SKYPRENE B-31, Mooney viscosity ML(1+4) 100° C.: 40, SP value: 17.4 $(J/cm^3)^{0.5}$ manufactured by Tosoh Corporation, abbreviation: CR B31)

<EPDM>
  EPDM (product name: Esprene 505A, Mooney viscosity ML(1+4) 100° C.: 47, SP value: 16.0 $(J/cm^3)^{0.5}$, manufactured by Sumitomo Chemical Company, Limited, abbreviation: E505A)

<Electroconductive Particles>
  Carbon black (1) (product name: TOKABLACK 1:5500, DBP absorption amount: 155 $cm^3/100$ g, manufactured by Tokai Carbon Co., Ltd., abbreviation: #5500)
  Carbon black (2) (product name: TOKABLACK7360SB, DBP absorption amount: 87 $cm^3/100$ g, manufactured by Tokai Carbon Co., Ltd., abbreviation: #7360)
  Carbon black (3) (product name: TOKABLACK7270SB, DBP absorption amount: 62 $cm^3/100$ g, manufactured by Tokai Carbon Co., Ltd., abbreviation: #7270)
  Carbon black (4) (product name: Raven 1170, DBP absorption amount: 55 $cm^3/100$ g, manufactured by Columbia Chemical, abbreviation: R1170)
  Carbon black (5) (product name: MA100, DBP absorption amount: 95 $cm^3/100$ g, manufactured by Mitsubishi Chemical Corporation, abbreviation: MA100)

<Vulcanizing Agent>
  Vulcanizing agent (1) (product name: SULFAX PMC, sulfur content 97.5%, manufactured by Tsurumi Chemical Industry Co., Ltd., abbreviation: sulfur)

<Vulcanization Accelerator>
  Vulcanization accelerator (1) (product name: SANCELER TBZTD, tetrabenzylthiuram disulfide, manufactured by Sanshin Chemical Industry Co., Ltd., abbreviation: TBZTD)
  Vulcanization accelerator (2) (product name: NOCCELER TBT, tetrabutylthiuram disulfide, manufactured by Ouchi Shinko Chemical Industrial Co., Ltd., abbreviation: TBT)
  Vulcanization accelerator (3) (product name: NOCCELER EP-60, vulcanization accelerator mixture, manufactured by Ouchi Shinko Chemical Industrial Co., Ltd., abbreviation: EP-60)
  Vulcanization accelerator (4) (product name: SANTOCURE-TBSI, N-t-butyl-2-benzothiazole sulfene imide, manufactured by Flexsys, abbreviation: TBSI)
  Vulcanization accelerator (5) (product name: SANCELER 22-C, 2-imidazoline-2-thiol or 2-imidazolinethione, manufactured by Sanshin Chemical Industry Co., Ltd., abbreviation: SANCELER 22)
  Vulcanization accelerator (6) (product name: NOCCELER TRA, dipentamethylene thiuram tetrasulfide, manufactured by Ouchi Shinko Chemical Industrial Co., Ltd., abbreviation: TRA)

<Filler>
  Filler (1) (product name: NANOX #30, calcium carbonate, manufactured by Maruo Calcium Co., Ltd., abbreviation: #30)

The electrophotographic electroconductive members according to Examples and Comparative Examples are described below, but the technical scope of the present disclosure is not limited to the configurations embodied in Examples.

<Production of Electroconductive Roller 1>

[1-1. Preparation of Rubber Composition for Forming Domains (CMB)]

Respective materials of the kinds and amounts shown in Table 1 were mixed with a pressure kneader to obtain a rubber composition for forming domains (CMB). The mixing conditions were set to a filling ratio of 70 vol %, a blade rotation speed of 30 rpm, and 18 minutes.

TABLE 1

Raw materials for CMB

| | Name of raw material | Blending amount (parts by mass) |
|---|---|---|
| Second rubber | NBR (1) | 100 |
| Electroconductive particles | Carbon black (3) | 70 |
| Vulcanization accelerator aid | Zinc oxide (product name: zinc flower, manufactured by Sakai Chemical Industry Co., Ltd.) | 5 |
| Processing aid | Zinc stearate (product name: SZ-2000, manufactured by Sakai Chemical Industry Co., Ltd.) | 2 |

[1-2. Preparation of Rubber Composition for Forming Matrix (MRC)]

Respective materials of the kinds and amounts shown in Table 2 were mixed with a pressure kneader to obtain a rubber composition for forming a matrix (MRC). The mixing conditions were set to a filling ratio of 70 vol %, a blade rotation speed of 30 rpm, and 18 minutes.

TABLE 2

Raw materials for MRC

| | Name of raw material | Blending amount (parts by mass) |
|---|---|---|
| First rubber | SBR (2) | 100 |
| Filler | Calcium carbonate (product name: NANOX #30, manufactured by Maruo Calcium Co., Ltd.) | 40 |
| Vulcanization accelerator aid | Zinc oxide (product name: zinc flower, manufactured by Sakai Chemical Industry Co., Ltd.) | 5 |
| Processing aid | Zinc stearate (product name: SZ-2000, manufactured by Sakai Chemical Industry Co., Ltd.) | 2 |

[1-3. Preparation of Rubber Composition 1 for Forming Electroconductive Layer]

Respective materials of the kinds and amounts shown in Table 3 were mixed with an open roll to prepare a rubber composition for molding an electroconductive member. As a mixer, an open roll having a roll diameter of 12 inches was used. The mixing was performed under the following conditions: the mixture was bilaterally cut 20 times in total at a front roll rotation number of 10 rpm, a back roll rotation number of 8 rpm, and a roll gap of 2 mm, and was then subjected to tight milling 10 times at a roll gap of 1.0 mm.

TABLE 3

Rubber Composition 1 for forming Electroconductive Layer

| | Name of raw material | Blending amount (part(s) by mass) |
|---|---|---|
| Domain raw material | CMB of Table 1 | 25 |
| Matrix raw material | MRC of Table 2 | 75 |
| Vulcanizing agent | Vulcanizing agent (1) "sulfur" | 3 |
| Vulcanization accelerator 1 | Vulcanization accelerator (1) "TBZTD" | 1 |
| Vulcanization accelerator 2 | Vulcanization accelerator (4) "TBSP" | 0.5 |

[1-4. Formation of Electroconductive Layer]

A round bar having a total length of 252 mm and an outer diameter of 6 mm, in which the surface of free-cutting steel was subjected to electroless nickel plating, was prepared. Next, an adhesive (product name: METALOC U-20, manufactured by Toyokagaku Kenkyusho Co., Ltd.) was applied to the entire circumference within a range of 230 mm excluding 11 mm each from both end portions of the round bar through use of a roll coater to produce a support.

Next, a die having an inner diameter of 10.5 mm was attached to the tip of a crosshead extruder including a supply mechanism for the support and a discharge mechanism for an unvulcanized rubber roller. The temperature of each of the extruder and the crosshead was adjusted to 100° C., and the conveyance speed of the electroconductive support was adjusted to 60 mm/sec. Under the conditions, the rubber composition 1 for forming an electroconductive layer prepared in the section [1-3] was supplied from the extruder, and the outer peripheral portion of the support was covered with the rubber composition 1 for forming an electroconductive layer in the crosshead, to thereby obtain an unvulcanized rubber roller.

Next, the unvulcanized rubber roller was put into a hot air vulcanization furnace and heated at a temperature of 170° C. for 60 minutes to vulcanize the layer of the unvulcanized rubber composition, to thereby obtain a roller having an electroconductive resin layer formed on the outer peripheral portion of the support. After that, both end portions of the electroconductive resin layer were cut off by 10 mm each to set the length of an electroconductive resin layer portion in a longitudinal direction to 232 mm. Finally, the surface of the electroconductive resin layer was polished with a rotary grinding stone. As a result, an electroconductive roller 1 including an electroconductive layer 1 having a diameter of 9.65 mm at each position of 90 mm from the center portion to the both end portion side and a diameter of the center portion of 9.7 mm was produced.

<Production of Electroconductive Rollers 2 to 28>

[2-1. Preparation of Rubber Composition for Forming Domains]

[2-2. Preparation of Rubber Composition for Forming Matrix]

A rubber composition for forming domains and a rubber composition for forming a matrix for forming each of electroconductive layers 2 to 28 of electroconductive rollers 2 to 28 were prepared in the same manner as in the above-mentioned sections [1-1] and [1-2] except materials shown in Table 4-1 and Table 4-2 were used.

[2-3. Preparation of Rubber Compositions 2 to 28 for forming Electroconductive Layers]

Rubber compositions 2 to 28 for forming electroconductive layers were prepared in the same manner as the rubber composition 1 for forming an electroconductive layer except that the CMB shown in Table 4-1, the MRC shown in Table 4-2, and other materials were blended as shown in Table 4-3.

[2-4. Production of Electroconductive Rollers 2 to 28]

Electroconductive rollers 2 to 28 were produced in the same manner as in the above-mentioned section [1-4] except that the rubber compositions 2 to 28 for forming electroconductive layers were used.

TABLE 4-1

| | CMB for forming domains | | | | | | | | |
|---|---|---|---|---|---|---|---|---|---|
| | Second rubber | | | | Electroconductive particles | | | Zinc oxide | Zinc stearate |
| | | | | | | DBP | | | |
| Electroconductive layer | Kind of rubber | Abbreviation | Mooney viscosity | SP value | Number of parts | Abbreviation | Absorption amount | Number of parts | Number of parts | Number of parts |
| 1 | NBR | N2305V | 32 | 20.0 | 100 | #7270 | 62 | 70 | 5 | 2 |
| 2 | | DN401LL | 32 | 17.4 | 100 | #7270 | 62 | 70 | 5 | 2 |
| 3 | | N2305V | 32 | 20.0 | 100 | #7270 | 62 | 90 | 5 | 2 |
| 4 | | N2305V | 32 | 20.0 | 100 | #7270 | 62 | 60 | 5 | 2 |
| 5 | BR | BR130B | 29 | 16.8 | 100 | #7270 | 62 | 60 | 5 | 2 |
| 6 | | BR130B | 29 | 16.8 | 100 | #7270 | 62 | 70 | 5 | 2 |
| 7 | | BR130B | 29 | 16.8 | 100 | #7270 | 62 | 80 | 5 | 2 |
| 8 | IR | IR2200L | 70 | 16.5 | 100 | #7270 | 62 | 70 | 5 | 2 |
| 9 | | IR2200L | 70 | 16.5 | 100 | #7270 | 62 | 70 | 5 | 2 |
| 10 | | IR2200L | 70 | 16.5 | 100 | #7270 | 62 | 70 | 5 | 2 |
| 11 | EPDM | E505A | 47 | 16.0 | 100 | #7270 | 62 | 70 | 5 | 2 |
| 12 | EPDM | E505A | 47 | 16.0 | 100 | #7270 | 62 | 70 | 5 | 2 |
| 13 | | E505A | 47 | 16.0 | 100 | #7270 | 62 | 70 | 5 | 2 |
| 14 | NBR | DN401LL | 32 | 17.4 | 100 | #7270 | 62 | 70 | 5 | 2 |
| 15 | SBR | T2003 | 33 | 17.0 | 100 | #7270 | 62 | 70 | 5 | 2 |
| 16 | | A303 | 45 | 17.4 | 100 | #7270 | 62 | 70 | 5 | 2 |
| 17 | BR | BR130B | 29 | 16.8 | 100 | #7270 | 62 | 70 | 5 | 2 |
| 18 | IR | IR2200L | 70 | 16.5 | 100 | #7270 | 62 | 70 | 5 | 2 |
| 19 | CR | CR B31 | 40 | 17.4 | 100 | #7270 | 62 | 70 | 5 | 2 |
| 20 | NBR | N2305V | 32 | 20.0 | 100 | #7270 | 62 | 70 | 5 | 2 |
| 21 | SBR | T2003 | 33 | 17.0 | 100 | #7270 | 62 | 70 | 5 | 2 |
| 22 | NBR | DN401LL | 32 | 17.4 | 100 | R1170 | 55 | 60 | 5 | 2 |
| 23 | | DN401LL | 32 | 17.4 | 100 | #7360 | 87 | 60 | 5 | 2 |
| 24 | | DN401LL | 32 | 17.4 | 100 | MA100 | 95 | 60 | 5 | 2 |
| 25 | | DN401LL | 32 | 17.4 | 100 | #5500 | 155 | 60 | 5 | 2 |
| 26 | BR | BR150B | 40 | 16.8 | 100 | #7270 | 62 | 70 | 5 | 2 |
| 27 | | BR150B | 40 | 16.8 | 100 | #7270 | 62 | 70 | 5 | 2 |
| 28 | IR | IR2200L | 70 | 16.5 | 100 | Tin oxide | | 70 | 5 | 2 |

TABLE 4-2

| | Rubber composition for forming matrix (MRC) | | | | | | | | |
|---|---|---|---|---|---|---|---|---|---|
| | First rubber | | | | | Filler | | Zinc oxide | Zinc stearate |
| Electroonductive layer | Kind of rubber | Abbreviation | Mooney viscosity | SP value | Number of parts | Abbreviation | Number of parts | Number of parts | Number of parts |
| 1 | SBR | T2003 | 33 | 17.0 | 100 | #30 | 40 | 5 | 2 |
| 2 | | T2003 | 33 | 17.0 | 100 | #30 | 40 | 5 | 2 |
| 3 | | T2003 | 33 | 17.0 | 100 | #30 | 40 | 5 | 2 |
| 4 | | T2003 | 33 | 17.0 | 100 | #30 | 40 | 5 | 2 |
| 5 | | T2003 | 33 | 17.0 | 100 | #30 | 30 | 5 | 2 |
| 6 | | T2000R | 45 | 17.0 | 100 | #30 | 50 | 5 | 2 |
| 7 | | T2100R | 78 | 17.0 | 100 | #30 | 50 | 5 | 2 |
| 8 | | T1000 | 45 | 17.0 | 100 | #30 | 40 | 5 | 2 |
| 9 | | T2000R | 45 | 16.8 | 100 | #30 | 40 | 5 | 2 |
| 10 | | A303 | 45 | 17.2 | 100 | #30 | 40 | 5 | 2 |
| 11 | | 12003 | 33 | 17.0 | 100 | #30 | 40 | 5 | 2 |
| 12 | NBR | DN401LL | 32 | 17.4 | 100 | #30 | 40 | 5 | 2 |
| 13 | | N215SL | 45 | 21.7 | 100 | AQ | 30 | 5 | 2 |
| 14 | | N215SL | 45 | 21.7 | 100 | #30 | 40 | 5 | 2 |
| 15 | | N230SV | 32 | 20.0 | 100 | #30 | 40 | 5 | 2 |
| 16 | | N230SV | 32 | 20.0 | 100 | #30 | 40 | 5 | 2 |
| 17 | | DN401LL | 32 | 17.4 | 100 | #30 | 40 | 5 | 2 |
| 18 | | DN401LL | 32 | 17.4 | 100 | #30 | 40 | 5 | 2 |
| 19 | | N230SV | 32 | 20.0 | 100 | #30 | 40 | 5 | 2 |
| 20 | IR | IR2200L | 70 | 16.5 | 100 | #30 | 40 | 5 | 2 |
| 21 | CR | B31 | 40 | 17.4 | 100 | #30 | 40 | 5 | 2 |
| 22 | BR | 150B | 40 | 16.8 | 100 | #30 | 40 | 5 | 2 |

TABLE 4-2-continued

Rubber composition for forming matrix (MRC)

| Electroconductive layer | First rubber Kind of rubber | First rubber Abbreviation | First rubber Mooney viscosity | First rubber SP value | First rubber Number of parts | Filler Abbreviation | Filler Number of parts | Zinc oxide Number of parts | Zinc stearate Number of parts |
|---|---|---|---|---|---|---|---|---|---|
| 23 |  | 150B | 40 | 16.8 | 100 | #30 | 40 | 5 | 2 |
| 24 |  | 150B | 40 | 16.8 | 100 | #30 | 40 | 5 | 2 |
| 25 |  | 150B | 40 | 16.8 | 100 | #30 | 40 | 5 | 2 |
| 26 | IR | IR2200L | 70 | 16.5 | 100 | #30 | 40 | 5 | 2 |
| 27 |  | IR2200L | 70 | 16.5 | 100 | #30 | 40 | 5 | 2 |
| 28 | EPDM | E505A | 47 | 16.0 | 100 | #30 | 40 | 5 | 2 |

TABLE 4-3

Rubber composition for forming electroconductive layer

| Electroconductive layer | CMB Number of parts | MRC Number of parts | Vulcanizing agent Product name | Vulcanizing agent Number of parts | Vulcanization accelerator 1 Abbreviation | Vulcanization accelerator 1 Number of parts | Vulcanization accelerator 2 Abbreviation | Vulcanization accelerator 2 Number of parts | SP value difference |
|---|---|---|---|---|---|---|---|---|---|
| 1 | 25.0 | 75.0 | Sulfur | 3 | TBzTD | 1 | TBSI | 0.5 | 3.0 |
| 2 | 27.5 | 72.5 |  | 3 | TBzTD | 1 | TBSI | 0.5 | 0.4 |
| 3 | 25.0 | 75.0 |  | 3 | TBzTD | 1 | TBSI | 0.5 | 3.0 |
| 4 | 30.0 | 70.0 |  | 3 | TBzTD | 1 | TBSI | 0.5 | 3.0 |
| 5 | 27.5 | 72.5 |  | 3 | TBzTD | 1 | TBSI | 0.5 | 0.2 |
| 6 | 27.5 | 72.5 |  | 3 | TBzTD | 1 | TBSI | 0.5 | 0.2 |
| 7 | 27.5 | 72.5 |  | 3 | TBzTD | 1 | TBSI | 0.5 | 0.2 |
| 8 | 27.5 | 72.5 |  | 3 | TBT | 1 | TBSI | 0.5 | 0.5 |
| 9 | 27.5 | 72.5 |  | 3 | TBT | 1 | TBSI | 0.5 | 0.3 |
| 10 | 27.5 | 72.5 |  | 3 | TBT | 1 | TBSI | 0.5 | 0.7 |
| 11 | 27.5 | 72.5 |  | 3 | EP-60 | 4.5 | — | — | 1.0 |
| 12 | 25.0 | 75.0 |  | 3 | EP-60 | 4.5 | — | — | 1.4 |
| 13 | 25.0 | 75.0 |  | 3 | EP-60 | 4.5 | — | — | 5.7 |
| 14 | 25.0 | 75.0 |  | 3 | TBzTD | 1 | TBSI | 0.5 | 4.3 |
| 15 | 25.0 | 75.0 |  | 3 | TBzTD | 1 | TBSI | 0.5 | 3.0 |
| 16 | 25.0 | 75.0 |  | 3 | TBzTD | 1 | TBSI | 0.5 | 2.6 |
| 17 | 25.0 | 75.0 |  | 3 | TBzTD | 1 | TBSI | 0.5 | 0.6 |
| 18 | 25.0 | 75.0 |  | 3 | TBT | 1 | TBSI | 0.5 | 0.9 |
| 19 | 25.0 | 75.0 | Sulfur/ZnO/MgO | 1/5/4 | SANCELER 22 | 1 | TRA | 0.7 | 2.6 |
| 20 | 27.5 | 72.5 |  | 3 | TBT | 1 | TBSI | 0.5 | 3.5 |
| 21 | 27.5 | 72.5 | Sulfur/ZnO/MgO | 1/5/4 | SANCELER 22 | 1 | TRA | 0.7 | 0.4 |
| 22 | 27.5 | 72.5 | Sulfur | 3 | TBzTD | 1 | TBSI | 0.5 | 0.6 |
| 23 | 27.5 | 72.5 |  | 3 | TBzTD | 1 | TBSI | 0.5 | 0.6 |
| 24 | 25.0 | 75.0 |  | 3 | TBzTD | 1 | TBSI | 0.5 | 0.6 |
| 25 | 22.5 | 77.5 |  | 3 | TBzTD | 1 | TBSI | 0.5 | 0.6 |
| 26 | 25.0 | 75.0 |  | 3 | TBzTD | 1 | TBSI | 0.5 | 0.3 |
| 27 | 35.0 | 65.0 |  | 3 | TBzTD | 1 | TBSI | 0.5 | 0.3 |
| 28 | 30.0 | 70.0 |  | 3 | EP-60 | 4.5 | — | — | 0.5 |

In Table 4-1 to Table 4-3, DBP represents a DBP oil absorption amount, and the unit thereof is (cm$^3$/100 g). Regarding the Mooney viscosity in the table, the value of a raw rubber is the catalog value of each company. The value of a domain CMB is the Mooney viscosity ML(1+4) based on JIS K6300-1:2013, and is measured at the rubber temperature when all the materials forming the domain CMB are kneaded. The unit of an SP value is (J/cm$^3$)$^{0.5}$.

Regarding the Mooney viscosity, the value of a raw rubber is the catalog value of each company. The value of a MRC is the Mooney viscosity ML(1+4) based on JIS K6300-1:2013, and is measured at the rubber temperature when all the materials forming the MRC are kneaded. The unit of an SP value is (J/cm$^3$)$^{0.5}$, and the SP value difference is an absolute value of the difference between the second rubber in the CMB and the first rubber in the MRC.

<3. Preparation of Coating Liquid for Surface Layer>
[3-1. Preparation of Coating Liquid 1 for Surface Layer]

A coating liquid 1 for a surface layer for forming a surface layer 1 was prepared as described below.

Under a nitrogen atmosphere, 100 parts by mass of a polyester polyol (product name: P3010, manufactured by Kuraray Co., Ltd.) was gradually added dropwise to 27 parts by mass of polymeric MDI (product name: MILLIONATE MR-200, manufactured by Nippon Polyurethane Industry Co., Ltd.) in a reaction vessel while the temperature in the reaction vessel was kept at 65° C. After completion of the dropping, the resultant was subjected to a reaction at a temperature of 65° C. for 2 hours. The obtained reaction mixture was cooled to room temperature to obtain an isocyanate group-terminated prepolymer P-1 having an isocyanate group content of 4.3%.

41.52 Parts by mass of a polyester polyol (product name: P2010, manufactured by Kuraray Co., Ltd.) and 30 parts by mass of carbon black (product name: MA230, manufactured by Mitsubishi Chemical Corporation, number average particle diameter: 30 nm) with respect to 54.9 parts by mass of the isocyanate group-terminated prepolymer P-1 were dissolved in methyl ethyl ketone (MEK), and the mixture was adjusted so that a solid content was 27 mass %. Thus, a mixed liquid 1 was prepared. 270 g of the mixed liquid 1 and 200 g of glass beads having an average particle diameter of 0.8 mm were placed in a glass bottle having an internal volume of 450 mL and dispersed for 12 hours through use of a paint shaker disperser. After the dispersion, 15 parts by mass of urethane particles having an average particle diameter of 7.0 μm (product name: Daimicbeaz UCN-5070D, manufactured by Dainichiseika Color & Chemicals Mfg. Co., Ltd.) were added. After that, the resultant was further dispersed for 15 minutes to remove the glass beads, to thereby obtain a coating liquid 1 for a surface layer.

[3-2. Preparation of Coating Liquids 2 to 16, C1, and C2 for Surface Layers]

Coating liquids 2 to 16, C1, and C2 for surface layers were prepared in the same manner as the coating liquid 1 for a surface layer except that materials shown in Table 5 were used in blending ratios shown in Table 5. In the coating liquids 12 and 13 for surface layers, an ionic electroconductive agent is further added in addition to the electronic electroconductive agent.

Coating liquids 14 and 16 for surface layers are described in detail in Examples 41 and 45, respectively. In the table, "phr" represents the blending amount with respect to 100 parts by mass of the rubber component.

B-2: polycarbonate-based polyol/polymeric MDI (product name: T5652, manufactured by Asahi Kasei Chemicals Corporation/product name: MILLIONATE MR-200, manufactured by Nippon Polyurethane Industry Co., Ltd.)

B-3: isocyanate A/isocyanate B=4:3 (product name: VESTANAT B1370, manufactured by Degussa AG/product name: Duranate TPA-880E, manufactured by Asahi Kasei Chemicals Corporation)

C-1: urethane particles (product name: Daimicbeaz UCN-5070D, average particle diameter: 7.0 manufactured by Dainichiseika Color & Chemicals Mfg. Co., Ltd.)

CB: carbon black (product name: MA230, manufactured by Mitsubishi Chemical Corporation, number average particle diameter: 30 nm)

Tin oxide: Sb-doped $SnO_2$ (product name: SN-100P, manufactured by Ishihara Sangyo Kaisha, Ltd., particle diameter: 10 nm to 30 nm (primary particle diameter))

D-1: modified dimethyl silicone oil (product name: SH-28PA, manufactured by Dow Corning Toray Silicone Co., Ltd.)

E-1: quaternary ammonium salt (product name: ADK CIZER LV-70, manufactured by ADEKA Corporation)

E-2: synthesized product (described in Example 41 below)

Example 1

The electroconductive roller 1 was dipped in the coating liquid 1 for a surface layer and pulled up while an upper end

TABLE 5

| Coating liquid | Polyol | Isocyanate | Quantitative ratio (polyol/isocyanate) | Roughening particles Kind | Roughening particles Addition amount phr | Electronic electroconductive agent Kind | Electronic electroconductive agent Addition amount phr | Silicone Kind | Silicone Addition amount phr | Ion Kind | Ion Addition amount phr |
|---|---|---|---|---|---|---|---|---|---|---|---|
| 1 | A-1 | B-1 | 43/57 | C-1 | 15 | CB | 23 | — | — | — | — |
| 2 | A-1 | B-1 | 43/57 | C-1 | 30 | CB | 23 | — | — | — | — |
| 3 | A-1 | B-1 | 43/57 | — | 0 | CB | 23 | — | — | — | — |
| 4 | A-1 | B-1 | 43/57 | C-1 | 15 | CB | 23 | D-1 | 0.1 | — | — |
| 5 | A-1 | B-1 | 43/57 | C-1 | 15 | Tin oxide | 10 | — | — | — | — |
| 6 | A-2 | B-2 | 46/54 | — | 0 | CB | 23 | — | — | — | — |
| 7 | A-2 | B-2 | 46/54 | C-1 | 15 | CB | 23 | — | — | — | — |
| 8 | A-2 | B-2 | 46/54 | C-1 | 30 | CB | 23 | — | — | — | — |
| 9 | A-2 | B-2 | 46/54 | — | 0 | CB | 45 | — | — | — | — |
| 10 | A-2 | B-2 | 46/54 | — | 0 | CB | 5 | — | — | — | — |
| 11 | A-2 | B-2 | 46/54 | C-1 | 15 | CB | 23 | D-1 | 0.1 | — | — |
| 12 | A-2 | B-2 | 46/54 | C-1 | 15 | CB | 23 | — | — | E-1 | 1 |
| 13 | A-2 | B-2 | 46/54 | C-1 | 15 | CB | 23 | D-1 | 0.1 | E-1 | 1 |
| 14 | A-2 | B-2 | 46/54 | C-1 | 15 | CB | 23 | D-1 | 0.1 | E-2 | 1.8 |
| 15 | A-3 | B-3 | 41/59 | — | 0 | CB | 23 | — | — | — | — |
| 16 | — | — | Polystyrene is used | — | — | CB | 23 | — | — | — | — |
| C1 | A-1 | B-1 | 43/57 | C-1 | 15 | — | — | — | — | — | — |
| C2 | A-1 | B-1 | 43/57 | C-1 | 15 | — | — | — | — | E-1 | 4 |

In Table 5, the abbreviations of the polyol, the isocyanate, the roughening particles, the silicone additive, and the ionic electroconductive agent are as follows.

A-1: polyester polyol (product name: P2010, manufactured by Kuraray Co., Ltd.)

A-2: polycarbonate-based (product name: T5652, manufactured by Asahi Kasei Chemicals Corporation)

A-3: acrylic polyol (product name: DC2016, manufactured by Daicel Corporation)

B-1: polyester polyol/polymeric MDI (product name: P3010, manufactured by Kuraray Co., Ltd./product name: MILLIONATE MR-200, manufactured by Nippon Polyurethane Industry Co., Ltd.)

portion thereof was held with a longitudinal direction being set in a vertical direction. The dipping time of the dip coating was set to 9 seconds. The pulling speed of the roller was adjusted so that an initial speed was 20 mm/sec and a final speed was 2 mm/sec, and the speed was linearly changed with respect to the time during a period of from 20 mm/sec to 2 mm/sec. After the coating, the electroconductive roller 1 was air-dried at a temperature of 23° C. for 30 minutes. Next, the resultant was dried in a hot air circulation dryer at a temperature of 80° C. for 1 hour and then dried at a temperature of 160° C. for 1 hour to form a dry film of a coating film of the coating liquid 1 for a surface layer on an electroconductive layer.

Further, the surface of the dry film was irradiated with UV light having a wavelength of 254 nm so that the integrated light quantity was 9,000 mJ/cm² to remove a skin layer on the outermost surface of the dry film, to thereby form a surface layer in which electroconductive particles (carbon black) in the dry film were exposed to the outer surface. A low-pressure mercury lamp (manufactured by Toshiba Lighting & Technology Corporation) was used as a light source for UV light. In this manner, a roller 1 for electrophotography according to Example 1 was produced.

<4. Evaluations of Characteristics>

The obtained roller 1 for electrophotography was subjected to the following evaluations.

<4-1. Evaluation of Characteristics of Roller for Electrophotography>

<Method of measuring Impedance of Electroconductive Member>

The impedance of the roller for electrophotography was measured by the following method.

First, as pretreatment, platinum was deposited from the vapor on the outer surface of the roller for electrophotography while the roller for electrophotography was rotated to produce a measuring electrode. In this case, an electrode having a width of 1.5 cm, which was uniform in a circumferential direction, was produced through use of a masking tape. Through formation of the electrode, the contribution of the contact area between the measuring electrode and the electrophotographic electroconductive member can be reduced to the extent possible due to the surface roughness of the electrophotographic electroconductive member. Next, an aluminum sheet was wound around the electrode without a gap to form a measurement sample illustrated in FIG. 3A and FIG. 3B.

Then, an impedance measuring device (product name: Solartron 126096 W, manufactured by Toyo Corporation) was connected from the aluminum sheet to the measuring electrode and to the support. The impedance was measured at an oscillation voltage of 1 Vpp and a frequency of 1.0 Hz under an environment having a temperature of 23° C. and a relative humidity of 50%, and an absolute value of the impedance was obtained.

The electrophotographic electroconductive member (length in the longitudinal direction: 230 mm) was equally divided into five regions in the longitudinal direction, and measuring electrodes were formed at an arbitrary one point from each of the regions, that is, five points in total, and the above-mentioned measurement was performed. The average value thereof was adopted as the impedance of the electrophotographic electroconductive member.

<4-2. Evaluations of Characteristics of Surface Layer>

<Measurement of Thickness of Surface Layer>

The thickness of the surface layer was measured by observing cross-sections of the surface layer at nine points in total including three points in an axial direction and three points in a circumferential direction with an optical microscope or an electron microscope, and the average value was adopted as the "thickness" of the surface layer. The evaluation results are shown in Table 6.

<Measurement of Universal Hardness of Surface Layer>

The universal hardness at a position of a depth of 1 μm from the surface of the surface layer was measured with a universal hardness meter. An ultrafine hardness meter (product name: Fischerscope HM-2000, manufactured by Helmut Fischer GmbH) was used for the measurement. Specific measurement conditions are described below.

Measurement indenter: Vickers indenter (face angle: 136, Young's modulus: 1,140, Poisson's ratio: 0.07, indenter material: diamond)

Measurement environment: temperature: 23° C., relative humidity: 50%

Maximum test load: 1.0 mN

Load condition: A load was applied in proportion to the time at a speed at which the maximum test load was reached in 30 seconds.

In this evaluation, the universal hardness was calculated by the following calculation equation (1) through use of a load F at the time when the indenter was pushed into a depth of 1 μm from the surface of the surface layer and a contact area A between the indenter and the surface layer at that time.

Calculation equation (1)

Universal hardness $(N/mm^2)=F/A$

<Measurement of Volume Resistivity (Ω·cm) of Surface Layer>

The volume resistivity of the surface layer was measured in an electroconductive mode with an atomic force microscope (AFM) (product name: Q-scope 250, manufactured by Quesant Instrument Corporation). First, the surface layer of the developing roller was cut out into a sheet having a width of 2 mm and a length of 2 mm through use of a manipulator, and platinum was deposited from the vapor on one surface of the surface layer. Next, a DC power source (product name: 6614C, manufactured by Agilent Technologies) was connected to the platinum-deposited surface, and a voltage of 10 V was applied. A free end of a cantilever was brought into contact with the other surface of the surface layer, and a current image was obtained through an AFM main body. This measurement was performed at 100 randomly selected points on the surface in the entire surface layer, and the "volume resistivity" was calculated from an average current value of the top 10 low current values and an average value of the thicknesses of the surface layer.

The measurement conditions are described below.

Measurement mode: contact

Cantilever: CSC17

Measurement range: 10 nm×10 nm

Scan rate: 4 Hz

Applied voltage: 10 V

<Measurement of Protrusion derived from Exposed Portion of Electronic Electroconductive Agent on Surface of Surface Layer>

A method of measuring the number of protrusions derived from the exposed portions of the electronic electroconductive agent particles on the surface of the surface layer is as described below. First, a sample including portions of the surface layer and the electroconductive layer was cut out from the roller for electrophotography. Platinum was deposited from the vapor on the surface of the sample corresponding to the outer surface of the surface layer. Next, observation regions of 2.0 μm in length and 2.0 μm in width were set at arbitrary five points on the platinum-deposited surface of the sample, and each of the observation regions was observed with a scanning electron microscope (SEM) (product name: S-4800, manufactured by Hitachi High-Technologies Corporation) at a magnification of 40,000 times to obtain five SEM images. Each of the SEM images was subjected to 8-bit gray scaling conversion through use of image processing software (product name: ImageProPlus, manufactured by Media Cybernetics, Inc.) to obtain a monochrome image with 256 levels of gray. Next, the black and white of the image were subjected to inversion processing so that the protrusions derived from the exposed portions of the electronic electroconductive agent in the monochrome image became white, and a binarization threshold was set with respect to the brightness distribution of the image based on the algorithm of Otsu's discriminant analysis method, to thereby obtain a binarized image. The number of protrusions was calculated from the obtained binarized image. The average value of the numbers of protrusions obtained from the five SEM images was adopted as the number of protrusions derived from the exposed portions of the electronic electroconductive agent of the electrophotographic electroconductive member.

<Analysis of Urethane Resin in Surface Layer>

The analysis (urethane group concentration, partial structure) of the urethane resin in the surface layer was performed through use of FT-IR and $^1$H-NMR.

<4-3 Evaluations of Characteristics of Electroconductive Layer>

<(1) Determination of Matrix-domain Structure>

The presence of the matrix-domain structure in the electroconductive layer was determined by the following method.

A cut piece (thickness: 500 μm) was cut out with a razor so that a cross-section perpendicular to the longitudinal direction of the electroconductive layer was able to be observed. Next, platinum was deposited from the vapor on the surface of the cut piece corresponding to the cross-section of the electroconductive layer. The platinum-deposited surface of the cut piece was observed with a scanning electron microscope (SEM) (product name: S-4800, manufactured by Hitachi High-Technologies Corporation) at a magnification of 1,000 times to obtain an SEM image. In the SEM image, when a structure in which a plurality of domains were dispersed in a matrix, and the matrix communicating to each other was recognized, the matrix-domain structure was determined to be "present".

<(2) Measurement of Maximum Feret Diameter, Perimeter, and Envelope Perimeter of Domain>

The maximum Feret diameter, perimeter, and envelope perimeter of a domain, and the number of domains were measured as described below. First, when the length in the longitudinal direction is represented by L, samples (thickness: 1 μm) each including a cross-section of an electroconductive layer in a total thickness direction as illustrated in FIG. 6B were cut out from three points including the center of the electroconductive layer in a longitudinal direction and points of L/4 from both ends of the electroconductive layer to the center of a roller for electrophotography through use of a microtome (product name: Leica EM FCS, manufactured by Leica Microsystems).

In each of the three obtained samples, platinum was deposited from the vapor on the surface corresponding to the cross-section of the electroconductive layer in the total thickness direction. Next, the platinum-deposited surface was photographed with a scanning electron microscope (product name: S-4800, manufactured by Hitachi High-Technologies Corporation) at a magnification of 5,000 times to obtain a SEM image. Each of the obtained SEM images was subjected to 8-bit gray scaling conversion through use of image processing software (product name: ImageProPlus, manufactured by Media Cybernetics, Inc.) to obtain a monochrome image with 256 levels of gray. Next, the black and white of the image were subjected to inversion processing so that the domains in the monochrome image became white and a binarization threshold was set with respect to the brightness distribution of the image based on the algorithm of Otsu's discriminant analysis method, to thereby obtain a binarized image. In the obtained binarized image, a square observation region having each side of 15 μm was set at each of arbitrary three points of a thickness region having a depth of from 0.1T to 0.9T from the outer surface (surface on an opposite side to the surface facing the support) of the electroconductive layer when the thickness of the electroconductive layer is represented by T. Then, 50 domains arbitrarily selected from the domains that were present in the observation region were each calculated for a maximum Feret diameter, a perimeter, and an envelope perimeter through use of the count function of the above-mentioned image processing software.

The A/B value was calculated through use of the perimeter and envelope perimeter calculated for each of the domains observed in each of the observation regions. Then, the proportion (number %) of the number of the domains satisfying the requirement (2) with respect to the number of all the observed domains was determined.

<(3) Measurement of Volume Resistivity of Matrix>

The volume resistivity of the matrix was measured as described below with a scanning probe microscope (SPM) (product name: Q-Scope 250, manufactured by Quesant Instrument Corporation) in a contact mode. The measurement environment was a temperature of 23° C. and a relative humidity of 50%.

First, samples were cut out from the electroconductive layer in the same manner as in the above-mentioned section (2). Next, each of the samples was set on the surface of a metal plate so that one surface of the sample corresponding to the cross-section of the electroconductive layer was brought into contact with the surface of the metal plate. Then, a cantilever of the SPM was brought into contact with a portion of the sample corresponding to a matrix on the surface on an opposite side to the surface in contact with the metal plate. Next, a voltage of 50 V was applied to the cantilever, and a current value was measured. In addition, the surface shape of the measurement cut piece was measured with the SPM, and the thickness of the measurement point was calculated from the obtained height profile. The volume resistivity of the measurement point was calculated from the thickness of the measurement point and the current value.

The measurement was performed at arbitrary three points of a matrix portion in a region corresponding to a thickness region having a depth of from 0.1T to 0.9T from the outer surface (surface on an opposite side to the surface facing the support) of the electroconductive layer when the thickness of the electroconductive layer was represented by T in the sample. The arithmetic average value of the volume resistivities calculated from the measurement results at nine points in total obtained from each of the samples was adopted as the volume resistivity of the matrix of the electrophotographic electroconductive member to be measured.

The measurement was performed at measurement positions of nine points in total including arbitrary three points of the matrix portion in the thickness region having a depth of from 0.1T to 0.9T from the outer surface of each cut piece when the thickness of the electroconductive layer was represented by T. The average value thereof was adopted as the volume resistivity of the matrix.

<(4) Method of measuring DBP Absorption Amount of Carbon Black>

The DBP absorption amount of carbon black was measured in accordance with Japanese Industrial Standards (JIS) K 6217. As this value, the catalog value of carbon black may also be used.

<(5) Method of measuring Proportion of Sectional Areas of Electroconductive Particles contained in Domain with respect to Sectional Area of Domain, Arithmetic Average Distance Dc between Carbon Black Particles in Domain, Standard Deviation σm, and Coefficient of Variation σm/Dc>

In a domain, the proportion of sectional areas of electroconductive particles contained in the domain with respect to a sectional area of the domain, an arithmetic average distance Dc between carbon black particles, a standard deviation σm, and a coefficient of variation σm/Dc were measured as described below.

First, a portion corresponding to a square observation region having each side of 15 μm of the binarized image in the evaluation of the above-mentioned section (2) on the platinum-deposited surface of the sample produced in the above-mentioned section (2) was photographed with a scanning electron microscope (SEM) (product name: S-4800, manufactured by Hitachi High-Technologies Corporation) at a magnification of 20,000 times to obtain a new SEM image. The SEM image was subjected to 8-bit gray scaling through use of an image analysis device (product name: LUZEX-AP, manufactured by Nireco Corporation) to obtain a monochrome image with 256 levels of gray. Next, the black and white of the image were subjected to inversion processing so that the domains in the monochrome image became white, and a binarization threshold was set with respect to the brightness distribution of the image based on the algorithm of Otsu's discriminant analysis method, to thereby obtain a binarized image. Next, in each of the domains observed in the above-mentioned section (2), a distance Ci between wall surfaces of carbon black in the domain was calculated from the above-mentioned binarized image. Then, the arithmetic average value of the distances between wall surfaces (arithmetic average distance C between wall surfaces) of the carbon black in each of the domains was calculated. Further, the sectional area of the domain and the sectional area of the carbon black in the domain were calculated. Then, from those results, the proportion (number %) of the number of the domains satisfying (1) and the proportion (number %) of the number of the domains satisfying (1) and (2) with respect to the number of all the observed domains were calculated.

Further, the standard deviation σm was determined based on the distances between the wall surfaces of the carbon black in each of the obtained domains and the arithmetic average C thereof. Then, the coefficient of variation σm/C was calculated by dividing the standard deviation σm by the arithmetic average C.

In addition, regarding the domains satisfying (1) and (2), the arithmetic average distance C between wall surfaces of the carbon black, the coefficient of variation σm/C, and the arithmetic average value of the proportions of the sectional areas of the carbon black with respect to the sectional areas of the domains were calculated. Further, regarding the domains satisfying (1) and (2), the arithmetic average value of A/B and the arithmetic average value of the maximum Feret diameters were calculated. The results are shown in Table 6-2.

<SP Value of Rubber forming Matrix and Domains>

The SP value may be measured through use of a conventional swelling method. Each of the rubbers forming the matrix and the domains was fractionated through use of a manipulator or the like, and immersed in solvents having different SP values, and the degree of swelling was measured from a change in weight of the rubber. The Hansen solubility parameter (HSP) can be calculated by analysis using the value of the degree of swelling with respect to each of the solvents. In addition, the Hansen solubility parameter (HSP) can be calculated with satisfactory accuracy by creating a calibration curve through use of a material having a known SP value. As the value of the known SP value, the catalog value of a material manufacturer may also be used. The SP difference was calculated from the SP values of the rubbers forming the matrix and the domains obtained by the above-mentioned procedure and used as an absolute value.

<5. Evaluations as Charging Member>

The characteristics of the roller 1 for electrophotography when used as a charging member were evaluated.

<Evaluation of Toner Charge Quantity>

The ability to supply negative electric charge to dirt components (dirt components, such as transfer residual toner and an external additive) when the roller 1 for electrophotography was used as a charging roller was evaluated as described below.

A laser printer (product name: HP LaserJet Pro M203dw, manufactured by Hewlett-Packard Company) was prepared as an electrophotographic image forming apparatus. Then, in the laser printer, a motor was reconstructed so that the process speed was 1.2 times the normal speed. Further, the reconstruction was performed so that an external power source was connected in order to apply a voltage to the charging roller, to thereby prevent the voltage from being directly applied to the charging roller from a main body.

Further, a process cartridge for the laser printer was reconstructed so that a cleaning blade for the charging roller, a developing container that is brought into abutment against a photosensitive drum, and a transfer roller were removed.

The laser printer and the process cartridge were left to stand under a low-temperature and low-humidity (temperature: 15° C., relative humidity: 10%) environment for 48 hours. Then, the process cartridge was loaded into the laser printer. Then, the following evaluation was performed under a low-temperature and low-humidity environment. Under a low-temperature and low-humidity environment, the electric charge injection from the member for electrophotography to the toner does not easily occur. Through the following evaluation under such environment, the electric charge injection ability of the member for electrophotography into the toner can be further accurately evaluated.

First, the main body was stopped in the middle of an image forming step of outputting a solid black image onto one sheet under normal image output conditions, and a state in which the entire circumference of the photosensitive drum was covered with the toner layer was formed.

Then, the process cartridge in a state in which the entire circumference of the photosensitive drum was covered with the toner layer was removed from the main body. The charging roller of the process cartridge was removed, and the roller 1 for electrophotography was mounted as a charging roller. The process cartridge was mounted on the main body.

Then, an image forming step of applying a voltage at which the roller 1 for electrophotography was not discharged, specifically −500 V, to the roller 1 for electrophotography from an external power source, to thereby output a solid white image onto one sheet was performed, and in this process, the toner potential on the surface of the toner layer on the photosensitive drum was measured before and after passage through a nip portion between the roller 1 for electrophotography and the photosensitive drum. For the potential measurement, a surface potential probe (product name: MODEL555P-1, manufactured by Trek Japan KK) arranged at a position of 2 mm away from the surface of the photosensitive drum was used.

Then, the difference between the potential on the surface of the toner layer before passage through the nip portion and the potential on the surface of the toner layer after passage through the nip portion was measured as an injection charge quantity (V) by the electrophotographic electroconductive member.

<Evaluation of Dirt>

In order to evaluate the adhesion amount of dirt of the roller 1 for electrophotography, the following evaluation was performed.

A laser printer and a process cartridge reconstructed in the same manner as in the above-mentioned section <Evaluation of Toner Charge Quantity> were prepared. In addition, the evaluation environment was also set to the same as that in the above-mentioned section <Evaluation of Toner Charge Quantity>.

First, an image in which horizontal lines having a width of 2 dots and an interval of 100 dots were drawn in a direction perpendicular to the rotation direction of the photosensitive drum was output on 500 sheets. The charging roller was removed from the process cartridge, and the state of dirt thereof was evaluated by tape coloring evaluation. The tape coloring evaluation was performed as described below. A polyester pressure-sensitive adhesive tape (product name: No. 31B, manufactured by Nitto Denko Corporation) was bonded to the surface of the charging roller, and then the pressure-sensitive adhesive tape was peeled off together with the toner adhering to the surface of the charging roller and bonded to a blank sheet. The foregoing was performed in an entire image printing region on the surface of the charging roller, and then the reflection density of the pressure-sensitive adhesive tape was measured in the entire image printing region with a photovolt reflection densitometer (product name: TC-6DS/A, manufactured by Tokyo Denshoku Co., Ltd.) to determine a maximum value. Next, the reflection density of a new polyester pressure-sensitive adhesive tape similarly bonded to a blank sheet was measured to determine a minimum value, and an increase in reflection density was adopted as the value of coloring density. It is preferred that the value of the coloring density be smaller because the amount of dirt on the charging roller is small and satisfactory. Accordingly, the value of the coloring density was adopted as an indicator of the degree of dirt on the charging roller.

<Evaluation of Charging Stability>

In the same main body and cartridge configurations as those in the above-mentioned section <Evaluation of Dirt >, an image in which the alphabet letter "E" with a size of 4 points was printed so that the printing rate was 1% was output on 20,000 sheets of A4-size paper under a low-temperature and low-humidity (temperature: 15° C., relative humidity: 10%) environment. The output of the electrophotographic image was performed in a so-called intermittent mode in which the rotation of the electrophotographic photosensitive member was stopped over 7 seconds every time the image was output on one sheet. The image output in the intermittent mode can be said to be a more severe evaluation condition for the charging roller because the number of times of rubbing between the charging roller and the electrophotographic photosensitive member is larger than that in the case of continuously outputting the electrophotographic image.

Next, a halftone image was output, and the obtained image was observed visually and through use of a loupe and evaluated based on the following criteria.

Rank A: There are no white spots even by checking with a loupe.

Rank B: No white spots are visually recognized.

Rank C: White spots are slightly visually recognized.

Rank D: White spots are visually recognized over an entire region.

Examples 2 to 28

Electroconductive rollers 2 to 28 were produced in the same manner as the electroconductive roller 1 except that rubber compositions for forming electroconductive layers shown in Table 4-3 were used. Rollers 2 to 28 for electrophotography each having a surface layer formed of the coating liquid 1 for a surface layer were produced in the same manner as in Example 1 except that the electroconductive rollers 2 to 28 were used. Each of the obtained rollers 2 to 28 for electrophotography was subjected to the evaluations described in Example 1.

Examples 29 to 40 and 42

Rollers 29 to 40 and 42 for electrophotography were produced in the same manner as in Example 1 except that the coating liquids 2 to 13 and 15 for surface layers were used. The obtained rollers 29 to 40 and 42 for electrophotography were subjected to the evaluations described in Example 1.

Example 41

[Preparation of Coating Liquid 14 for Surface Layer]

An ionic electroconductive agent E-2 used for producing the coating liquid 14 was obtained as described below.

A stirrer and 50 ml of tetrahydrofuran (hereinafter referred to as "THF", manufactured by Kanto Chemical Industry Co., Ltd.) were put in a recovery flask equipped with a Dimroth condenser, and 12.5 g (0.52 mol) of sodium hydride (manufactured by Kanto Chemical Industry Co., Ltd.) was dispersed therein. Then, the recovery flask was cooled in an ice bath. A solution obtained by dissolving 8.8 g (0.13 mol) of imidazole (manufactured by Tokyo Chemical Industry Co., Ltd.) serving as a nucleophile in 50 ml of THF was slowly added dropwise to the resultant. After that, the ice bath was removed, and the mixture was stirred at room temperature for 2 hours.

41.3 g (0.33 mol) of 2-bromoethanol (manufactured by Tokyo Chemical Industry Co., Ltd.) serving as an electrophile was added to the resultant at room temperature, and then the mixture was heated under reflux at 70° C. for 7 hours. The reaction solution after the reaction was filtered, and an insoluble content was washed away with THF. The solvent of the obtained filtrate was evaporated under reduced pressure.

The resultant was dissolved again in dichloromethane, followed by filtration, and the solvent was evaporated under reduced pressure after the filtrate was collected. The obtained concentrate was washed with diethyl ether and dried under reduced pressure to obtain 28 g of an ionic electroconductive agent precursor. Subsequently, in order to exchange an anion of the obtained ionic electroconductive agent with a desired anion, the entire amount of the obtained ionic electroconductive agent precursor was dissolved in 100 ml of methanol at room temperature. While the solution was stirred, 57.4 g of an ion-exchanged salt lithium bis(trifluoromethanesulfonyl)imide (manufactured by Kanto Chemical Industry Co., Ltd.) dissolved in 50 ml of pure water was added to the solution, and the mixture was stirred at room temperature for 24 hours. After the reaction, methanol was evaporated under reduced pressure. The resultant was separated with dichloromethane/water, and then an organic layer was collected. Further, the resultant was washed twice with water, and the solvent was evaporated under reduced pressure. After the drying, an ionic electroconductive agent E-2 was obtained as white powder. The ionic electroconductive agent had an imidazolium ring and a OH group.

A coating liquid 14 for a surface layer was prepared in the same manner as the coating liquid 1 for a surface layer in the blending amount of the ionic electroconductive agent E-2 together with other materials as shown in Table 5.

[Production of Roller 41 for Electrophotography]

A roller 41 for electrophotography was produced in the same manner as in Example 1 except that the coating liquid 14 for a surface layer was used. The obtained roller 41 for electrophotography was subjected to the evaluations described in Example 1.

Example 43

A roller 43 for electrophotography was produced in the same manner as in Example 1 except that the integrated light quantity of irradiation of the dried film of the coating film of the coating liquid 1 for a surface layer with UV light was set to 450 mJ/cm$^2$. The obtained roller 43 for electrophotography was subjected to the evaluations described in Example 1.

Example 44

A roller 44 for electrophotography was produced in the same manner as in Example 1 except that the irradiation of the dried film of the coating film of the coating liquid 1 for a surface layer with UV light was not performed. The obtained roller 44 for electrophotography was subjected to the evaluations described in Example 1.

Example 45

[Preparation of Coating Liquid 16 for Surface Layer]

Polystyrene (manufactured by Sigma-Aldrich, weight average molecular weight: about 350,000) was used and dissolved in MEK in an amount of 12 mass %. Carbon black (product name: MA230, manufactured by Mitsubishi Chemical Corporation, number average particle diameter: 30 nm) was added to the mixture in an amount of 23 parts by mass, and the same steps as those in the coating liquid 1 for a surface layer were performed from the dispersion step, to thereby prepare a coating liquid 16 for a surface layer.

[Production of Roller 45 for Electrophotography]

A roller 45 for electrophotography was produced in the same manner as in Example 1 except that the coating liquid 16 for a surface layer was used. The obtained roller 45 for electrophotography was subjected to the evaluations described in Example 1.

The evaluation results of the rollers 1 to 45 for electrophotography according to Examples 1 to 45 are shown in Table 6-1 to Table 6-3. The absolute value of the difference between the SP values of the rubbers forming the matrix and the domains is shown in Table 5. In addition, in Table 6-1, when the surface layer formed of each coating liquid contains a urethane resin, the urethane group concentration is also shown, and when the urethane resin has at least one of the structures represented by the structural formulae (1) to (3), the number of the structural formula is also shown.

TABLE 6-1

| Example | No. of roller for electro-photography | No. of electro-conductive layer | No. of coating liquid for surface layer | UV treatment | Impedance ($\Omega$) | Thickness of surface layer ($\mu$m) | Universal hardness | Volume resistivity of surface layer ($\Omega \cdot$ cm) | Number of minute protrusions (piece) | Urethane group concentration (%) | Partial structure of urethane resin in surface layer |
|---|---|---|---|---|---|---|---|---|---|---|---|
| 1 | 1 | 1 | 1 | Present | 9.90E+06 | 20 | 3.2 | 6.80E+10 | 210 | 3.6 | (2) |
| 2 | 2 | 2 | 1 | Present | 7.43E+05 | 20 | 3.2 | 6.80E+10 | 210 | 3.6 | (2) |
| 3 | 3 | 3 | 1 | Present | 1.73E+05 | 20 | 3.2 | 6.80E+10 | 210 | 3.6 | (2) |
| 4 | 4 | 4 | 1 | Present | 1.13E+05 | 20 | 3.2 | 6.80E+10 | 210 | 3.6 | (2) |
| 5 | 5 | 5 | 1 | Present | 1.27E+06 | 20 | 3.2 | 6.80E+10 | 210 | 3.6 | (2) |
| 6 | 6 | 6 | 1 | Present | 1.54E+07 | 20 | 3.2 | 6.80E+10 | 210 | 3.6 | (2) |
| 7 | 7 | 7 | 1 | Present | 1.11E+07 | 20 | 3.2 | 6.80E+10 | 210 | 3.6 | (2) |
| 8 | 8 | 8 | 1 | Present | 1.08E+07 | 20 | 3.2 | 6.80E+10 | 210 | 3.6 | (2) |
| 9 | 9 | 9 | 1 | Present | 1.63E+06 | 20 | 3.2 | 6.80E+10 | 210 | 3.6 | (2) |
| 10 | 10 | 10 | 1 | Present | 4.24E+05 | 20 | 3.2 | 6.80E+10 | 210 | 3.6 | (2) |
| 11 | 11 | 11 | 1 | Present | 1.50E+06 | 20 | 3.2 | 6.80E+10 | 210 | 3.6 | (2) |
| 12 | 12 | 12 | 1 | Present | 7.60E+05 | 20 | 3.2 | 6.80E+10 | 210 | 3.6 | (2) |
| 13 | 13 | 13 | 1 | Present | 1.66E+06 | 20 | 3.2 | 6.80E+10 | 210 | 3.6 | (2) |
| 14 | 14 | 14 | 1 | Present | 3.36E+07 | 20 | 3.2 | 6.80E+10 | 210 | 3.6 | (2) |
| 15 | 15 | 15 | 1 | Present | 6.01E+05 | 20 | 3.2 | 6.80E+10 | 210 | 3.6 | (2) |
| 16 | 16 | 16 | 1 | Present | 8.31E+05 | 20 | 3.2 | 6.80E+10 | 210 | 3.6 | (2) |
| 17 | 17 | 17 | 1 | Present | 4.42E+05 | 20 | 3.2 | 6.80E+10 | 210 | 3.6 | (2) |
| 18 | 18 | 18 | 1 | Present | 3.36E+05 | 20 | 3.2 | 6.80E+10 | 210 | 3.6 | (2) |
| 19 | 19 | 19 | 1 | Present | 1.49E+05 | 20 | 3.2 | 6.80E+10 | 210 | 3.6 | (2) |
| 20 | 20 | 20 | 1 | Present | 5.66E+05 | 20 | 3.2 | 6.80E+10 | 210 | 3.6 | (2) |
| 21 | 21 | 21 | 1 | Present | 6.72E+05 | 20 | 3.2 | 6.80E+10 | 210 | 3.6 | (2) |
| 22 | 22 | 22 | 1 | Present | 4.32E+07 | 20 | 3.2 | 6.80E+10 | 210 | 3.6 | (2) |
| 23 | 23 | 23 | 1 | Present | 4.14E+07 | 20 | 3.2 | 6.80E+10 | 210 | 3.6 | (2) |
| 24 | 24 | 24 | 1 | Present | 1.31E+05 | 20 | 3.2 | 6.80E+10 | 210 | 3.6 | (2) |
| 25 | 25 | 25 | 1 | Present | 2.30E+03 | 20 | 3.2 | 6.80E+10 | 210 | 3.6 | (2) |
| 26 | 26 | 26 | 1 | Present | 1.17E+07 | 20 | 3.2 | 6.80E+10 | 210 | 3.6 | (2) |
| 27 | 27 | 27 | 1 | Present | 8.66E+06 | 20 | 3.2 | 6.80E+10 | 210 | 3.6 | (2) |
| 28 | 28 | 28 | 1 | Present | 4.14E+07 | 20 | 3.2 | 6.80E+10 | 210 | 3.6 | (2) |
| 29 | 29 | 29 | 1 | 2 | Present | 1.71E+07 | 20 | 3.4 | 9.60E+10 | 250 | 3.6 | (2) |
| 30 | 30 | 30 | 1 | 3 | Present | 4.59E+06 | 20 | 3.2 | 5.20E+10 | 189 | 3.6 | (2) |

TABLE 6-1-continued

| | | | | | | Surface layer | | | | | |
|---|---|---|---|---|---|---|---|---|---|---|---|
| Example | No. of roller for electro- photography | No. of electro- conductive layer | No. of coating liquid for surface layer | UV treatment | Impedance (Ω) | Thickness of surface layer (μm) | Universal hardness | Volume resistivity of surface layer (Ω·cm) | Number of minute protrusions (piece) | Urethane group concen- tration (%) | Partial structure of urethane resin in surface layer |
| 31 | 31 | 1 | 4 | Present | 4.82E+06 | 20 | 3.3 | 5.50E+10 | 208 | 3.6 | (2) |
| 32 | 32 | 1 | 5 | Present | 3.87E+06 | 20 | 5.0 | 1.20E+10 | 160 | 3.6 | (2) |
| 33 | 33 | 1 | 6 | Present | 4.41E+06 | 20 | 3.2 | 4.90E+10 | 195 | 3.2 | (3) |
| 34 | 34 | 1 | 7 | Present | 7.65E+06 | 20 | 3.2 | 6.50E+10 | 230 | 3.2 | (3) |
| 35 | 35 | 1 | 8 | Present | 2.03E+07 | 20 | 3.4 | 9.80E+10 | 265 | 3.2 | (3) |
| 36 | 36 | 1 | 9 | Present | 3.06E+07 | 20 | 3.8 | 8.90E+08 | 310 | 3.2 | (3) |
| 37 | 37 | 1 | 10 | Present | 4.37E+07 | 20 | 3.1 | 5.20E+13 | 50 | 3.2 | (3) |
| 38 | 38 | 1 | 11 | Present | 8.10E+06 | 20 | 3.0 | 6.60E+10 | 155 | 3.2 | (3) |
| 39 | 39 | 1 | 12 | Present | 3.69E+07 | 20 | 3.2 | 2.30E+10 | 228 | 3.2 | (3) |
| 40 | 40 | 1 | 13 | Present | 3.38E+07 | 20 | 3.0 | 2.10E+10 | 268 | 3.2 | (3) |
| 41 | 41 | 1 | 14 | Present | 3.11E+07 | 20 | 3.0 | 1.80E+10 | 268 | 3.2 | (3) |
| 42 | 42 | 1 | 15 | Present | 4.01E+07 | 20 | 18.1 | 1.50E+12 | 215 | 4.2 | — |
| 43 | 43 | 1 | 1 | Present | 4.59E+06 | 20 | 3.3 | 5.20E+10 | 48 | 3.6 | (2) |
| 44 | 44 | 1 | 1 | Absent | 4.01E+07 | 20 | 3.2 | 2.40E+10 | 0 | 3.6 | (2) |
| 45 | 45 | 1 | 16 | Present | 4.23E+07 | 20 | 5.2 | 4.50E+12 | 65 | — | — |

TABLE 6-2

| | Electroconductive layer | | | | | | | | |
|---|---|---|---|---|---|---|---|---|---|
| Example | M-D structure | Domain satisfying (1) Number % | Domain satisfying (2) Number % | Domain satisfying (1) and (2) Number % | Average value of A/B [A/B] | Average value of maximum Feret diameters of domains (μm) | Volume resistivity of matrix (Ω·cm) | Average value Dc of distances between wall surfaces of CB (nm) | Coefficient of variation σm/Dc | Average value of proportions of sectional areas of CB with respect to sectional areas of domains (%) |
| 1 | Present | 87 | 93 | 85 | 1.08 | 2.5 | 8.30E+13 | 111 | 0.2 | 28.0 |
| 2 | Present | 92 | 97 | 90 | 1.02 | 0.9 | 1.10E+14 | 111 | 0.2 | 28.0 |
| 3 | Present | 90 | 95 | 88 | 1.05 | 1.9 | 7.90E+13 | 109 | 0.2 | 28.2 |
| 4 | Present | 84 | 90 | 83 | 1.09 | 4.0 | 8.50E+13 | 113 | 0.2 | 27.8 |
| 5 | Present | 94 | 98 | 90 | 1.01 | 0.6 | 8.80E+13 | 110 | 0.2 | 26.3 |
| 6 | Present | 92 | 96 | 90 | 1.02 | 1.1 | 9.00E+13 | 110 | 0.2 | 26.2 |
| 7 | Present | 89 | 94 | 87 | 1.03 | 2.2 | 9.20E+13 | 110 | 0.2 | 26.3 |
| 8 | Present | 88 | 94 | 86 | 1.04 | 1.5 | 5.60E+14 | 110 | 0.2 | 26.5 |
| 9 | Present | 90 | 94 | 88 | 1.03 | 1.2 | 9.00E+13 | 110 | 0.2 | 26.4 |
| 10 | Present | 91 | 96 | 88 | 1.02 | 0.9 | 8.50E+12 | 110 | 0.2 | 26.5 |
| 11 | Present | 89 | 93 | 86 | 1.04 | 2.1 | 1.50E+14 | 110 | 0.2 | 26.0 |
| 12 | Present | 89 | 93 | 88 | 1.06 | 1.8 | 5.00E+08 | 110 | 0.2 | 26.0 |
| 13 | Present | 80 | 81 | 80 | 1.10 | 6.2 | 1.20E+08 | 110 | 0.2 | 25.9 |
| 14 | Present | 94 | 98 | 90 | 1.09 | 1.0 | 4.80E+08 | 110 | 0.2 | 28.0 |
| 15 | Present | 90 | 95 | 87 | 1.09 | 1.8 | 2.90E+08 | 110 | 0.2 | 26.7 |
| 16 | Present | 89 | 95 | 87 | 1.08 | 1.5 | 2.50E+08 | 110 | 0.2 | 27.2 |
| 17 | Present | 90 | 96 | 88 | 1.07 | 0.9 | 4.80E+08 | 110 | 0.2 | 26.3 |
| 18 | Present | 85 | 91 | 83 | 1.10 | 3.0 | 4.90E+08 | 110 | 0.2 | 26.4 |
| 19 | Present | 87 | 92 | 85 | 1.08 | 2.7 | 2.80E+08 | 110 | 0.2 | 32.6 |
| 20 | Present | 82 | 85 | 81 | 1.08 | 5.1 | 8.40E+15 | 110 | 0.2 | 27.3 |
| 21 | Present | 88 | 92 | 77 | 1.09 | 2.1 | 5.20E+10 | 110 | 0.2 | 26.7 |
| 22 | Present | 91 | 96 | 90 | 1.02 | 0.9 | 3.30E+15 | 112 | 0.1 | 24.5 |
| 23 | Present | 89 | 94 | 87 | 1.07 | 1.2 | 3.10E+15 | 111 | 0.2 | 24.6 |
| 24 | Present | 85 | 95 | 83 | 1.08 | 1.6 | 3.10E+15 | 120 | 0.2 | 24.5 |
| 25 | Present | 82 | 93 | 81 | 1.10 | 2.0 | 3.20E+15 | 125 | 0.3 | 24.7 |
| 26 | Present | 93 | 96 | 90 | 1.00 | 0.7 | 8.50E+15 | 110 | 0.2 | 27.2 |
| 27 | Present | 90 | 96 | 90 | 1.02 | 1.5 | 8.90E+15 | 110 | 0.2 | 26.3 |
| 28 | Present | 82 | 82 | 85 | 1.09 | 2.5 | 3.20E+16 | 112* | 0.2 | 26.7 |
| 29 | Present | 87 | 93 | 85 | 1.08 | 2.5 | 8.30E+13 | 111 | 0.2 | 28.0 |
| 30 | Present | 87 | 93 | 85 | 1.08 | 2.5 | 8.30E+13 | 111 | 0.2 | 28.0 |

TABLE 6-2-continued

Electroconductive layer

| Example | M-D structure | Domain satisfying (1) Number % | Domain satisfying (2) Number % | Domain satisfying (1) and (2) Number % | Average value of A/B [A/B] | Average value of maximum Feret diameters of domains (µm) | Volume resistivity of matrix (Ω·cm) | Average value Dc of distances between wall surfaces of CB (nm) | Coefficient of variation σm/Dc | Average value of proportions of sectional areas of CB with respect to sectional areas of domains (%) |
|---|---|---|---|---|---|---|---|---|---|---|
| 31 | Present | 87 | 93 | 85 | 1.08 | 2.5 | 8.30E+13 | 111 | 0.2 | 28.0 |
| 32 | Present | 87 | 93 | 85 | 1.08 | 2.5 | 8.30E+13 | 111 | 0.2 | 28.0 |
| 33 | Present | 87 | 93 | 85 | 1.08 | 2.5 | 8.30E+13 | 111 | 0.2 | 28.0 |
| 34 | Present | 87 | 93 | 85 | 1.08 | 2.5 | 8.30E+13 | 111 | 0.2 | 28.0 |
| 35 | Present | 87 | 93 | 85 | 1.08 | 2.5 | 8.30E+13 | 111 | 0.2 | 28.0 |
| 36 | Present | 87 | 93 | 85 | 1.08 | 2.5 | 8.30E+13 | 111 | 0.2 | 28.0 |
| 37 | Present | 87 | 93 | 85 | 1.08 | 2.5 | 8.30E+13 | 111 | 0.2 | 28.0 |
| 38 | Present | 87 | 93 | 85 | 1.08 | 2.5 | 8.30E+13 | 111 | 0.2 | 28.0 |
| 39 | Present | 87 | 93 | 85 | 1.08 | 2.5 | 8.30E+13 | 111 | 0.2 | 28.0 |
| 40 | Present | 87 | 93 | 85 | 1.08 | 2.5 | 8.30E+13 | 111 | 0.2 | 28.0 |
| 41 | Present | 87 | 93 | 85 | 1.08 | 2.5 | 8.30E+13 | 111 | 0.2 | 28.0 |
| 42 | Present | 87 | 93 | 85 | 1.08 | 2.5 | 8.30E+13 | 111 | 0.2 | 28.0 |
| 43 | Present | 87 | 93 | 85 | 1.08 | 2.5 | 8.30E+13 | 111 | 0.2 | 28.0 |
| 44 | Present | 87 | 93 | 85 | 1.08 | 2.5 | 8.30E+13 | 111 | 0.2 | 28.0 |
| 45 | Present | 87 | 93 | 85 | 1.08 | 2.5 | 8.30E+13 | 111 | 0.2 | 28.0 |

*Distance between tin oxide particles

In Table 6-2, "average value of A/B", "average value of maximum Feret diameters of domains", "average value Dc of distances between wall surfaces of CB", "coefficient of variation σm/Dc", and "average value of proportions of sectional areas of CB with respect to sectional areas of domains" are calculated from values of the domains satisfying both (1) and (2).

TABLE 6-3

| | Evaluation as charging member | | |
|---|---|---|---|
| Example | Injection charge quantity (V) | Dirt test | Evaluation rank of stable chargeability |
| 1 | −16.2 | 36 | C |
| 2 | −23.5 | 20 | B |
| 3 | −22.2 | 23 | B |
| 4 | −13.9 | 41 | C |
| 5 | −29.9 | 5 | A |
| 6 | −26.7 | 12 | A |
| 7 | −22.7 | 21 | B |
| 8 | −23.0 | 21 | B |
| 9 | −25.6 | 15 | A |
| 10 | −26.4 | 13 | A |
| 11 | −23.2 | 20 | B |
| 12 | −16.6 | 35 | C |
| 13 | −12.3 | 45 | C |
| 14 | −15.5 | 38 | C |
| 15 | −16.0 | 36 | C |
| 16 | −15.8 | 37 | C |
| 17 | −16.3 | 36 | C |
| 18 | −11.0 | 48 | C |
| 19 | −16.3 | 36 | C |
| 20 | −12.8 | 44 | C |
| 21 | −13.9 | 41 | C |
| 22 | −26.7 | 12 | A |
| 23 | −23.2 | 20 | B |
| 24 | −16.3 | 36 | C |
| 25 | −12.3 | 45 | C |
| 26 | −30.2 | 5 | A |
| 27 | −25.9 | 14 | A |
| 28 | −14.4 | 40 | C |
| 29 | −18.4 | 31 | C |
| 30 | −13.6 | 42 | C |
| 31 | −11.3 | 47 | C |
| 32 | −20.7 | 26 | B |

TABLE 6-3-continued

| | Evaluation as charging member | | |
|---|---|---|---|
| Example | Injection charge quantity (V) | Dirt test | Evaluation rank of stable chargeability |
| 33 | −25.1 | 16 | B |
| 34 | −26.4 | 13 | A |
| 35 | −27.8 | 10 | A |
| 36 | −22.0 | 23 | B |
| 37 | −25.6 | 15 | A |
| 38 | −30.4 | 4 | A |
| 39 | −28.2 | 10 | A |
| 40 | −30.9 | 3 | A |
| 41 | −31.8 | 1 | A |
| 42 | −10.0 | 50 | C |
| 43 | −22.0 | 23 | B |
| 44 | −11.3 | 47 | C |
| 45 | −12.2 | 45 | C |

Comparative Examples 1 to 7

[6-1. Preparation of Rubber Compositions C1 to C7 for forming Domains (CMB)]

Rubber compositions for forming domains for forming respective electroconductive layers C1 to C7 of electroconductive rollers C1 to C7 according to Comparative Examples 1 to 7 were prepared. Specifically, the rubber compositions for forming domains were prepared in the same manner as in the above-mentioned section [1-1] except that the blending amounts of materials shown in Table 7-1 were set to those shown in Table 7-1.

[6-2. Preparation of Rubber Compositions C3 to C7 for forming Matrix (MRC)]

Rubber compositions for forming matrices for forming respective electroconductive layers C3 to C7 of electroconductive rollers C3 to C7 according to Comparative Examples 3 to 7 were prepared. Specifically, the rubber compositions for forming matrices were prepared in the same manner as in the above-mentioned section [1-2] except that the blending amounts of materials shown in Table 7-2 were set to those shown in Table 7-2.

TABLE 7-1

Rubber composition for forming domains (CMB)

| Electro-conductive layer | Second rubber | | | | | Electroconductive agent | | |
|---|---|---|---|---|---|---|---|---|
| | Kind of rubber | Abbre-viation | Mooney viscosity | SP value | Number of parts | Abbre-viation | DBP absorption amount | Number of parts |
| C1 | ECO | CG102 | 64 | 18.5 | 100 | LV | — | 3 |
| C2 | NBR | N230SV | 32 | 20 | 100 | #7360 | 87 | 50 |
| C3 | EPDM | E505A | 47 | 16 | 100 | EC300JD | 360 | 10 |
| C4 | SBR | T2003 | 32 | 17 | 100 | — | — | — |
| C5 | BR | 150B | 16.8 | 16.8 | 100 | #7360 | 87 | 80 |
| C6 | IR | IR2200L | 70 | 16.5 | 100 | EC300JD | 360 | 20 |
| C7 | NBR | N215SL | 45 | 21.7 | 100 | #7360 | 87 | 60 |

| | Rubber composition for forming domains (CMB) | | | | | | | |
|---|---|---|---|---|---|---|---|---|
| Electro-conductive layer | Zinc oxide Number of parts | Zinc stearate Number of parts | Additive Abbre-viation | Additive Number of parts | Filler Abbre-viation | Filler Number of parts | Plasticizer Abbre-viation | Plasticizer Number of parts |
| C1 | 5 | 1 | NS | 1 | #30 | 60 | P202 | 10 |
| C2 | 5 | 1 | — | — | #30 | 40 | — | — |
| C3 | — | 1 | — | — | — | — | PW380 | 30 |
| C4 | 5 | 1 | — | — | — | — | — | — |
| C5 | 5 | 1 | — | — | — | — | — | — |
| C6 | 5 | 1 | — | — | — | — | — | — |
| C7 | 5 | 1 | AQ | 30 | — | — | — | — |

TABLE 7-2

Rubber composition for forming matrix (MRC)

| Electro-conductive layer | First rubber | | | | | Zinc oxide Number of parts | Zinc stearate Number of parts | Filler | |
|---|---|---|---|---|---|---|---|---|---|
| | Kind | Product name | Mooney viscosity | SP value | Number of parts | | | Kind | phr |
| C3 | ECO | ON301 | 32 | 18.5 | 100 | — | 1.4 | — | — |
| C4 | NBR | N230SV | 32 | 20 | 100 | 5 | 1 | #7360 | 60 |
| C5 | EPDM | E505A | 47 | 16 | 100 | 5 | 1 | — | — |
| C6 | SBR | T2003 | 33 | 17 | 100 | 5 | 1 | — | — |
| C7 | EPDM | E505A | 47 | 16 | 100 | 5 | 1 | #30 | 40 |

[6-3. Preparation of Rubber Compositions C1 to C7 for forming Electroconductive Layers]

Rubber compositions C1 to C7 for electroconductive layers for forming the electroconductive layers C1 to C7 were prepared in the same manner as in the electroconductive rubber composition 1 except that the blending amounts of the CMB shown in Table 7-1, the MRC shown in Table 7-2, and other materials were set to those shown in Table 7-3.

TABLE 7-3

| | Rubber composition for forming electroconductive layer | | | | | | | | |
|---|---|---|---|---|---|---|---|---|---|
| Electro-conductive layer | CMB Number of parts | MRC Number of parts | Vulcanizing agent Kind | Vulcanizing agent phr | Vulcanization accelerator 1 Kind | Vulcanization accelerator 1 phr | Vulcanization accelerator 2 Kind | Vulcanization accelerator 2 phr | SP value difference |
| C1 | 100 | 0 | Sulfur | 1.8 | TS | 1 | DM | 1 | — |
| C2 | 100 | 0 | Sulfur | 3 | TBZTD | 1 | TBSI | 1 | — |
| C3 | 32 | 68 | 25-B-40 | 2.5 | TAIC-M60 | 1.5 | — | — | 2.5 |
| C4 | 25 | 75 | Sulfur | 3 | IBZTD | 1 | TBSI | 1 | 3.0 |
| C5 | 45 | 55 | Sulfur | 3 | EP-60 | 3 | — | — | 0.8 |
| C6 | 25 | 75 | Sulfur | 3 | TBZTD | 1 | TBSI | 0.5 | 0.5 |
| C7 | 30 | 70 | Sulfur | 3 | EP-60 | 3 | — | — | 5.7 |

The raw materials in Table 7-1 to Table 7-3 above are as follows. CG102: epichlorohydrin rubber (EO-EP-AGE ternary copolymer) (product name: EPICHLOMER CG102, SP value: 18.5 $(J/cm^3)^{0.5}$, manufactured by Osaka Soda Co., Ltd.)

ON301: epichlorohydrin rubber (EO-EP-AGE ternary copolymer) (product name: EPION 301, SP value: 18.5 $(J/cm^3)^{0.5}$ manufactured by Osaka Soda Co., Ltd.)

EC300JD: ketjen black (product name: ketjen black EC300JD, manufactured by Ketjen Black International Company)

LV: quaternary ammonium salt (product name: ADK CIZER LV-70, manufactured by ADEKA Corporation)

P202: aliphatic polyester-based plasticizer (product name: POLYCIZER P-202, manufactured by DIC Corporation)

AQ: silica (product name: Nipsil AQ, manufactured by Tosoh Corporation)

MB: 2-mercaptobenzimidazole (product name: NOCRAC MB, manufactured by Ouchi Shinko Chemical Industrial Co., Ltd.)

TS: tetramethylthiuram monosulfide (product name: NOCCELER TS, manufactured by Ouchi Shinko Chemical Industrial Co., Ltd.)

DM: di-2-benzothiazolyl disulfide (DM) (product name: NOCCELER DM-P(DM), manufactured by Ouchi Shinko Chemical Industrial Co., Ltd.)

PW380: paraffin oil (product name: PW-380, manufactured by Idemitsu Kosan Co., Ltd.)

25-B-40: 2,5-dimethyl-2,5-di(t-butylperoxy)hexyne (product name: PERHEXA 25B-40, manufactured by NOF Corporation)

TAIC-M60: triallyl isocyanurate (product name: TAIC-M60, manufactured by Nihon Kasei Co., Ltd.)

[6-4. Production of Rollers C1 to C7 for Electrophotography]

Electroconductive rollers C1 to C7 were produced in the same manner as in Example 1 except that rubbers C1 to C7 for forming electroconductive layers were used. Rollers C1 to C7 for electrophotography were each produced by forming a surface layer formed of the coating liquid 1 for a surface layer in the same manner as in Example 1 except that the obtained electroconductive rollers C1 to C7 were used. The obtained rollers C1 to C7 for electrophotography were subjected to the evaluations described in Example 1. The evaluation results are shown in Table 8. In Comparative Examples 1 and 2, as a result of determining the presence or absence of a M-D structure in the electroconductive layer, the electroconductive layer did not have a matrix-domain structure, and hence the other evaluations were not performed on the electroconductive layer.

In addition, in Comparative Example 5, the electroconductive layer did not have a matrix-domain structure, and an electroconductive phase and an insulating phase formed a co-continuous structure. Accordingly, the other evaluations were not performed similarly on the electroconductive layer.

Comparative Example 8

[7-1. Preparation of Rubber Particles for Forming Domains]

The rubber composition C2 for forming an electroconductive layer according to Comparative Example 2 was independently heated and vulcanized, and then subjected to frost shattering to produce rubber particles.

[7-2. Preparation of Rubber Composition for forming Matrix]

A rubber composition C8 for forming a matrix (MRC) was prepared in the same manner as in the above-mentioned section [1-2] except that materials shown in Table 7-4 were used in blending amounts shown in Table 7-4.

TABLE 7-4

| | Rubber composition for forming matrix (MRC) | | | | | | |
|---|---|---|---|---|---|---|---|
| | First rubber | | | | Zinc oxide | Zinc stearate | |
| Kind | Product name | Mooney viscosity | SP value | Number of parts | Number of parts | Number of parts | Filler |
| | | | | | | | Kind phr |
| C8 | SBR T2003 | 33 | 17 | 100 | 5 | 1 | #30 40 |

[7-3. Preparation of Rubber Composition C8 for Forming Electroconductive Layer]

A rubber composition C8 for forming an electroconductive layer was prepared in the same manner as the rubber composition 1 for forming an electroconductive layer except that the blending amounts of the rubber particles prepared in the above-mentioned section [7-1], the MRC prepared in the above-mentioned section [7-2], and other materials were set to those shown in Table 7-5.

TABLE 7-5

| Rubber composition for forming electro-conductive layer | Rubber particles Number of parts | MRC Number of parts | Vulcanizing agent | | Vulcanization accelerator 1 | | Vulcanization accelerator 2 | |
|---|---|---|---|---|---|---|---|---|
| | | | Kind | phr | Kind | phr | Kind | phr |
| C8 | 25 | 75 | Sulfur | 3 | TBZTD | 1 | TBSI | 1 |

[7-4. Production of Roller C8 for Electrophotography]

An electroconductive roller C8 was produced in the same manner as in Example 1 except that a rubber composition C8 for forming an electroconductive layer was used. A roller C8 for electrophotography was produced in the same manner as in Example 1 except that the obtained electroconductive roller C8 was used. The obtained roller C8 for electrophotography was subjected to the evaluations described in Example 1.

Comparative Example 9

A coating liquid C1 for forming a surface layer was produced in the same manner as the coating liquid 1 for a surface layer except that the carbon black was not used in the coating liquid 1 for a surface layer. A roller C9 for electrophotography was produced in the same manner as in Example 1 except that the coating liquid C1 was used. The obtained roller C9 for electrophotography was subjected to the evaluations described in Example 1.

Comparative Example 10

A coating liquid C2 for a surface layer was prepared in the same manner as the coating liquid 1 for a surface layer except that 7 parts by mass of LV: quaternary ammonium salt (product name: ADK CIZER LV70, manufactured by Adeka Corporation) was used as an ionic electroconductive agent instead of carbon black in the coating liquid 1 for a surface layer. A roller C10 for electrophotography was produced in the same manner as in Example 1 except that the coating liquid C2 for a surface layer was used. The obtained roller C10 for electrophotography was subjected to the evaluations described in Example 1.

The evaluation results of Comparative Examples 1 to 10 are shown in Tables 8-1 to 8-3.

TABLE 8-1

| Comparative Example | No. of roller for electrophotography | No. of electroconductive layer | No. of coating liquid for surface layer | UV | Impedance ($\Omega$) | Thickness of surface layer ($\mu$m) | Universal hardness | Volume resistivity of surface layer ($\Omega \cdot$ cm) | Number of minute protrusions (piece) |
|---|---|---|---|---|---|---|---|---|---|
| 1 | C1 | C1 | 1 | Present | 4.14E+07 | 20 | 3.2 | 6.80E+10 | 210 |
| 2 | C2 | C2 | 1 | Present | 2.52E+07 | 20 | 3.2 | 6.80E+10 | 210 |
| 3 | C3 | C3 | 1 | Present | 3.11E+07 | 20 | 3.2 | 6.80E+10 | 210 |
| 4 | C4 | C4 | 1 | Present | 1.58E+05 | 20 | 3.2 | 6.80E+10 | 210 |
| 5 | C5 | C5 | 1 | Present | 3.24E+05 | 20 | 3.2 | 6.80E+10 | 210 |
| 6 | C6 | C6 | 1 | Present | 3.38E+05 | 20 | 3.2 | 6.80E+10 | 210 |
| 7 | C7 | C7 | 1 | Present | 3.24E+06 | 20 | 3.2 | 6.80E+10 | 210 |
| 8 | C8 | C8 | 1 | Present | 4.95E+06 | 20 | 3.2 | 6.80E+10 | 210 |
| 9 | C9 | 1 | C1 | Present | 1.40E+08 | 20 | 2.9 | 4.80E+14 | 0 |
| 10 | C10 | 1 | C2 | Present | 1.22E+07 | 20 | 3.1 | 4.20E+10 | 0 |

TABLE 8-2

| Comparative Example | M-D structure | Domain satisfying (1) Number % | Domain satisfying (2) Number % | Domain satisfying (1) and (2) Number % | Average value of A/B [A/B] | Average maximum Feret diameter of domain ($\mu$m) |
|---|---|---|---|---|---|---|
| 1 | Absent | — | — | — | — | — |
| 2 | Absent | — | — | — | — | — |
| 3 | Present | 23 | 26 | 15 | 1.1 | 7.0 |
| 4 | Present | 84 | 90 | 82 | 1.06 | 4.0 |
| 5 | Absent | — | — | — | — | — |
| 6 | Present | 25 | 27 | 18 | 1.3 | 2.3 |
| 7 | Present | 0 | 0 | 0 | 1.7 | 8.7 |
| 8 | Present | 0 | 0 | 0 | 1.6 | 9.2 |
| 9 | Present | 87 | 93 | 85 | 1.08 | 2.5 |
| 10 | Present | 87 | 93 | 85 | 1.08 | 2.5 |

| Comparative Example | Volume resistivity of matrix ($\Omega \cdot$ cm) | Average value Dc of distances between wall surfaces of CB (nm) | Coefficient of variation $\sigma$m/Dc | Average value of proportions of sectional areas of CB with respect to sectional areas of domains (%) | SP value difference |
|---|---|---|---|---|---|
| 1 | — | — | — | — | — |
| 2 | — | — | — | — | — |
| 3 | 1.44E+07 | 131 | 0.3 | 27.0 | 2.5 |
| 4 | 9.18E+04 | — | — | — | 3.0 |

TABLE 8-2-continued

| | | | | | |
|---|---|---|---|---|---|
| 5 | 3.80E+16 | — | — | — | 0.8 |
| 6 | 9.00E+14 | 132 | 0.8 | 27.3 | 0.5 |
| 7 | 2.10E+16 | 112 | 0.6 | 27.8 | 5.7 |
| 8 | 9.50E+13 | 115 | 0.8 | 27.5 | 3.0 |
| 9 | 8.30E+13 | 111 | 0.2 | 28.0 | 3.0 |
| 10 | 8.30E+13 | 111 | 0.2 | 28.0 | 3.0 |

TABLE 8-3

| | Evaluation as charging member | | |
|---|---|---|---|
| | Injection charge quantity (V) | Dirt test | Evaluation rank of stable chargeability |
| Comparative Example 1 | −0.7 | 107 | D |
| Comparative Example 2 | −1 | 105 | D |
| Comparative Example 3 | −1.2 | 88.0 | D |
| Comparative Example 4 | −0.7 | 93.0 | D |
| Comparative Example 5 | −1.2 | 94.0 | D |
| Comparative Example 6 | −0.5 | 87.0 | D |
| Comparative Example 7 | −0.8 | 107.0 | D |
| Comparative Example 8 | −0.4 | 111.0 | D |
| Comparative Example 9 | 0.0 | 83.0 | D |
| Comparative Example 10 | −0.8 | 84.0 | D |

In Comparative Example 1, the ion-conducting electroconductive layer is used. Because of this, it takes time to transport electric charge from the support to the surface layer in a high-speed process, and the supply of electric charge to the toner becomes insufficient. Accordingly, dirt deposition caused by insufficient discharge of dirt occurred, and white spots were generated on an image.

In Comparative Example 2, the electroconductive layer does not have a matrix-domain structure and is formed of only a domain material. Because of this, the electroconductive layer has a configuration in which electric field concentration occurs, and excessive electric charge is liable to flow to an electroconductive path. There is a configuration in which there are many portions in which electric charge does not flow easily, and the supply of electric charge to the dirt is insufficient in those portions. Dirt was deposited, and white spots were generated.

In Comparative Example 3, the electroconductive layer had a matrix-domain structure, but the proportion of the domains satisfying (1) and (2) was 80 number % or less. The reason for this is conceived as described below. The amount of carbon black added to the domains was small, and a sufficient amount of carbon gel was not able to be formed. Accordingly, the domain shapes became uneven. As a result, the electroconductive layer has a configuration in which electric field concentration occurs, and excessive electric charge is liable to flow to an electroconductive path.

Excessive movement of electric charge caused by electric field concentration derived from the domain shapes occurs. There is a configuration in which there are many portions in which electric charge does not flow easily, and the supply of electric charge to the dirt is insufficient in those portions. Dirt was deposited, and white spots were generated.

In Comparative Example 4, the electroconductive layer has a matrix-domain structure. However, the domains are insulating because an electroconductive agent is not added thereto, and the matrix is electroconductive because electroconductive particles are added thereto and is a continuous layer. That is, the electrophotographic electroconductive member has a configuration of having a single electroconductive path. Accordingly, the electroconductive layer has a configuration in which electric field concentration occurs, and excessive electric charge is liable to flow to the electroconductive path. There is a configuration in which there are many portions in which electric charge does not flow easily, and the supply of electric charge to the dirt is insufficient in those portions. Dirt was deposited, and white spots were generated.

In Comparative Example 5, the electroconductive layer has a co-continuous structure of an electroconductive phase and an insulating phase instead of a matrix-domain structure. That is, the electrophotographic electroconductive member has a configuration of having a single electroconductive path. Accordingly, the electroconductive layer has a configuration in which electric field concentration occurs, and excessive electric charge is liable to flow to the electroconductive path. There is a configuration in which there are many portions in which electric charge does not flow easily, and the supply of electric charge to the dirt is insufficient in those portions. Dirt was deposited, and white spots were generated.

In Comparative Example 6, the electroconductive layer had a matrix-domain structure, but the proportion of the domains satisfying (1) and (2) was 80 number % or less. The reason for this is conceived as described below. The amount of carbon black added to the domains was small, and a sufficient amount of carbon gel was not able to be formed. Accordingly, the domain shapes did not become circular shapes, and unevenness and an aspect ratio were increased. As a result, the electroconductive layer has a configuration in which electric field concentration occurs, and excessive electric charge is liable to flow to the electroconductive path. There is a configuration in which there are many portions in which electric charge does not flow easily, and the supply of electric charge to the dirt is insufficient in those portions. Dirt was deposited, and white spots were generated.

In Comparative Example 7, the electroconductive layer had a matrix-domain structure, but the proportion of the domains satisfying (1) and (2) was 0 number %. As a result, the electroconductive layer has a configuration in which electric field concentration occurs, and excessive electric charge is liable to flow to the electroconductive path. There is a configuration in which there are many portions in which electric charge does not flow easily, and the supply of electric charge to the dirt is insufficient in those portions. Dirt was deposited, and white spots were generated.

In Comparative Example 8, the electroconductive layer had a matrix-domain structure, but the proportion of the domains satisfying (1) and (2) was 0 number %. The reason for this is that large-sized and anisotropic electroconductive rubber particles formed by frost shattering are dispersed. As a result, the electroconductive layer has a configuration in which electric field concentration occurs, and excessive electric charge is liable to flow to the electroconductive path. There is a configuration in which there are many portions in which electric charge does not flow easily, and the supply of electric charge to the dirt is insufficient in those portions. Dirt was deposited, and white spots were generated.

In Comparative Example 9, the non-electroconductive surface layer is used, and hence the supply of electric charge to the toner is insufficient. Accordingly, dirt deposition caused by insufficient discharge of dirt occurred, and white spots were generated on an image.

In Comparative Example 10, the ion-conducting surface layer is used, and hence it takes time to transport electric charge from the support to the surface layer in a high-speed process, and the supply of electric charge to the toner becomes insufficient. Accordingly, dirt deposition caused by insufficient discharge of dirt occurred, and white spots were generated on an image.

Example 46

[Production of Electroconductive Roller 29]

An electroconductive roller 29 was produced in the same manner as the electroconductive roller 1 except that, in the step of polishing the electroconductive resin layer in the production of the electroconductive roller 1, the electroconductive resin layer was polished into a crown shape in which each diameter at positions of 90 mm from the center portion to both end portion sides was 12.0 mm, and the diameter of the center portion was 12.2 mm.

[Preparation of Coating Liquid 17 for Surface Layer]

The following materials were mixed and stirred.

Polyether polyol (product name: PEG-1000, manufactured by Sanyo Chemical Industries, Ltd.): 52.0 parts by mass Isocyanate (product name: MILLIONATE MR-400, manufactured by Tosoh Corporation): 48.0 parts by mass Carbon black (product name: MA-100, manufactured by Mitsubishi Chemical Corporation): 15.0 parts by mass Urethane resin fine particles (product name: ART PEARL C-400T, manufactured by Negami Chemical Industrial Co., Ltd.): 20.0 parts by mass Next, methyl ethyl ketone was added to the mixture so that the total solid content ratio was 30 mass %, and then the mixture was mixed by a sand mill. Then, the viscosity was further adjusted to from 10 cps to 12 cps with methyl ethyl ketone to prepare a coating liquid 17 for a surface layer.

[Production of Roller 46 for Electrophotography]

A roller 46 for electrophotography was produced in the same manner as in Example 1 except that the electroconductive roller 29 and the coating liquid 17 for a surface layer were used, the drying conditions in a hot air drying furnace were set to a temperature of 15° C. and 1 hour, and the UV irradiation was not performed.

[Evaluations]

The obtained roller 46 for electrophotography was subjected to the evaluations <4-1> and <4-2> described in Example 1 and the following evaluations <7-1> to <7-4>. The evaluation <4-3> was not performed because the configuration of the electroconductive layer was the same as that of the roller 1 for electrophotography according to Example 1.

<7-1. Evaluations of Physical Properties as Developing Roller>

The characteristics of the roller 46 for electrophotography as a developing roller were evaluated as described below.

<7-2. Evaluation of Image (Fogging)>

A magenta toner cartridge for a laser printer (product name: HP Color Laserjet Enterprise CP4515dn, manufactured by Hewlett-Packard Company) having the roller 46 for electrophotography attached thereto as a developing roller was loaded into the laser printer. In order to perform evaluation in a high-speed process, the laser printer was reconstructed so that the number of output sheets per unit time was 50 sheets/min for A4-size paper, which was larger than the original number of output sheets. The laser printer was left to stand under a high-temperature and high-humidity environment having a temperature of 32° C. and a relative humidity of 85% for 6 hours.

Next, an image in which the alphabet letter "E" with a size of 4 points was printed so that the coverage was 1% with respect to the area of A4-size paper (hereinafter sometimes referred to as "E letter image") was continuously output on a predetermined number of copy sheets.

After that, a solid white image was output on a new copy sheet, and the printer was stopped while the solid white image was being output. In this case, the toner adhering to the photosensitive member was peeled off with a tape (product name: CT18, manufactured by Nichiban Co., Ltd.), and the reflectance was measured with a reflection densitometer (product name: TC-6DS/A, manufactured by Tokyo Denshoku Co., Ltd.). The decrease amount (%) of reflectance when the reflectance of the tape was used as a reference was measured, and the measured value was adopted as a fogging value. Based on the fogging value, evaluation was performed based on the following criteria.

Rank A: The fogging value is less than 1.5%.
Rank B: The fogging value is 1.5% or more and less than 3.0%.
Rank C: The fogging value is 3.0% or more and less than 5.0%.
Rank D: The fogging value is 5.0% or more.

<7-3. Toner Charge Quantity>

The charge quantity was measured in order to evaluate the charge imparting property of the developing roller with respect to the toner.

At the time of the above-mentioned image evaluation, the toner carried in a narrow portion of a part sandwiched at an abutment position between a toner regulating blade and a photosensitive drum of the developing roller was sucked and collected by a metal cylindrical tube and a cylindrical filter. In this case, the charge quantity stored in a capacitor through the metal cylindrical tube and the mass of the sucked toner were measured. The charge quantity was measured through use of a measuring machine (product name: 8252) manufactured by Electro Design Corporation. Then, from those values, the charge quantity ($\mu$C/g) per unit mass was calculated. When negatively chargeable toner is used, the sign of the charge quantity per unit mass is negative, and it can be said that, when the absolute value is larger, the charge imparting property of the developing roller is high. The value obtained by the measurement was adopted as a toner charge quantity.

<7-4. Toner Charge Quantity Distribution>

In order to evaluate the spread of a toner charge quantity, a charge quantity distribution was measured.

The charge quantity distribution was measured through use of a powder measurement charge quantity/particle diameter distribution estimation device (product name: E-spart Analyzer Model EST-III, manufactured by Hosokawa Micron Corporation). The charge quantity distribution was measured in the same manner as in the toner charge quantity measurement except for the foregoing. The number of measurement particles was set to about 3,000. A standard deviation was calculated from the obtained charge quantity distribution, and the obtained value was adopted as an initial toner charge quantity distribution.

<High-temperature and High-humidity/Low-temperature and Low-humidity Cycle Test>

A test for performing evaluation alternately under a high-temperature and high-humidity environment and a low-temperature and low-humidity environment (hereinafter referred to as "environmental cycle test") was performed as described below. First, a magenta toner cartridge loaded with each developing roller was loaded into the above-mentioned laser printer in the same manner as in that used in the evaluation of image (fogging), and the laser printer was set under a high-temperature and high-humidity environment (hereinafter referred to as "H/H") having a temperature of 32° C. and a relative humidity of 85%. Then, the laser printer was left to stand for 30 minutes. Next, under this environment, an image in which the alphabet letter "E" with a size of 4 points was printed so that the coverage was 1% with respect to the area of A4-size paper (hereinafter sometimes referred to as "E letter image") was continuously output on 500 copy sheets. Then, the toner cartridge and the laser printer were set under a low-temperature and low-humidity environment (hereinafter referred to as "L/L") having a temperature of 15° C. and a relative humidity of 10% RH and left to stand for 30 minutes. Next, under this environment, an image in which the alphabet letter "E" with a size of 4 points was printed so that the coverage was 1% with respect to the area of A4-size paper (hereinafter sometimes referred to as "E letter image") was continuously output on 500 copy sheets.

The image output under H/H and L/L was set as one cycle, and five cycles in total were repeated.

Next, the evaluations regarding the above-mentioned <Evaluation of Image (Fogging)>, <Toner Charge Quantity>, and <Toner Charge Quantity Distribution> were performed in the same manner.

Further, the roller for electrophotography was removed from the toner cartridge, and the failure state in the vicinity of the surface layer of the roller for electrophotography was visually observed and evaluated based on the following criteria.

Rank A: No failure is recognized over the entire developing roller.

Rank B: Minor failure is recognized only in an end portion of the developing roller (range of 1.5 cm from the farthest end portion of the electroconductive layer in a longitudinal direction).

Rank C: Minor failure is recognized in a region other than the end portion of the developing roller.

Rank D: Failure is recognized in any of the entire developing roller, and a problem occurs on an image.

Examples 47 to 50

[Preparation of Coating Liquids 18 to 21 for Surface Layer]

Coating liquids 18 to 21 for surface layers were prepared in the same manner as the coating liquid 17 for a surface layer except that the binder resin raw material and the electroconductive agent were changed as shown in Table 9-1.

TABLE 9-1

| Coating liquid for surface layer | Binder resin | | | | Electroconductive agent | | | |
|---|---|---|---|---|---|---|---|---|
| | Product name | Parts by mass | Product name | Parts by mass | Product name | Parts by mass | Product name | Parts by mass |
| 17 | PEG-1000 | 52.0 | MR-400 | 48.0 | MA-100 | 20.0 | — | — |
| 18 | SANNIX PP-4000 | 62.5 | Coronate 2233 | 37.5 | Printex 25 | 10.0 | — | — |
| 19 | PTMG-2000 | 65.0 | Coronate L | 35.0 | | 30.0 | | |
| 20 | PTG-L3500 | 73.5 | | 26.5 | | 10.0 | CIL-312 | 2.0 |
| 21 | ETERNACOLL PH-300 | 73.5 | Coronate L | 26.5 | Printex 25 | 10.0 | — | — |
| 22 | ACRYDIC A817 | 75.0 | U-VAN 20SB | 25.0 | | 10.0 | — | — |

*The respective materials shown in Table 9-1 are as follows.
PEG-1000: manufactured by Sanyo Chemical Industries, Ltd., polyethylene glycol
SANNIX PP-1000: manufactured by Sanyo Chemical Industries, Ltd., polypropylene glycol
SANNIX PP-4000: manufactured by Sanyo Chemical Industries, Ltd., polypropylene glycol
PTMG-2000: manufactured by Hodogaya Chemical Co., Ltd., polytetramethylene glycol
PTG-L3500: manufactured by Hodogaya Chemical Co., Ltd., polyethylene glycol
Nippolan 4002: manufactured by Tosoh Corporation, ethylene adipate-based polyester polyol
Nippolan 4010: manufactured by Tosoh Corporation, butylene adipate-based polyester polyol
ETERNACOLL PH-300: manufactured by Ube Industries, Ltd., 1,6-HD/1,5-PD-based polycarbonate diol
ACRYDIC A817: manufactured by DIC Corporation, acrylic polyol
MR-400: manufactured by Tosoh Corporation (product name: MILLIONATE MR-400), polymeric MDI
Coronate 2233: manufactured by Tosoh Corporation, TDI-based polyisocyanate
Coronate L: manufactured by Tosoh Corporation, TDI-based polyisocyanate
U-VAN 20SB: manufactured by Mitsui Chemicals, Inc., melamine resin
MA-100: manufactured by Mitsubishi Chemical Corporation, carbon black
Printex 25: manufactured by Orion Engineered Carbons, carbon black
CIL-312: manufactured by Japan Carlit Co., Ltd., ionic liquid

[Production of Rollers 47 to 50 for Electrophotography]

Rollers 47 to 50 for electrophotography were produced in the same manner as in Example 46 except that the coating liquids 17 to 22 for surface layers were used. The obtained rollers 47 to 50 for electrophotography were subjected to the evaluations described in Example 46.

Example 51

[Preparation of Coating Liquid 22 for Surface Layer]

The following materials were mixed and stirred.

Acrylic polyol (product name: ACRYDIC A817, manufactured by DIC Corporation): 75.0 parts by mass Melamine resin (product name: U-VAN 20SB, manufactured by Mitsui Chemicals, Inc.): 25.0 parts by mass Carbon black (product name: Printex 25, manufactured by Orion Engineered Carbons): 10.0 parts by mass Lithium salt compound (product name: EFTOP EF-N115, manufactured by Mitsubishi Materials Electronic Chemicals Co., Ltd.): 2.0 parts by mass Urethane resin fine particles (product name: ART PEARL C-400T, manufactured by Negami Chemical Industrial Co., Ltd.): 20.0 parts by mass Next, methyl ethyl ketone was added to the mixture so that the total solid content ratio was 30 mass %, and then the mixture was mixed by a sand mill. Then, the viscosity was further adjusted to from 10 cps to 12 cps with methyl ethyl ketone to prepare a coating liquid 22 for a surface layer.

[Production of Roller 51 for Electrophotography]

A roller 51 for electrophotography having a surface layer with a thickness of 15 μm on an outer periphery of the electroconductive layer was produced in the same manner as in Example 46 except that the coating liquid 22 for a surface layer was used, and the drying conditions in a hot air drying furnace were set to heating at a temperature of 140° C. for 30 minutes. The obtained roller 51 for electrophotography was subjected to the evaluations described in Example 46.

The evaluation results of Examples 46 to 51 are shown in Tables 9-2 and 9-3.

TABLE 9-2

| | | | | | | Surface layer | | | |
|---|---|---|---|---|---|---|---|---|---|
| Example | No. of roller for electro-photography | No. of electro-conductive roller | Coating liquid for surface layer | Roller for electrophoto graphy Impedance (Ω) | Thickness (μm) | Universal hardness | Volume resistivity of surface layer (Ω · cm) | Number of minute protrusions (piece) | Urethane group concen-tration (%) | Partial structure of urethane resin in surface layer |
| 46 | 46 | 29 | 17 | 4.10E+06 | 10 | 2.8 | 5.30E+05 | 0 | 6.8 | — |
| 47 | 47 | 29 | 18 | 7.47E+06 | 13 | 3.0 | 8.90E+06 | 0 | 1.3 | — |
| 48 | 48 | 29 | 19 | 3.72E+06 | 11 | 2.6 | 4.20E+04 | 0 | 4.8 | (1) |
| 49 | 49 | 29 | 20 | 5.27E+06 | 12 | 2.7 | 9.50E+05 | 0 | 1.5 | (1) |
| 50 | 50 | 29 | 21 | 1.02E+07 | 10 | 3.3 | 3.40E+08 | 0 | 3.4 | (3) |
| 51 | 51 | 29 | 22 | 3.90E+07 | 10 | 2.8 | 4.30E+10 | 0 | — | — |

TABLE 9-3

| | Evaluation as developing roller | | | | | |
|---|---|---|---|---|---|---|
| | Initial | | | After high-temperature and high-humidity/low-temperature and low-humidity cycle | | Evaluation |
| Example | Fogging evaluation rank | Toner charge quantity (μC/g) | Toner charge quantity distribution | Fogging evaluation rank | Toner charge quantity (μC/g) | Toner charge quantity distribution | rank of failure state in vicinity of surface layer |
| 46 | A | −40 | 3.1 | A | −35 | 3.2 | A |
| 47 | A | −41 | 3.1 | A | −35 | 3.1 | A |
| 48 | A | −45 | 2.6 | A | −41 | 2.8 | A |
| 49 | A | −41 | 2.4 | A | −37 | 2.6 | A |
| 50 | A | −42 | 2.3 | A | −38 | 2.5 | A |
| 51 | A | −44 | 2.7 | B | −32 | 3.5 | B |

The present invention is not limited to the embodiments described above, and various changes and modifications may be made without departing from the spirit and scope of the present invention. The following claims are appended hereto in order to make the scope of the present invention public.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electrophotographic electroconductive member, comprising:

a support having an electroconductive outer surface;

an electroconductive layer on the outer surface of the support, the electroconductive layer having a matrix containing a cross-linked product of a first rubber and domains each containing a cross-linked product of a second rubber and electroconductive particles; and a surface layer in which an electronic electroconductive agent is dispersed, the surface layer being on an outer surface of the electroconductive layer, wherein an impedance of $1.0 \times 10^3$ to $1.0 \times 10^8 \Omega$ is obtained when a platinum electrode is provided directly on an outer surface of the electrophotographic electroconductive member, and an alternating current voltage is applied between an outer surface of the support and the platinum electrode at an amplitude of 1 V and a frequency of 1.0 Hz under an environment of a temperature of 23° C. and a relative humidity of 50%, and when L is a length of the electroconductive layer in a longitudinal direction and T is a thickness of the electroconductive layer, and when a 15-micrometer square observation region is placed at three arbitrary positions in a thickness region from an outer surface of the electroconductive layer to a depth of 0.1 to 0.9T on each of cross sections in a thickness direction of the electroconductive layer at three positions: a center of the electroconductive layer in the longitudinal direction, and points from both ends of the electroconductive layer to the center by L/4, among the domains observed in each of the observation regions whose total number of 9, at least 80% by number of the domains satisfy
(1) a proportion of sectional areas of the electroconductive particles contained in the domain with respect to a sectional area of the domain is 20% or more, and
(2) A/B is 1.00 to 1.10 when A is a perimeter, and B is an envelope perimeter.

2. The electrophotographic electroconductive member according to claim 1, wherein the electroconductive layer is formed by curing a layer of a rubber composition containing the first rubber, and a second rubber mixture comprising the electroconductive particles and the second rubber.

3. The electrophotographic electroconductive member according to claim 1, wherein the matrix has a volume resistivity ρm of $1.0 \times 10^8$ to $1.0 \times 10^{17}$ Ωcm.

4. The electrophotographic electroconductive member according to claim 1, wherein the domains that satisfy (1) and (2) have an average maximum Feret diameter Df of 0.1 to 5.0 μm.

5. The electrophotographic electroconductive member according to claim 1, wherein the 15-micrometer square observation region has an average number of 20 to 300 domains.

6. The electrophotographic electroconductive member according to claim 1, wherein a proportion of the sectional areas of the electroconductive particles with respect to the sectional area of the domain is 30% or less.

7. The electrophotographic electroconductive member according to claim 1, wherein the electroconductive particles are carbon black particles.

8. The electrophotographic electroconductive member according to claim 7, wherein the carbon black has a DBP absorption amount of 40 to 80 cm$^3$/100 g.

9. The electrophotographic electroconductive member according to claim 7, wherein an arithmetic average distance Dc between the carbon black particles included in each of the domains that satisfy (1) and (2) is 110 to 130 nm, and
σm/Dc is 0.0 to 0.3 when σm is a standard deviation of a distribution of distances between the carbon black particles.

10. The electrophotographic electroconductive member according to claim 1, wherein a difference in absolute value of a solubility parameter between the first rubber and the second rubber is 0.4 to 4.0 (J/cm$^3$)$^{0.5}$.

11. The electrophotographic electroconductive member according to claim 1, wherein the matrix has a volume resistivity ρm of $1.0 \times 10^{10}$ to $1.0 \times 10^{17}$ Ωcm.

12. The electrophotographic electroconductive member according to claim 1, wherein the matrix has a volume resistivity ρm of more than $1.0 \times 10^{12}$ Ωcm and $1.0 \times 10^{17}$ Ωcm or less.

13. The electrophotographic electroconductive member according to claim 1, wherein the surface layer contains a binder resin and an electronic electroconductive agent dispersed in the binder resin,
a surface of the surface layer has protrusions derived from exposed portions of the electronic electroconductive agent, and
and a universal hardness at a position of a depth of 1 μm from the surface of the surface layer is 1.0 to 7.0 N/mm$^2$.

14. The electrophotographic electroconductive member according to claim 13, wherein the number of the protrusions is 50 to 500, when a region of 2.0 μm in length and 2.0 μm in width on the surface of the surface layer is observed with a scanning electron microscope.

15. The electrophotographic electroconductive member according to claim 1, wherein the surface layer has a volume resistivity of $1.0 \times 10^{10}$ to $1.0 \times 10^{16}$ Ωcm.

16. The electrophotographic electroconductive member according to claim 1, wherein the surface layer contains roughening particles having a number average particle diameter of 3 to 30 μm.

17. The electrophotographic electroconductive member according to claim 13, wherein the binder resin contains a urethane resin.

18. The electrophotographic electroconductive member according to claim 17, wherein the urethane resin has a urethane group concentration of 1.5 to 6.5%.

19. The electrophotographic electroconductive member according to claim 17, wherein the urethane resin comprises at least one structure selected from the group consisting of structural formulae (1)-(3)

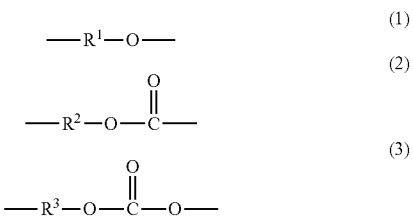

where $R^1$ to $R^3$ independently represent a divalent hydrocarbon group having a straight chain or a branched chain having 4 to 8 carbon atoms.

20. A process cartridge for electrophotography configured to be detachably attachable to a main body of an electrophotographic image forming apparatus, the process cartridge comprising an electrophotographic electroconductive member that comprises:
a support having an electroconductive outer surface;
an electroconductive layer on the outer surface of the support, the electroconductive layer having a matrix containing a cross-linked product of a first rubber and domains each containing a cross-linked product of a second rubber and electroconductive particles; and
a surface layer in which an electronic electroconductive agent is dispersed, the surface layer being on an outer surface of the electroconductive layer, wherein
an impedance of $1.0 \times 10^3$ to $1.0 \times 10^8$ Ω is obtained when a platinum electrode is provided directly on an outer surface of the electrophotographic electroconductive member, and an alternating current voltage is applied between an outer surface of the support and the platinum electrode at an amplitude of 1 V and a frequency of 1.0 Hz under an environment of a temperature of 23° C. and a relative humidity of 50%, and
when L is a length of the electroconductive layer in a longitudinal direction and T is a thickness of the electroconductive layer, and when a 15-micrometer square observation region is placed at three arbitrary positions in a thickness region from an outer surface of the electroconductive layer to a depth of 0.1 to 0.9T on each of cross sections in a thickness direction of the electroconductive layer at three positions of a center of the electroconductive layer in the longitudinal direction and points from both ends of the electroconductive layer to the center by L/4, among the domains observed in each of the observation regions whose total number of 9, at least 80% by number of the domains satisfy (1) and (2):

(1) a proportion of sectional areas of the electroconductive particles contained in the domain with respect to a sectional area of the domain is 20% or more, and (2) A/B is 1.00 to 1.10 when A is a perimeter, and B is an envelope perimeter.

21. An electrophotographic image forming apparatus comprising an electrophotographic electroconductive member, the electrophotographic electroconductive member comprising:

a support having an electroconductive outer surface;

an electroconductive layer on the outer surface of the support, the electroconductive layer having a matrix containing a cross-linked product of a first rubber and domains each containing a cross-linked product of a second rubber and electroconductive particles; and a surface layer in which an electronic electroconductive agent is dispersed, the surface layer being on an outer surface of the electroconductive layer, wherein an impedance of $1.0 \times 10^3$ to $1.0 \times 10^8 \Omega$ is obtained when a platinum electrode is provided directly on an outer surface of the electrophotographic electroconductive member, and an alternating current voltage is applied between an outer surface of the support and the platinum electrode at an amplitude of 1 V and a frequency of 1.0 Hz under an environment of a temperature of 23° C. and a relative humidity of 50%, and when L is a length of the electroconductive layer in a longitudinal direction and T is a thickness of the electroconductive layer, and when a 15-micrometer square observation region is placed at three arbitrary positions in a thickness region from an outer surface of the electroconductive layer to a depth of 0.1 to 0.9T on each of cross sections in a thickness direction of the electroconductive layer at three positions of a center of the electroconductive layer in the longitudinal direction and points from both ends of the electroconductive layer to the center by L/4, among the domains observed in each of the observation regions whose total number of 9, at least 80% by number of the domains satisfy (1) and (2):

(1) a proportion of sectional areas of the electroconductive particles contained in the domain with respect to a sectional area of the domain is 20% or more, and (2) A/B is 1.00 to 1.10 when A is a perimeter, and B is an envelope perimeter.

* * * * *